(12) United States Patent
Neal et al.

(10) Patent No.: US 7,877,286 B1
(45) Date of Patent: Jan. 25, 2011

(54) SUBSET OPTIMIZATION SYSTEM

(75) Inventors: Michael Neal, San Francisco, CA (US);
Krishna Venkatraman, Menlo Park, CA (US); Rob Parkin, San Francisco, CA (US); Suzanne Valentine, Atlanta, GA (US); Phil Delurgio, Dana Point, CA (US); Hau Lee, Los Altos, CA (US)

(73) Assignee: DemandTec, Inc., San Mateo, CA (US)

( * ) Notice: Subject to any disclaimer, the term of this patent is extended or adjusted under 35 U.S.C. 154(b) by 1059 days.

(21) Appl. No.: 10/006,608

(22) Filed: Nov. 30, 2001

Related U.S. Application Data

(63) Continuation-in-part of application No. 09/888,340, filed on Jun. 22, 2001, now Pat. No. 7,617,119, which is a continuation-in-part of application No. 09/741,958, filed on Dec. 20, 2000, now Pat. No. 7,523,047.

(51) Int. Cl.
*G06Q 30/00* (2006.01)
*G06F 17/60* (2006.01)

(52) U.S. Cl. .................. 705/10; 705/20; 705/7

(58) Field of Classification Search ............ 705/1, 705/5, 8, 10, 15, 20, 26, 22, 400, 36, 7; 706/62
See application file for complete search history.

(56) References Cited

U.S. PATENT DOCUMENTS

| | | | |
|---|---|---|---|
| 3,017,610 A | 1/1962 | Auerbach et al. | |
| 4,744,026 A * | 5/1988 | Vanderbei | 705/8 |
| 4,862,357 A | 8/1989 | Ahistrom et al. | |
| 4,887,207 A | 12/1989 | Natarajan | |
| 4,907,170 A | 3/1990 | Bhattacharya | |
| 4,916,443 A * | 4/1990 | Barrett et al. | 340/5.33 |
| 5,057,915 A * | 10/1991 | Von Kohorn | 463/9 |
| 5,063,506 A | 11/1991 | Brockwell et al. | 364/402 |
| 5,117,354 A | 5/1992 | Long et al. | 364/401 |

(Continued)

FOREIGN PATENT DOCUMENTS

WO  WO 98/53415  11/1998

(Continued)

OTHER PUBLICATIONS

Montgomery: "The Impact of Micro-Marketing on Pricing Strategies", 1994 The University of Chicago vol. 55/12-A of Dissertation of Abstracts International, p. 3922 (Abstract Only).

(Continued)

*Primary Examiner*—Evens J Augustin
(74) *Attorney, Agent, or Firm*—Kang Lim

(57) ABSTRACT

A method for computing a preferred set of prices for products in a subset of a plurality of products is provided. Generally, initial prices for a plurality of products are stored. A subset of products of the plurality of products is designated, where the number of products in the subset of products is less than the number of products in the plurality of products. A demand model is created based on Bayesian modeling. Prices for the products in the subset of products are optimized, while maintaining the initial prices of products of the plurality of products that are not in the subset of products, wherein the optimization uses a grid method to determine the optimized prices.

22 Claims, 29 Drawing Sheets

U.S. PATENT DOCUMENTS

| | | | |
|---|---|---|---|
| 5,189,606 A | 2/1993 | Burns et al. | |
| 5,212,791 A | 5/1993 | Damian et al. | |
| 5,227,874 A * | 7/1993 | Von Kohorn | 705/10 |
| 5,249,120 A | 9/1993 | Foley | 364/401 |
| 5,299,115 A | 3/1994 | Fields et al. | 364/401 |
| 5,331,546 A | 7/1994 | Webber et al. | |
| 5,377,095 A * | 12/1994 | Maeda et al. | 705/10 |
| 5,459,656 A * | 10/1995 | Fields et al. | 705/7 |
| 5,490,060 A * | 2/1996 | Malec et al. | 705/10 |
| 5,515,270 A * | 5/1996 | Weinblatt | 705/14.25 |
| 5,521,813 A | 5/1996 | Fox et al. | |
| 5,615,109 A * | 3/1997 | Eder | 705/8 |
| 5,694,551 A | 12/1997 | Doyle et al. | |
| 5,710,887 A | 1/1998 | Chelliah et al. | |
| 5,712,985 A * | 1/1998 | Lee et al. | 705/7 |
| 5,732,401 A | 3/1998 | Conway | 705/29 |
| 5,765,143 A | 6/1998 | Sheldon et al. | |
| 5,774,868 A | 6/1998 | Cragun et al. | |
| 5,790,643 A | 8/1998 | Gordon et al. | |
| 5,799,286 A | 8/1998 | Morgan et al. | 705/30 |
| 5,822,736 A | 10/1998 | Hartman et al. | 705/1 |
| 5,832,456 A | 11/1998 | Fox et al. | |
| 5,832,458 A | 11/1998 | Jones | |
| 5,873,069 A | 2/1999 | Reuhl et al. | 705/20 |
| 5,878,400 A | 3/1999 | Carter, III | 705/20 |
| 5,902,351 A * | 5/1999 | Streit et al. | 701/220 |
| 5,918,209 A | 6/1999 | Campbell et al. | 705/5 |
| 5,918,211 A * | 6/1999 | Sloane | 705/16 |
| 5,933,813 A | 8/1999 | Teicher et al. | 705/26 |
| 5,987,425 A * | 11/1999 | Hartman et al. | 705/20 |
| 6,009,407 A | 12/1999 | Garg | 705/10 |
| 6,009,415 A * | 12/1999 | Shurling et al. | 705/35 |
| 6,029,139 A | 2/2000 | Cunningham et al. | 705/10 |
| 6,032,123 A | 2/2000 | Jameson | 705/8 |
| 6,032,125 A | 2/2000 | Ando | 705/10 |
| 6,044,357 A | 3/2000 | Garg | 705/10 |
| 6,052,686 A | 4/2000 | Fernandez et al. | |
| 6,078,893 A | 6/2000 | Ouimet et al. | 705/10 |
| 6,094,641 A * | 7/2000 | Ouimet et al. | 705/10 |
| 6,125,355 A | 9/2000 | Bekaert et al. | 705/36 |
| 6,134,534 A | 10/2000 | Walker et al. | 705/26 |
| 6,173,345 B1 | 1/2001 | Stevens | |
| 6,202,070 B1 | 3/2001 | Nguyen et al. | |
| 6,205,431 B1 | 3/2001 | Willemain et al. | 705/10 |
| 6,219,649 B1 | 4/2001 | Jameson | |
| 6,272,483 B1 * | 8/2001 | Joslin et al. | 706/62 |
| 6,289,330 B1 | 9/2001 | Jannarone | |
| 6,308,162 B1 | 10/2001 | Ouimet et al. | 705/7 |
| 6,321,207 B1 | 11/2001 | Ye | |
| 6,336,097 B1 * | 1/2002 | Scipioni | 705/6 |
| 6,341,268 B2 | 1/2002 | Walker et al. | 705/15 |
| 6,341,269 B1 | 1/2002 | Dulaney et al. | 705/22 |
| 6,377,932 B1 | 4/2002 | DeMarcken | |
| 6,378,066 B1 | 4/2002 | Lewis | |
| 6,397,193 B1 | 5/2002 | Walker et al. | 705/20 |
| 6,405,175 B1 | 6/2002 | Ng | |
| 6,430,539 B1 | 8/2002 | Lazarus et al. | |
| 6,456,986 B1 | 9/2002 | Boardman et al. | 705/400 |
| 6,536,935 B2 | 3/2003 | Parunak et al. | |
| 6,546,387 B1 | 4/2003 | Triggs | |
| 6,553,352 B2 * | 4/2003 | Delurgio et al. | 705/400 |
| 6,567,824 B2 | 5/2003 | Fox | |
| 6,591,255 B1 | 7/2003 | Tatum et al. | |
| 6,609,101 B1 | 8/2003 | Landvater et al. | |
| 6,678,695 B1 | 1/2004 | Bonneau et al. | |
| 6,684,193 B1 | 1/2004 | Chavez et al. | 705/8 |
| 6,697,824 B1 | 2/2004 | Bowman-Amuah | |
| 6,725,208 B1 | 4/2004 | Hartman et al. | |
| 6,731,998 B2 | 5/2004 | Walser et al. | |
| 6,735,572 B2 | 5/2004 | Landesmann | |
| 6,745,184 B1 | 6/2004 | Choi et al. | |
| 6,826,538 B1 | 11/2004 | Kalyan et al. | |
| 6,851,604 B2 * | 2/2005 | Girotto et al. | 235/378 |
| 6,910,017 B1 | 6/2005 | Woo et al. | |
| 6,934,931 B2 | 8/2005 | Plumer et al. | |
| 6,963,854 B1 * | 11/2005 | Boyd et al. | 705/37 |
| 6,965,867 B1 * | 11/2005 | Jameson | 705/8 |
| 6,988,076 B2 | 1/2006 | Ouimet | |
| 7,058,617 B1 | 6/2006 | Hartman et al. | |
| 7,062,447 B1 * | 6/2006 | Valentine et al. | 705/1.1 |
| 7,072,848 B2 * | 7/2006 | Boyd et al. | 705/10 |
| 7,080,026 B2 * | 7/2006 | Singh et al. | 705/10 |
| 7,080,030 B2 * | 7/2006 | Eglen et al. | 705/26 |
| 7,092,896 B2 * | 8/2006 | Delurgio et al. | 705/10 |
| 7,092,918 B1 * | 8/2006 | Delurgio et al. | 705/400 |
| 7,092,929 B1 | 8/2006 | Dvorak et al. | |
| 7,130,811 B1 * | 10/2006 | Delurgio et al. | 705/10 |
| 7,133,848 B2 | 11/2006 | Phillips et al. | |
| 7,133,882 B1 * | 11/2006 | Pringle et al. | 1/1 |
| 7,155,402 B1 | 12/2006 | Dvorak | |
| 7,240,019 B2 | 7/2007 | Delurgio et al. | |
| 7,249,031 B2 | 7/2007 | Close et al. | |
| 7,249,032 B1 | 7/2007 | Close et al. | |
| 7,249,033 B1 | 7/2007 | Close et al. | |
| 7,302,410 B1 | 11/2007 | Venkatraman et al. | |
| 7,308,421 B2 | 12/2007 | Raghupathy et al. | |
| 7,349,879 B2 | 3/2008 | Alsberg et al. | |
| 7,363,259 B2 | 4/2008 | Baseman et al. | |
| 7,386,519 B1 | 6/2008 | Delurgio et al. | |
| 2001/0014868 A1 | 8/2001 | Herz et al. | |
| 2002/0023001 A1 | 2/2002 | McFarlin et al. | |
| 2002/0032610 A1 | 3/2002 | Gold et al. | |
| 2002/0042739 A1 | 4/2002 | Srinivasan et al. | |
| 2002/0042755 A1 | 4/2002 | Kumar et al. | |
| 2002/0107819 A1 | 8/2002 | Ouimet | |
| 2002/0116348 A1 | 8/2002 | Phillips et al. | |
| 2002/0123930 A1 | 9/2002 | Boyd et al. | |
| 2002/0165834 A1 | 11/2002 | Delurgio et al. | |
| 2002/0169657 A1 | 11/2002 | Singh et al. | |
| 2002/0184059 A1 | 12/2002 | Offutt, Jr. et al. | |
| 2002/0198794 A1 | 12/2002 | Williams et al. | |
| 2003/0028437 A1 | 2/2003 | Grant et al. | |
| 2003/0110072 A1 | 6/2003 | Delurgio et al. | 705/10 |
| 2003/0177103 A1 | 9/2003 | Ivanov et al. | |
| 2003/0200185 A1 | 10/2003 | Huerta et al. | |
| 2003/0220830 A1 | 11/2003 | Myr | |
| 2004/0111358 A1 | 6/2004 | Lange et al. | |
| 2004/0210541 A1 | 10/2004 | Epstien et al. | |
| 2004/0243432 A1 | 12/2004 | Kelly et al. | |
| 2005/0096963 A1 | 5/2005 | Myr et al. | |
| 2005/0108070 A1 | 5/2005 | Kelly et al. | |
| 2006/0161504 A1 | 7/2006 | Walser et al. | |
| 2006/0224534 A1 | 10/2006 | Hartman et al. | |
| 2006/0271441 A1 | 11/2006 | Mueller et al. | |
| 2008/0086429 A1 | 4/2008 | Venkatraman et al. | |
| 2008/0243645 A1 | 10/2008 | Bayer et al. | |

FOREIGN PATENT DOCUMENTS

| | | |
|---|---|---|
| WO | WO 02/01456 | 1/2002 |

OTHER PUBLICATIONS

Busch: "Cost Modeling as a Technical Management Tool", Research-Technology Management, Nov./Dec. 1994, vol. 37, No. 6, pp. 50-56.

"Pacificorp IRP: Renewables Costs Must Drop 65% to be Competitive with Gas".

"Report of Novelty Search" by Patentec, dated Feb. 9, 2001.

"Report of Novelty Search" by Patentec, dated Jul. 25, 2001.

Stephen J. Hoch et al., "Store Brands and Category Management", The Wharton School, University of Pennsylvania, Mar. 1998, pp. 1-38.

Bruce G.S. Hardie et al., "Attribute-based Market Share Models: Methodological Development and Managerial Applications", University of Pennsylvania, Working Paper 98-009, pp. 1-48.

Alan Mercer, "Non-linear Price Effects", Journal of the Market Research Society, dated Jul. 1, 1996, p. 227.

Rockney G. Walters, "Assessing the Impact of Retail Price Promotions on Product Substitution, Complementary Purchase, and Interstore Sales Displacement", Journal of Marketing, vol. 55, Apr. 1991, pp. 17-28.

Robert C. Blattberg et al., "How Promotions Work", Marketing Science, vol. 14, No. 3, Part 2 of 2, 1995, pp. G122-G132.

Peter M. Guadagni et al., "A Logit Model of Brand Choice Calibrated on Scanner Data", Marketing Science, vol. 2, No. 3, Summer 1983, pp. 203-238.

Lee G. Cooper et al., "Standardizing Variables in Multiplicative Choice Models", Journal of Consumer Research, vol. 10, Jun. 1983, pp. 96-108.

Eileen Bridges et al., "A High-Tech Product Market Share Model With Customer Expectations" Marketing Science, vol. 14, No. 1, Winter 1995, pp. 61-81.

Richard R. Batsell, et al., "A New Class of Market Share Models", Marketing Science, vol. 4, No. 3, Summer 1985, pp. 177-198.

Jagmohan S. Raju, "The Effect of Price Promotions on Variability in Product Category Sales", Marketing Science, vol. 11, No. 3, Summer 1992, pp. 207-220.

Robert J. Dolan, "How Do You Know When the Price is Right?", Harvard Business Review, Sep.-Oct. 1995, pp. 5-11.

Fusun Gonul, "Modeling Multiple Sources of Heterogeneity in Multinomial Logit Models: Methodological and Managerial Issues", Marketing Science, vol. 12, No. 3, Summer 19932, pp. 213-229.

Robert M. Schindler et al., "Increased Consumer Sales Response through Use of 99-Ending Prices", Journal of Retailing, Jun. 1, 1996, p. 187.

Francis J. Mulhern et al., "The Relationship between Retail Price Promotions and Regular Price Purchases", Journal of Marketing, vol. 59, Oct. 1995, pp. 83-90.

John Deighton et al., "The Effects of Advertising on Brand Switching and Repeat Purchasing", Journal of Marketing Research, vol. XXXI, Feb. 1994, pp. 28-43.

Sunil Gupta, "Reflections on 'Impact of Sales Promotions on When, What, and How Much to Buy'", Journal of Marketing Research, vol. XXX, Nov. 1993, pp. 522-524.

Richard A. Briesch, "Does it Matter How price Promotions Are Operationalized?", Marketing Letters 8:2 (1997), pp. 167-181.

Byung-Do Kim et al., "Modeling the Distribution of Price Sensitivity and Implications for Optimal Retail Pricing", Journal of Business & Economic Statistics, Jul. 1995, vol. 13, No. 3.

William R. Dillon et al., "A Segment-level Model of Category Volume and Brand Choice", Marketing Science, vol. 15, No. 1, 1996, pp. 38-59.

Stephen J. Hoch at al., "Determinants of Store-Level Price Elasticity", Journal of Marketing Research, vol. XXXII (Feb. 1995); pp. 17-29.

Magid M. Abraham et al., "An Implemented System for Improving Promotion Productivity Using Store Scanner Data", Marketing Science, vol. 12, No. 3, Summer 1993.

Peter S. Fader et al., "Modeling Consumer Choice among SKUs", Journal of marketing Research, vol. XXXII (Nov. 1996), pp. 442-452.

Rossi Delorgio, & Kantor; "Making Sense of Scanner Data;" Harvard Business Review, Reprint F00205.

Bucklin & Gupta, "Brand Choice, Purchase Incidence, and Segmentation: An Integrated Modeling Approach," Journal of Marketing Research, May 1992, pp. 201-215, vol. XXIX.

Smith, Mathur, & Kohn; Bayesian Semiparametric Regression: An Exposition and Application to Print Advertising;: Jan. 3, 1997; Australian Graduate School of Management, University of New South Wales, Sydnet 2025, Australia.

Blattberg and Deighton, "Manage Marketing by the Customer Equity," Harvard Business Review, Jul.-Aug. 1996, pp. 136-144.

Christen, Gupta, Porter, Staelin & Wittink; "Using Market-Level Data to Understand the Effectiveness of Promotional Activities;" Dec. 22, 1995.

Ross Link, "Are Aggregate Scanner Data Models Biased?," Journal of Advertising Research, Sep./Oct. 1995, pp. RC8-RC12, ARF.

Russell & Kamakura, "Understanding Brand Completion Using Micro and Macro Scanner Data," Journal of Marketing Research, vol. XXXI (May 1994), pp. 289-303.

John Philip Jones, "The Double Jeopardy of Sales Promotions," Harvard Business Review, Sep.-Oct. 1999, pp. 145-152.

Buzzell, Quelch, & Salmon; "The Costly Bargain of Trade Promotion;" Harvard Business Review, Reprint 90201, Mar.-Apr. 1990, pp. 1-9.

Curry, Divakar, Mathur & Whiteman; "Bvar as a Category Management Tool: An Illustration and Comparison with Alternative Techniques;" Journal of Forecasting, vol. 14, Iss. No. 3 (1995), pp. 181-199.

"PCT International Search Report", Application No. PCT/US02/36710, mailed Jul. 21, 2003.

Yoeman, John Cornelius Jr., "The Optimal Offering Price for Underwritten Securities", 1993, vol. 55/01-A of Dissertation Abstracts International, p. 4743 (Abstract Only).

"PCT International Search Report", Application No. PCT/US03/30488, mailed Jan. 28, 2004.

Bruce G.S. Hardie et al., "Attribute-based Market Share Models: Methodological Development and Managerial Applications", University of Pennsylvania, Working Paper 98-009, pp. 1-48, 1998.

Rossi, Delorgio, & Kantor; "Making Sense of Scanner Data;" Harvard Business Review, Reprint F00205, 2000.

"Pacificorp IRP: Renewables Costs Must Drop 65% to be Competitive with Gas," dated Dec. 8, 1995.

Robert J. Dolan, "How Do You Know When the Price is Right?", Harvard Business Review, Sep.-Oct. 1995, p. 4-11.

Alan L. Montgomery and Peter R. Rossi, "Estimating Price Elasticities with Theory-Based Priors," Journal of Marketing Research vol. XXXVI, Nov. 1999 (pp. 413-423).

Boatwright, Peter et al., "Account-Level Modeling for Trade Promotion: An Application of a Constrained Parameter Hierarchical Model," Journal of the American Statistical Association, vol. 94, No. 448, Dec. 1999 (pp. 1063-1073).

Alan L. Montgomery, "Creating Micro-Marketing Pricing Strategies Using Supermarket Scanner Data," Marketing Science, vol. 16, No. 4, 1997 (pp. 315-337).

Robert C. Blattberg and Edward I. George, "Shrinkage Estimation of Price and Promotional Elasticities: Seemingly Unrelated Equations," Journal of the American Statistical Association, vol. 86, No. 414, Jun. 1991 (pp. 304-315).

Arnold Zellner, "On Assessing Prior Distribution sand Bayesian Regression Analysis With G-Prior Distributions," Elsevier Science Publishers, 1986 (pp. 233-243).

A.F.M. Smith, "A General Bayesian Linear Model," University of Oxford, Apr. 1972.

D.V. Lindley and A.F.M. Smith, "Bayes Estimates for the Linear Model," University College, Dec. 1971.

George C. Tiao and Arnold Zellner, "On the Bayesian Estimation of Multivariate Regression," University of Wisconsin, Jan. 1964.

Arnold Zellner, "An Efficient Method of Estimating Seemingly Unrelated Regressions and Tests for Aggregation Bias," University of Wisconsin, Jun. 1962.

"Merriam Webster's Collegiate Dictionary", $10^{th}$ edition, p. 585, Merriam-Webster Incorporated, 1999.

Hernandez, Mauricio A., and Salvatore J. Stolfo, "Real-world Data is Dirty: Data Cleansing and the Merge/Purge Problem", Data Mining and Knowledge Discovery, vol. 2, Issue 1, Jan. 1998.

"PCT International Search Report", Application No. PCT/US02/14977, mailed May 5, 2003.

Dyer, Robert F. et al., "Case Studies in Marketing Decisions Using Expert Choice," Decision Support Software, 1988, pp. 2-7, 73-108.

Scherage, Dan, "You Do the Math," Chain Store Age, v76, n7, Jul. 2000.

"Gymboree Enhances Price Management," Retail Systems Alert, vol. 13, No. 6, Jun. 2000.

Binkley, James K.; Connor, John M.; "Grocery Market Pricing and the New Competitive Environment." Journal of Retailing, v74, n2, Summer 1998.

"KhiMetrics Helps Retailers Increase Margins With Two New Tools for Their Retail Revenue Management Application Suite." PR Newswire, Mar. 1, 2001.

"KhiMetrics and Retek Form Marketing Alliance for Comprehensive Retail Pricing Solution." PR Newswire, Feb. 19, 2001.

Barth, Brad, "ShopKo Holds the Price Line." Daily News Record, p. 10, Oct. 4, 2000.

Barth, Brad, "Shopko Tests Automated Markdowns", WWD Oct. 4, 2000, pp. 1-3.

"Manugistics Agrees to Acquire Talus Solutions." PR Newswire, Sep. 21, 2000.

"Goodyear Implements Trilogy's MultiChannel Pricing Solution as Its Enterprise-Wide E-Pricer Platform." Business Wire, p. 2286, Jun. 27, 2000.

"IMRglobal Signs New Product Implementation Agreement with Retek to Improve Retail Pricing and Markdown Process." Business Wire, p. 1590, Jun. 7, 2000.

Cook, Martie, "Optimizing Space and Sales with Markdown Software", Office.com, May 31, 2000, p. 1.

"New Tools for Modeling Elasticity, Optimizing Prices and Collecting Live Pricing from the Web to Debut at Retail Systems 2000 in Chicago." Business Wire, p. 1484, Apr. 18, 2000.

"Essentus and Spotlight Solutions Partnership Delivers Precise Markdown Decisions", Business Wire, Apr. 17, 2000, 3 pages.

Melcer, Rachel, "Local Tech Firm Creates Retail Markdown Tool", Business Courier online, Mar. 24, 2000, pp. 1-4.

Technology Strategy Incorporated, www.grossprofit.com, Mar. 2, 2000, pp. 1-20.

Kadiyali et al., "Manufacturer-retailer Channel Interactions and Implications for Channel Power: An Investigation of Pricing in Local Market", Marketing Science, Spring 2000, V. 19, Issue 2.

Andrew B. Gelman et al., "Bayesian Data Analysis", pp. 439-455, Chapman & Hall/CRC, First Edition 1995, Reprinted 2000.

Smith et al., "A Discrete Optimization Model for Seasonal Merchandise Planning." Journal of Retailing, vol. 74, No. 2, p. 193(29), Summer 1998.

Abraham, Magid M. and Leonard M. Lodish, "Promoter: An Automated Promotion Evaluation System," Marketing Science, vol. 6, No. 2, 1987 (p. 101-123).

Little, John D. C., "Brandaid: A Marketing-Mix Model, Part 1: Structure," Operations Research, vol. 23, No. 4, Jul.-Aug. 1975 (p. 628-655).

Cerf, Vinton G. and Robert E. Kahn, "A Protocol for Packet Network Interconnection," IEEE Transactions on Communications COM-22, May 1974, (p. 637-648).

Flanagan, David, "Javascript: The Definitive Guide, $3^{rd}$ Edition," published by O'Reilly in Jun. 1998 (ISBN 1-56592-392-8) section 14.8.

Berners-Lee, T., "Hypertext Markup Language 2.0 Working Paper," Nov. 1995 (pp. 1-3).

Tellis, Gerard J., and Fred S. Zufryden, "Tackling the Retailer Decision Maze: Which Brands to Discount, How Much, When and Why," Marketing Science, vol. 1, No. 34, 1995 (pp. 271-299).

Mulhern et al. "Measuring Market Response to Price Changes: A Classification Approach". J Busn Res. 1995:33.197-205.

"PCT International Search Report and the Written Opinion of the International Searching Authority", Application No. PCT/US 07/20678, mailed Feb. 26, 2008.

Bertsimas, D. and Tsitsiklis, J. N., "Introduction to Linear Optimization", Athena Scientific, pp. 451-453, 1997.

LoPresti, F., "New SPSS Missing Values Analysis Option", Statistics and Social Sciences, Oct. 1998.

Lach, J., "Data Mining Digs In", American Demographics, vol. 21, No. 7, Jul. 1999.

Chapman, J. and Wahlers, R., "A Revision and Empirical Test of the Extended Price-Perceived Quality Model", Journal of Marketing Theory & Practice, vol. 7, No. 3, Summer 1999.

Paulin, G. D. and Ferraro, D. L., "Imputing Income in the Consumer Expenditure Survey", Monthly Labor Review, vol. 117, No. 12, Dec. 1994.

Dembeck, J. L. and Stout, D. E., "Using a Spreadsheet to Solve a Multinational Marketing Problem", Management Accounting, vol. 78, No. 7, Jan. 1997.

Diebold, Francis X. "The Past, Present, and Future of Macroeconomic Forecasting." Journal of Economic Perspectives (IJEP), vol. 12, No. 2, pp. 175-192, Spring 1998.

Hillier, Frederick S., et al., "Introduction to Operations Research", McGraw-Hill, Inc., 1995, Sixth Edition, pp. 1-14.

\* cited by examiner

SUBSET OPTIMIZATION SYSTEM

CROSS-REFERENCE TO RELATED APPLICATIONS

This application is a Continuation-in-Part to application Ser. No. 09/888,340, filed Jun. 22, 2001, now U.S. Pat. No. 7,617,119, entitled "Price Optimization with Rule Relaxation", by Michael Neal, Krishna Venkatraman, Rob Parkin, Suzanne Valentine, Phil Delurgio, and Hau Lee, which is a Continuation-in-Part to p application Ser. No. 09/741,958, filed Dec. 20, 2000, now U.S. Pat. No. 7,523,047 entitled "Price Optimization System", by Michael Neal, Krishna Venkatraman, Suzanne Valentine, Phil Delurgio, and Hau Lee, and co-pending application Ser. No. 09/742,472, filed Dec. 20, 2000, entitled "Imputed Variable Generator", by Suzanne Valentine, Krishna Venkatraman, Phil Delurgio, Michael Neal, and Hau Lee, and co-pending application Ser. No. 09/741,956, filed Dec. 20, 2000, entitled "Econometric Engine", by Hau Lee, Krishna Venkatraman, Michael Neal, Suzanne Valentine, and Phil Delurgio, and co-pending application Ser. No. 09/741,957, filed Dec. 20, 2000, entitled "Financial Model Engine", by Phil Delurgio, Suzanne Valentine, Michael Neal, Krishna Venkatraman, and Hau Lee, and co-pending application Ser. No. 09/741,959, filed Dec. 20, 2000, entitled "Econometric Optimization Engine", by Krishna Venkatraman, Phil Delurgio, Suzanne Valentine, Michael Neal, and Hau Lee, and co-pending application Ser. No. 09/849,783, filed May 5, 2001, entitled "System for Creating Optimized Promotion Event Calendar", by Michael Neal, Krishna Venkatraman, Rob Parkin, Suzanne Valentine, Phil Delurgio, and Hau Lee, which are all incorporated by reference herein for all purposes.

This application also relates to co-pending application Ser. No. 09/849,621, filed May 5, 2001, entitled "Apparatus for Merchandise Promotion Optimization", by Michael Neal, Krishna Venkatraman, Suzanne Valentine, Phil Delurgio, and Hau Lee, incorporated by reference.

This application also relates to co-pending and concurrently filed application Ser. No. 09/999,079 filed Nov. 30, 2001, entitled "Apparatus and Method for Selective Merchandise Price Optimization", by Michael Neal, Krishna Venkatraman, Rob Parkin, Suzanne Valentine, Phil Delurgio, Hau Lee, and John Close, which is incorporated by reference herein for all purposes.

BACKGROUND OF THE INVENTION

The present invention relates to providing optimized pricing for a subset of a plurality of products for a plurality of stores.

In businesses, prices of various products must be set. Such prices may be set with the goal of maximizing profit or demand or for a variety of other objectives. Profit is the difference between total revenue and costs. Total sales revenue is a function of demand and price, where demand is a function of price. Demand may also depend on the day of the week, the time of the year, the price of related products, the location of a store, and various other factors. As a result, the function for forecasting demand may be very complex. Costs may be fixed or variable and may be dependent on demand. As a result, the function for forecasting costs may be very complex. For a chain of stores with tens of thousands of different products, forecasting costs and determining a function for forecasting demand are difficult. The enormous amounts of data that must be processed for such determinations are too cumbersome even when done by computer. Further, the methodologies used to forecast demand and cost require the utilization of non-obvious, highly sophisticated statistical processes.

It is desirable to provide an efficient process and methodology for determining the prices of individual products such that profit (or whatever alternative objective) is optimized.

In some of the above-mentioned patent applications, a plurality of rules are used as constraints in providing an optimization. During optimization, it may be found that one of the plurality of rules is infeasible. Such a finding of infeasibility may stop the optimization process. It would be desirable to provide a method of handling optimization when a rule is found to be infeasible.

It is desirable to update prices as new information about the products and competitive environment is received. Examples of this type of information would include product cost updates, product addition or discontinuance, and new competitive price or base price data. Ideally, when a user receives new information, they would run a secondary optimization in over a whole product category. This would allow the optimization to fully capture all of the complementary and substitution effects in selecting the new set of optimal prices. However, if the cost of changing prices is not negligible, optimization and changing prices of all products in a whole product category may not be desirable.

SUMMARY OF THE INVENTION

To achieve the foregoing and other objects and in accordance with the purpose of the present invention, a method for computing a preferred set of prices for a subset of a plurality of products is provided. Generally, initial prices for a plurality of products are stored. A demand model is created based on Bayesian modeling. A subset of products of the plurality of products is designated, where the number of products in the subset of products is less than the number of products in the plurality of products. Prices for the subset of products are optimized, while maintaining the initial prices of products of the plurality of products that are not in the subset of products, where the optimization uses a grid method to determine the optimized prices.

In another embodiment of the invention, an apparatus for computing a preferred set of prices for a subset of a plurality of products, comprising computer readable media, is provided. Generally, the computer readable media comprises computer readable code for storing initial prices for a plurality of products, computer readable code for creating a demand model based on Bayesian modeling, computer readable code for designating a subset of products of the plurality of products, wherein the number of products in the subset of products is less than the number of products in the plurality of products, and computer readable code for optimizing prices for the subset of product, while maintaining the initial prices of products of the plurality of products that are not in the subset of products, where the optimization uses a grid method to determine the optimized prices.

In another embodiment of the invention, a method for setting prices for a subset of products of a plurality of products is provided. Optimized prices for a product category are received. Every item in the product category is priced according to the received optimized prices. New data is then provided. New prices for the subset of products of the product category are then received, where the subset is smaller than the product category, and where the received new prices are generated by storing initial prices for a plurality of products, designating a subset of products of the plurality of products, and where the number of products in the subset of products is less than the number of products in the plurality of products, and optimizing prices for products in the subset of products, while freezing the initial prices of products of the plurality of products in the product category that are not in the subset of products, where the optimization uses a grid method to determine the optimized prices. Prices for the subset of products are then set according to the received new prices.

In another embodiment of the invention, computer data signal embodied in a carrier wave and representing sequences of instructions which when executed by a processor, causes the processor to compute a preferred set of prices for a subset of a plurality of products is provided. Initial prices for a plurality of products are stored. A subset of products of the plurality of products is designated, where the number of products in the subset of products is less than the number of products in the plurality of products. Prices for products in the subset of products are optimized, while maintaining the initial prices of products of the plurality of products that are not in the subset of products, where the optimization uses a grid method to determine the optimized prices.

In another embodiment of the invention a price database is provided. Initial prices for a plurality of products are stored. A subset of products of the plurality of products is designated, where the number of products in the subset of products is less than the number of products in the plurality of products. Prices for products in the subset of products are optimized, while maintaining the initial prices of products of the plurality of products that are not in the subset of products, where the optimization uses a grid method to determine the optimized prices.

In another embodiment of the invention, a method for obtaining optimized price data on a client system is provided. Sales data is sent to a server system for a plurality of products. Optimization preferences are selected. The optimization preferences are sent to the server system. Optimization prices for all of the plurality of products are received from the server system. Additional sales data is sent to the server system. A subset constraint is selected. The subset constraint is sent to the server system. A new set of optimization prices for a subset of the plurality of products is received, where the number of products in the subset is less than the number of the plurality of products, where the optimization uses a grid method to determine the optimized prices.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

I. Overall System

Figure 1:
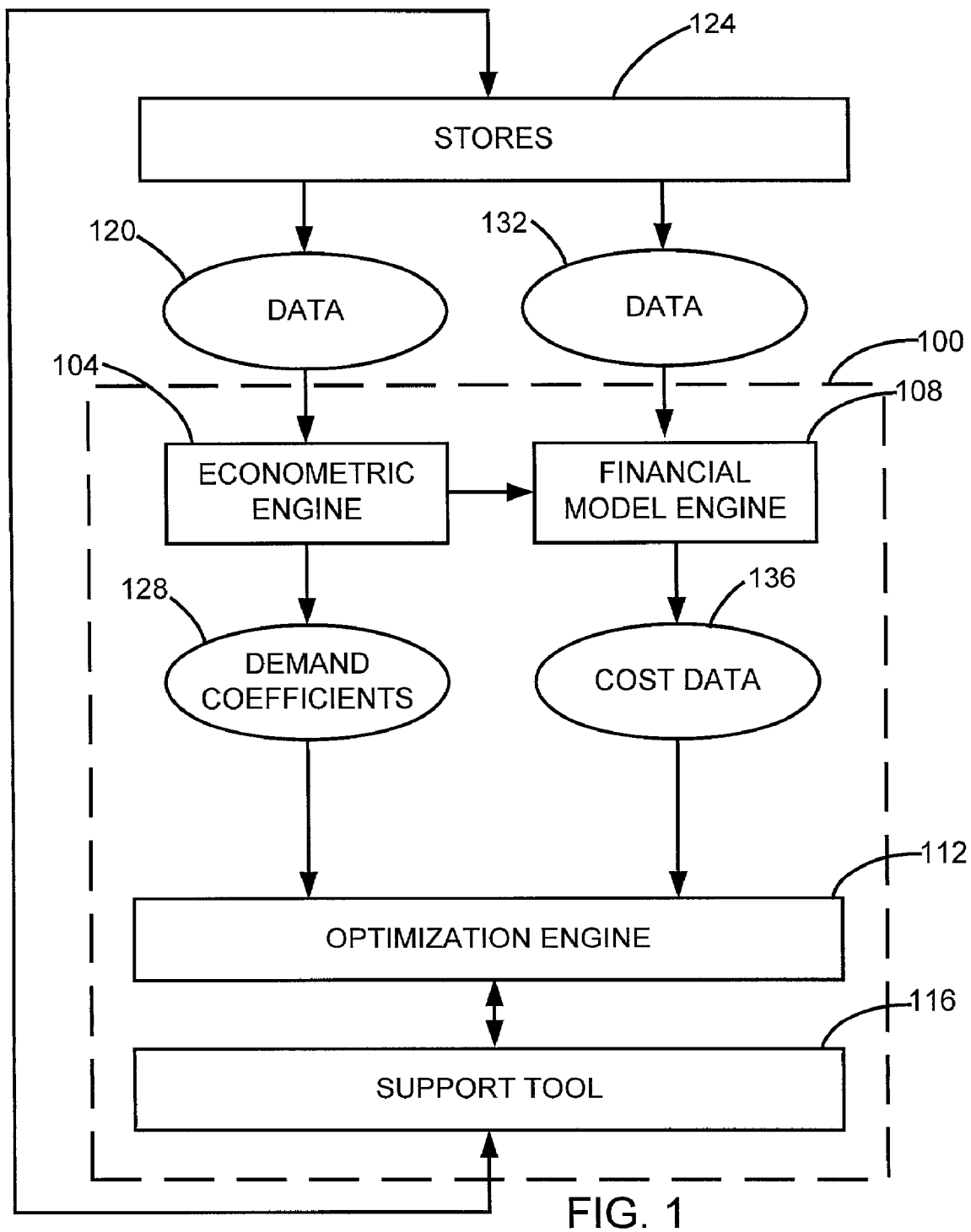
FIG. 1 is a high level schematic view of an embodiment of a price optimizing system.

To facilitate discussion, FIG. 1 is a schematic view of a price optimizing system 100. The price optimizing system 100 comprises an econometric engine 104, a financial model engine 108, an optimization engine 112, and a support tool 116. The econometric engine 104 is connected to the optimization engine 112, so that the output of the econometric engine 104 is an input of the optimization engine 112. The financial model engine 108 is connected to the optimization engine 112, so that the output of the financial model engine 108 is an input of the optimization engine 112. The optimization engine 112 is connected to the support tool 116 so that output of the optimization engine 112 is provided as input to the support tool 116 and output from the support tool 116 may be provided as input to the optimization engine 112. The econometric engine 104 may also exchange data with the financial model engine 108.

Figure 2:
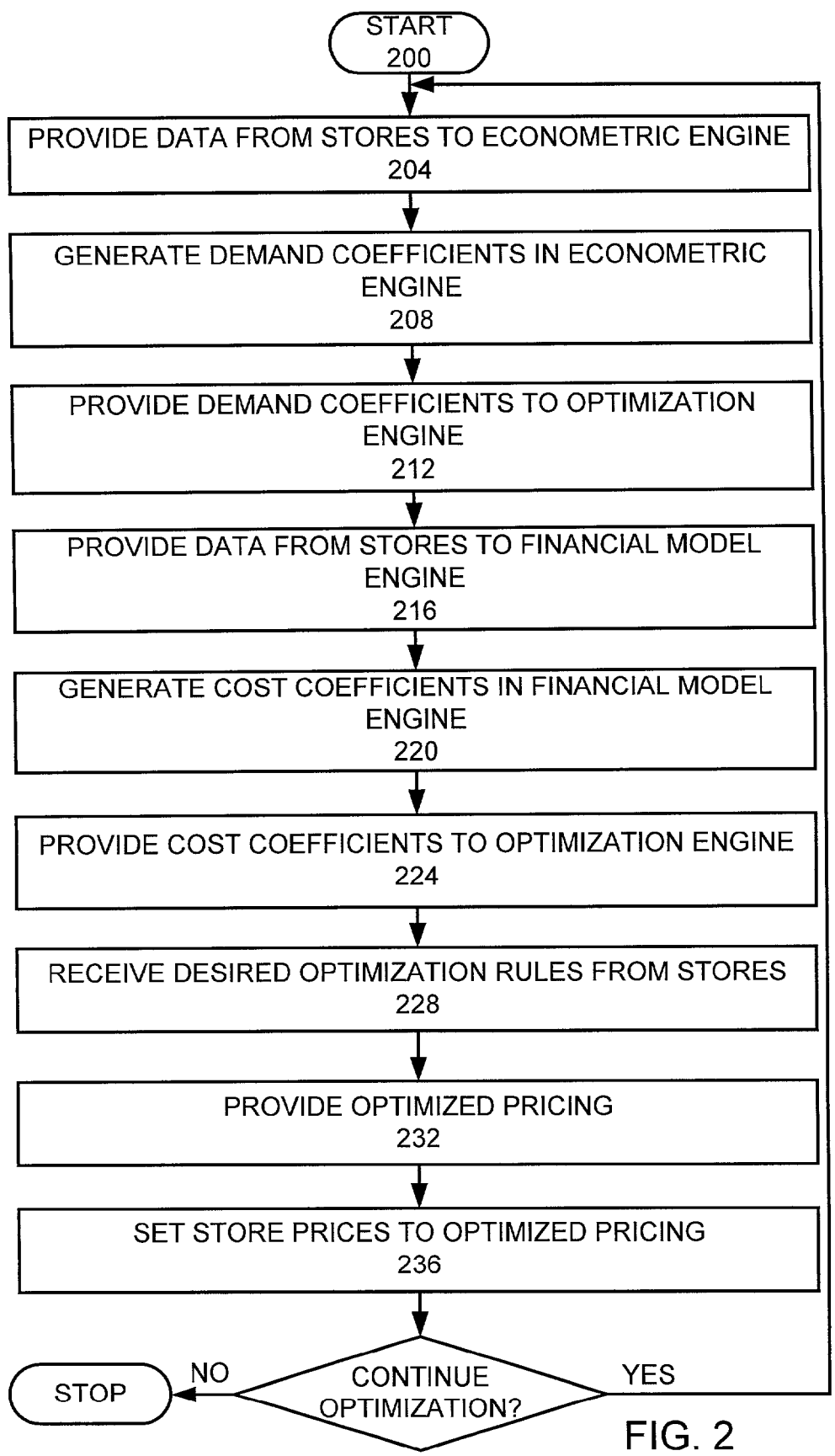
FIG. 2 is high level flow chart of a price optimization process.

FIG. 2 is a high level flow chart of a process that utilizes the price optimizing system 100. The operation of the optimizing system 100 will be discussed in general here and in more detail further below. Data 120 is provided from the store computer systems 124 to the econometric engine 104 (step 204). Generally, the data 120 provided to the econometric engine 104 may be point-of-sale information, product information, and store information. The econometric engine 104 processes the data 120 to provide demand coefficients 128 (step 208) for a set of algebraic equations that may be used to estimate demand (volume sold) given certain marketing conditions (i.e. a particular store in the chain), including a price point. The demand coefficients 128 are provided to the optimization engine 112. Additional processed data from the econometric engine 104 may also be provided to the optimization engine 112. The financial model engine 108 may receive data 132 from the stores 124 (step 216) and processed data from the econometric engine 104. The data 132 received from the stores is generally cost related data, such as average store labor rates, average distribution center labor rates, cost of capital, the average time it takes a cashier to scan an item (or unit) of product, how long it takes to stock a received unit of product and fixed cost data. The financial model engine 108 may process the data to provide a variable cost and fixed cost for each unit of product in a store. The processing by the econometric engine 104 and the processing by the financial model engine 108 may be done in parallel. Cost data 136 is provided from the financial model engine 108 to the optimization engine 112 (step 224). The optimization engine 112 utilizes the demand coefficients 128 to create a demand equation. The optimization engine is able to forecast demand and cost for a set of prices to calculate net profit. The stores 124 may use the support tool 116 to provide optimization rules to the optimization engine 112 (step 228). The optimization engine 112 may use the demand equation, the variable and fixed costs, and the rules to compute an optimal set of prices that meet the rules (step 232). For example, if a rule specifies the maximization of profit, the optimization engine would find a set of prices that cause the largest difference between the total sales and the total cost of all products being measured. If a rule providing a promotion of one of the products by specifying a discounted price is provided, the optimization engine may provide a set of prices that allow for the promotion of the one product and the maximization of profit under that condition. In the specification and claims the phrases "optimal set of prices" or "preferred set of prices" are defined as a set of computed prices for a set of products where the prices meet all of the rules. The rules normally include an optimization, such as optimizing profit or optimizing volume of sales of a product and constraints such as a limit in the variation of prices. The optimal (or preferred) set of prices is defined as prices that define a local optimum of an econometric model which lies within constraints specified by the rules. When profit is maximized, it may be maximized for a sum of all measured products. Such a maximization, may not maximize profit for each individual product, but may instead have an ultimate objective of maximizing total profit. The optimal (preferred) set of prices may be sent from the optimization engine 112 to the support tool 116 so that the stores 124 may use the user interface of the support tool 116 to obtain the optimal set of prices. Other methods may be used to provide the optimal set of prices to the stores 124. The price of the products in the stores 124 is set to the optimal set of prices (step 236), so that a maximization of profit or another objective is achieved. Each component of the price optimizing system 100 will be discussed separately in more detail below.

II. Econometric Engine

Figure 3:
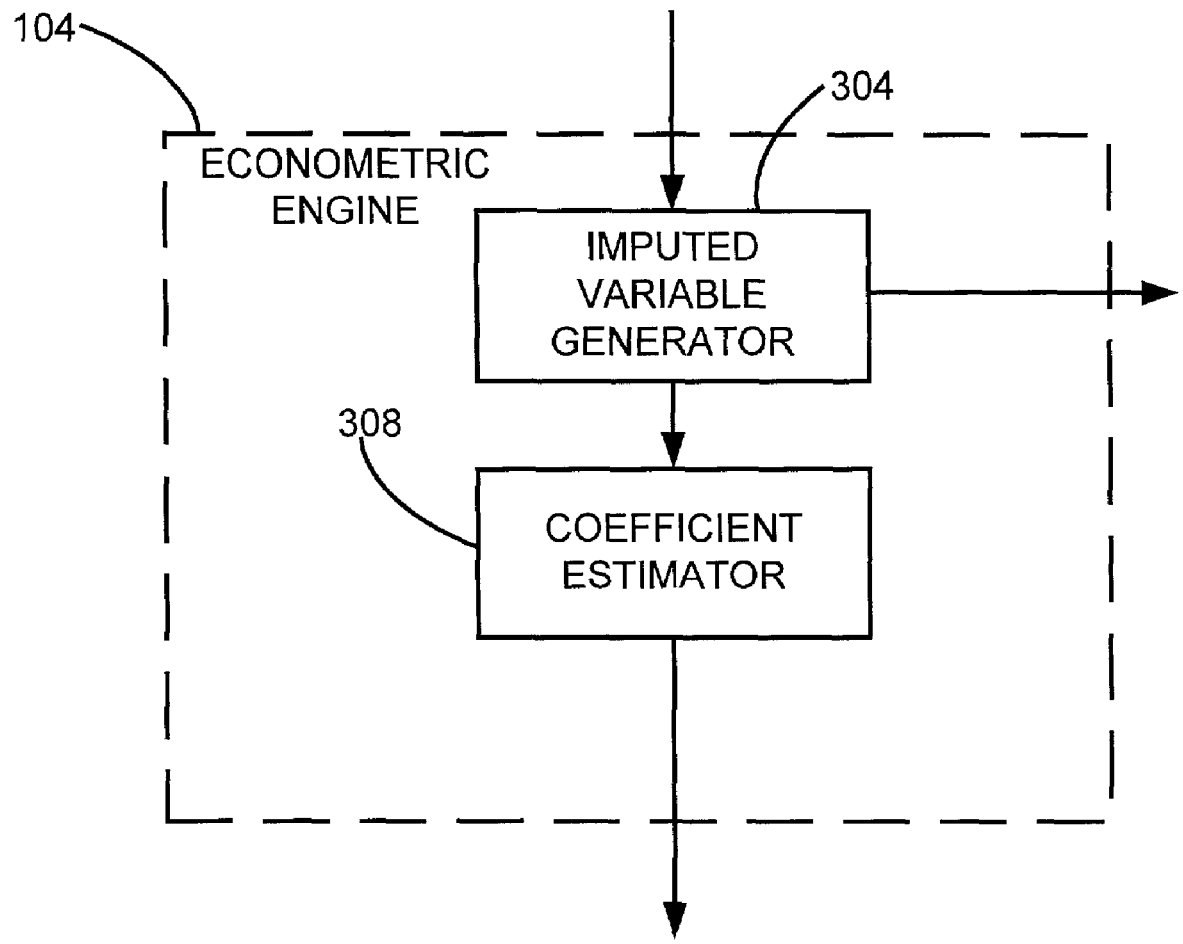
FIG. 3 is a more detailed schematic view of an econometric engine.

FIG. 3 is a more detailed view of the econometric engine 104. The econometric engine comprises an imputed variable generator 304 and a coefficient estimator 308. The data 120 from the stores 124 is provided to the imputed variable generator 304. The data 120 may be raw data generated from cash register data, which may be generated by scanners used at the cash registers.

A. Imputed Variable Generator

The present invention provides methods, media, and systems for generating a plurality of imputed econometric variables. Such variables are useful in that they aid businesses in determining the effectiveness of a variety of sales strategies. In particular, such variables can be used to gauge the effects of various pricing or sales volume strategies.

Figure 10:
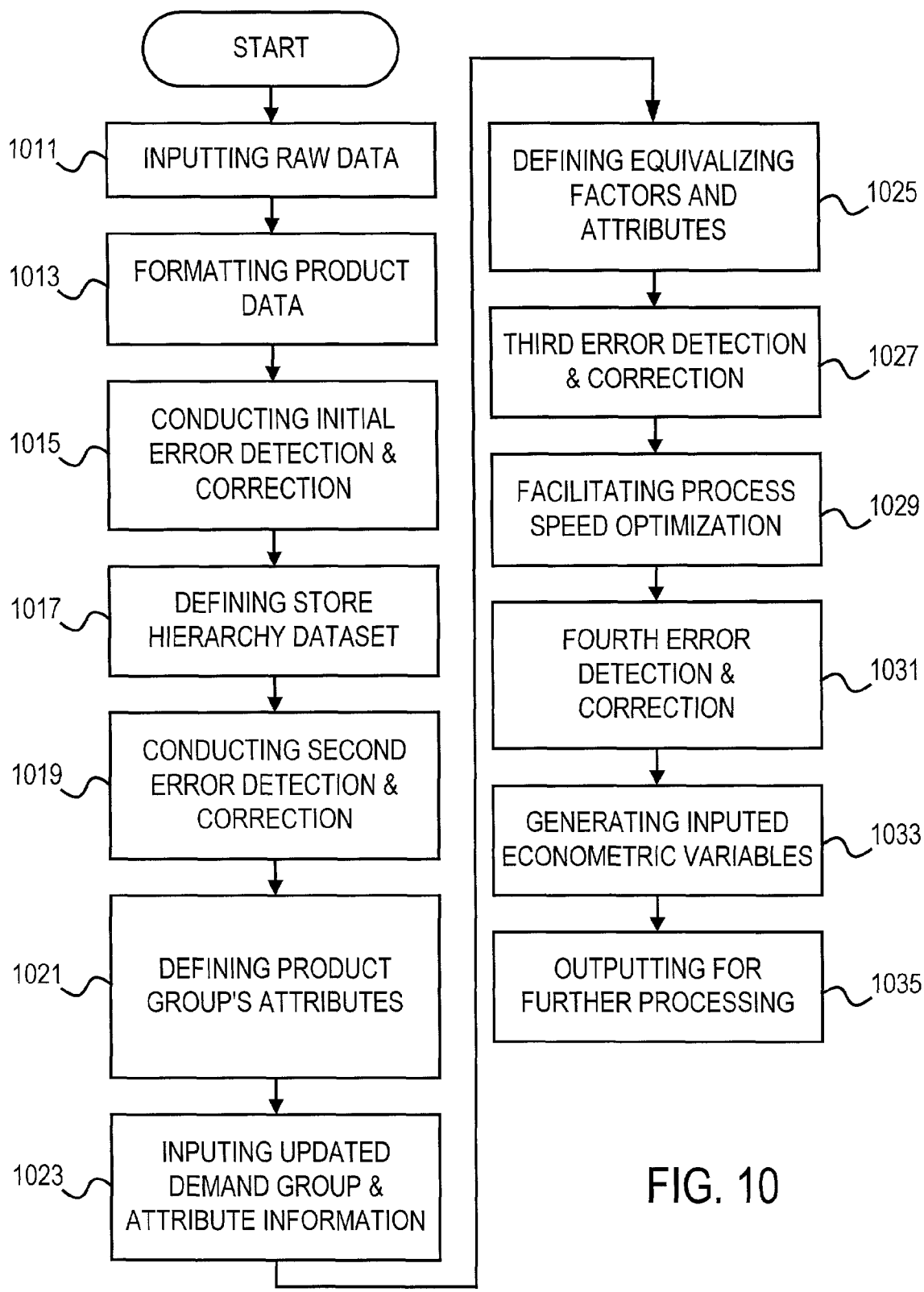
FIG. 10 is a flow chart depicting a process flow by which raw econometric data can be input, subject to "cleansing", and used to create an initial dataset which can then be used to generate imputed econometric variables in accordance with a preferred embodiment of the present invention.

FIG. 10 illustrates a flowchart 1000 which describes steps of a method embodiment for data cleansing imputed econometric variable generation in accordance with the principles of the present invention. The process, generally described in FIG. 10, begins by initial dataset creation and data cleaning (Steps 1011-1031). This data set information is then used to generate imputed econometric variables (Step 1033) which can be output to and for other applications (Step 1035).

1. Initial Dataset Creation And Cleaning

The process of dataset creation and cleaning (that is to say the process of identifying incompatible data records and resolving the data incompatibility, also referred to herein as "error detection and correction") begins by inputting raw econometric data (Step 1011). The raw econometric data is then subject to formatting and classifying by UPC designation (Step 1013). After formatting, the data is subject an initial error detection and correction step (Step 1015). Once the econometric data has been corrected, the store information comprising part of the raw econometric data is used in defining a store data set hierarchy (Step 1017). This is followed by a second error detecting and correcting step (Step 1019). This is followed by defining a group of products which will comprise a demand group (i.e., a group of highly substitutable products) and be used for generating attribute information (Step 1021). Based on the defined demand group, the attribute information is updated (Step 1023). The data is equivalized and the demand group is further classified in accordance with size parameters (Step 1025). The demand group information is subjected to a third error detection and correction step (Step 1027). The demand group information is then manipulated to facilitate decreased process time (Step 1029). The data is then subjected to a fourth error detection and correction step (Step 1031), which generates an initial cleansed dataset. Using this initial cleansed dataset, imputed econometric variables are generated (Step 1033). Optionally, these imputed econometric variables may be output to other systems for further processing and analysis (Step 1035).

The process begins by inputting raw econometric data (Step 1011). The raw econometric data is provided by a client. The raw econometric data includes a variety of product information. The raw econometric data must specify the store from which the data is collected, the time period over which the data is collected and include a UPC (Universal Product Code) for the product, and provide a UPC description of the product. Also, the raw econometric data must include product cost (e.g., the wholesale cost to the store), number of units sold, and either unit revenue or unit price. Ordinarily, the UPC description also identifies the product brand, UOM (Unit of Measure), and product size. Such information can be very detailed or less so. For example, brand can simply be Coca-Cola®, or more detailed e.g., Cherry Coca-Cola®. A UOM is, for example, ounces (oz.), pound (lb.), liter (ltr), or count (CT). Size reflects the number of UOM's e.g., eight (8) oz or two (2) ltr. Also, the general category of product or department identification is input. A category is defined as a set of substitutable or complementary products, for example, "Italian Foods". Such categorization can be proscribed by the client, or defined by generally accepted product categories. Additionally, such categorization can be accomplished using look-up tables or computer generated product categories.

Also, a more complete product descriptor is generated using the product information described above and, for example, a UPC description of the product and/or a product description found in some other look-up table (Step 1013). This information is incorporated into a product format. This product format provides a more complete picture of the product, but this information is stored in a separate database which is not necessarily processed using the invention. This information provides a detailed description of the product which can be called up as needed.

The data is then subjected to a first error detection and correction process (Step 1015). Typically, this step includes the removal of all duplicate records and the removal of all records having no match in the client supplied data (typically scanner data). An example of records having no match is records that appear for products that the client does not carry or stock in its stores. These records are detected and deleted.

Data subsets concerning store hierarchy are defined (Step 1017). This means stores are identified and categorized into various useful subsets. Typical subsets include (among other categorizations) stores segregated by, for example, zip codes, cities, states, specific geographical regions, rural environs, urban environs, associations with other stores (e.g., is this store part of a mall) or categorized by specific stores. A wide variety of other subsets may also be used. These subsets can be used to provide information concerning, among other things, regional or location specific economic effects.

The data is then subjected to a second error detection and correction process (Step 1019). This step cleans out certain obviously defective records. Examples include, but are not limited to, records displaying negative prices, negative sales volume, or negative cost. Records exhibiting unusual price information are also removed. Such unusual prices can be detected using cross store price comparisons (between similarly situated stores), for example, an average price for a product in the stores of a particular geographic region can be determined by averaging the prices for all such products sold in the subject stores. The standard deviation can also be calculated. Prices that lie at greater than, for example, two (2) standard deviations from the mean price will be treated as erroneous and such records will be deleted. These tools can be applied to a variety of product parameters (e.g., price, cost, sales volume).

This is followed by defining groups of products and their attributes and exporting this information to a supplementary file (e.g., a text file) (Step 1021). This product information can then be output into a separate process which can be used to define demand groups or product attributes. For example, this supplemental file can be input into a spreadsheet program (e.g., Excel®) which can use the product information to define "demand groups" (i.e. groups of highly substitutable products). Also, further product attribute information can be acquired and added to the supplementary file. Such attributes can comprise, for example, branding information, manufacturer, size, flavor or form (e.g., cherry soda) just to name a few. Such information can be gleaned from multiple sources e.g., UPC product catalogues, the client, product look-up tables, or other sources. The advantage of such supplementary files is that they maintain complete product information (including information not required by the processes of the present invention) which can be accessed when needed. In addition, updated demand group and attribute information can then be input as received (Step 1023). By maintaining a supplementary file containing large amounts of data, a more streamlined (abbreviated) dataset may be used in processing. This effectively speeds up processing time by deleting non-critical information from the dataset.

The data is further processed by defining an "equivalizing factor" for the products of each demand group in accordance with size and UOM parameters (Step 1025). This equivalizing factor can be provided by the client or imputed. An example of determining an imputed equivalizing factor follows. Product size and UOM information are obtained, for example, from the product description information. Typical examples of such size and UOM information are 20 oz. (ounce), 6 CT (count), or 1 ltr (liter). A further advantageous aspect of the present invention is that, even if such size or UOM information is incomplete or not provided, it can also be imputed. An equivalizing factor can be imputed by using, for example, the median size for each UOM. Alternatively, some commonly used arbitrary value can be assigned. Once this information is gathered, all product prices and volume can be "equivalized". In one example, a demand group (a group of highly substitutable products) is chosen having, for example, "soft drinks" as its subject category. And by further example, the soft drink product comes in 8, 12, 16, 24, 32, and 64 ounce sizes. The median size (or for that matter, any arbitrarily determined size) can then be used as the base size to which all other sizes are to be equivalized. For example, using the 8, 12, 16, 24, 32, and 64-ounce sizes discussed above, an arbitrary base size can be determined as, for example, 24 ounces. Then the 24-ounce size is determined as the equivalizing factor. Some of the uses of the equivalizing factors are detailed in the discussions below. Chiefly, the purpose of determining an equivalizing factor is to facilitate comparisons between different size products in a demand group. For example, if 16 is determined as the equivalizing factor for the above group of soft drinks, then an 8 oz. soft drink is equivalized to one half of a 16 oz. unit. In a related vein, a 32 oz. soft drink is equivalized to two (2) 16 oz. units.

Additionally, size information can be used to define further product attributes. For example, if the size is in the bottom tertile of sizes for that product, it will be classified as "Small" size. Correspondingly, if the size is in the middle tertile of sizes for that product, it will be classified as "Medium" size, and if the size is in the top tertile of sizes for that product, it will be classified as "Large" size. Such categorization can define product attributes such as small (8- and 12-ounce sizes), medium (16- and 24-ounce sizes), and large (32- and 64-ounce sizes) sizes.

The data is then subjected to a third error detection and correction process, which detects the effects of closed stores and certain other erroneous records (Step 1027). Keeping in mind that one advantage of the present invention is that very little client input is required to achieve accurate results, the inventors contemplate error correction without further input (or very little input) from the client. In accord with the principles of the invention, stores that demonstrate no product movement (product sales equal to zero) over a predetermined time period are treated as closed. Those stores and their records are dropped from the process. In a preferred embodiment, the predetermined time period is three (3) months.

With continued reference to FIG. 10, Step 1027, the third error detection and correction also includes analysis tools for detecting the presence of erroneous duplicate records. The data is examined, in particular checking records for, date, product type, store at which the product was sold (or just "store"), price, units (which refers variously to units sold or unit sales volume), and causal variables. Causal variables are those factors which influence sales volume (a variable which can cause an increase in product sales e.g., coupons, sales promotion ads, sale prices, sale price on some complementary product, enhanced sales displays, more advantageous sales location within a store, etc.). Analysis is performed to remove the discrepant records such that only one of the records is kept as part of the analyzed data and that causal information for a particular time period is recorded.

Using the following illustrative table:

| Record Number | Date | Store | Product | Units | Price | Causal Variable |
| --- | --- | --- | --- | --- | --- | --- |
| 1 | Dec. 5 | Y | D | 10 | 1.99 | 1 |
| 2 | Dec. 5 | Y | D | 10 | 1.99 | 1 |
| 3 | Dec. 12 | Y | D | 10 | 1.99 | 1 |
| 4 | Dec. 12 | Y | D | 15 | 1.89 | 2 |
| 5 | Dec. 19 | Y | D | 12 | 1.99 | 1 |
| 6 | Dec. 26 | Y | D | 9 | 1.99 | 1 |

For example, using record #1, the date of record is December 5, the store is store "Y", the product is product type "D", units sold for that date are 10 at a price of 1.99. The causal variable is usually abbreviated with a code symbol (e.g., numbers). Here, "1" is a symbol for no causal variable, i.e., normal sales conditions. Whereas, examining, for example, record #3 includes a causal variable (code symbol 2) which, for example, will represent an advertisement concerning product "D".

Discrepant records are identified and corrected. For example, if two records have the same exact values (such as record #1 and record #2), it is assumed that one such record is an erroneous duplicate and only one record is kept as part of the analyzed dataset, for example, only record #1 is retained.

If two records with the same date, product id, and store id have multiple records with different causals, they are combined into a single record, with the two prices maintained in separate dataset variables, units summed across the two records, and the causal variables representing something other than a normal state being represented by new dataset variables.

The following table shows an updated version of the above table. Record 2 was deleted because it is identical to Record 1. Records 3 and 4 were combined into a single record (i.e., combined into a single Record 3) with new causal variables defined for Advertisement and Advertisement Price. Records 5 and 6 did not change because there was no duplicate information.

| Record Number | Date | Store | Product | Units | Regular Price | Advertisement | Advertisement Price |
| --- | --- | --- | --- | --- | --- | --- | --- |
| 1 | Dec. 5 | Y | D | 25 | 1.99 | No | — |
| 3 | Dec. 12 | Y | D | 25 | 1.99 | Yes | 1.89 |
| 5 | Dec. 19 | Y | D | 12 | 1.99 | No | — |
| 6 | Dec. 26 | Y | D | 9 | 1.99 | No | — |

A further correction can be made for records having the same date and causal value but have differing prices or differing number of units sold. First, a data discrepancy must be detected. For example, if a record on a specific date in the same store for the same product and causal state has two different values for units, this is a discrepancy. Correction can be accomplished by, first calculating the average number of units sold over all dates in the modeled time interval. The discrepant records are compared with the average value. The record having the unit value closest to the calculated average units is kept and the other is discarded. The same general process can be followed for records having discrepancies as to price (i.e., the record having the price closest to average price is kept). If both price and units are determined to have a discrepancy, the record having the price and unit values closest to the average price and average units is kept.

After all the duplicate records eliminated, the data is reconstructed. The data can be reviewed again to insure all duplicates are removed. Optionally, an output file including all discrepancies can be produced. In the event that it becomes necessary, this output file can be used as a follow-up record for consulting with the client to confirm the accuracy of the error detection and correction process.

Additionally, reduced processing times may be achieved by reformatting the data (Step 1029). For example, groups of related low sales volume products (frequently high priced items) can optionally be aggregated as a single product and processed together. Additionally, the data may be split into conveniently sized data subsets defined by a store or groups of stores which are then processed together to shorten the processing times. For example, all stores in the state of California can be processed together, then all the stores in Texas, etc.

Next the process includes determining the nature of missing data records in a fourth error detection and correction step (Step 1031). The missing data records are analyzed again before finally outputting a cleansed initial dataset. For example, data collected over a modeled time interval is analyzed by introducing the data into a data grid divided into a set of time periods. The time periods can be preset, computer determined, or user defined. The time periods can include, but are not limited to, months, weeks, days, or hours. One preferred embodiment uses time periods of one week. The data grid so constructed is analyzed. For the time periods (e.g., weeks) having no records a determination must be made. Is the record missing because:

a. there were no sales that product during that week (time period);

b. the product was sold out and no stock was present in the store during that time period (this situation is also referred to herein as a "stock-out');

c. the absence of data is due to a processing error.

Figure 11:
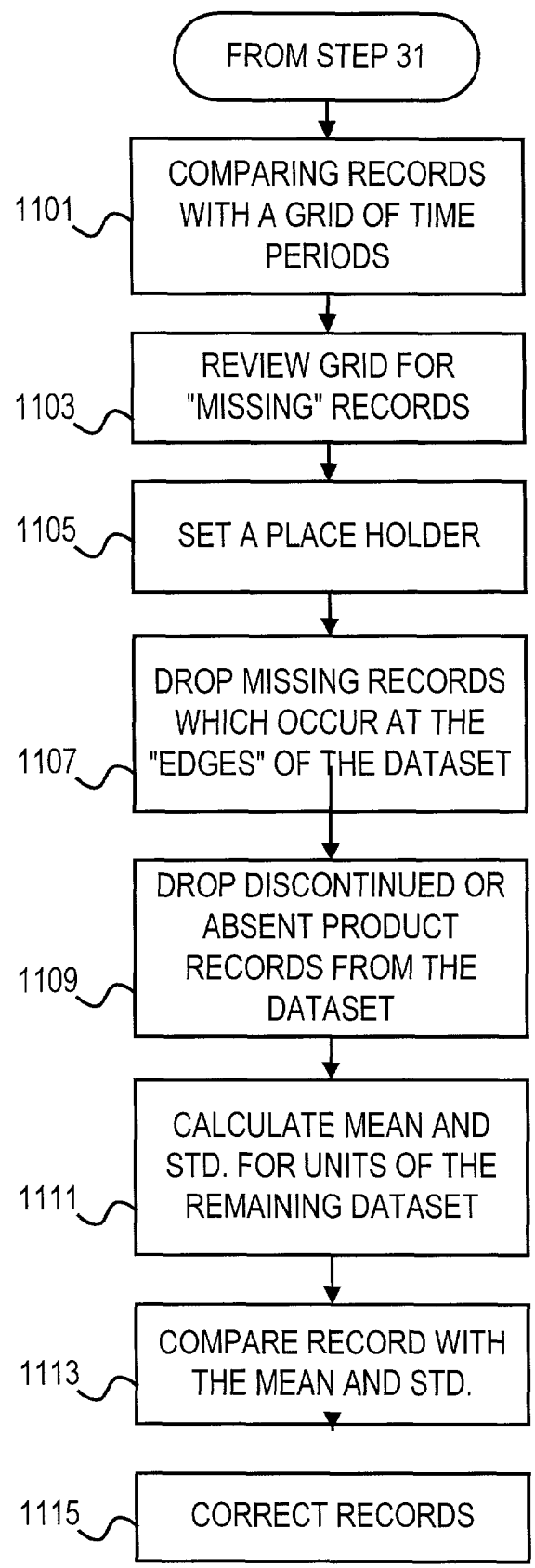
FIG. 11 is a flow chart depicting a process flow by which partially cleansed econometric data is subject to further error detection and correction in accordance with a preferred embodiment of the present invention.

FIG. 11 depicts a process flow embodiment for determining the nature of missing data records in a fourth error detection and correction step in accordance with the principles of the present invention. The records are compared to a grid of time periods (Step 1101). The grid is reviewed for missing records with respect to a particular store and product (Step 1103). These missing records are then marked with a placeholder (Step 1105). Missing records at the "edges" of the dataset do not significantly affect the dataset and are deleted (Step 1107). Records for discontinued products or products recently introduced are dropped for those time periods where the product was not carried in the Store (Step 1109). The remaining dataset is processed to determine an average value for units (sold) and a STD for units (Step 1111). Each missing record is compared to the average units (Step 1113) and based on this comparison, a correction can be made (Step 1115).

Referring again to FIG. 11, in Step 1101, the data records are matched with a grid of time periods (shown here as weeks, but which can be any chosen time period). The grid can cover an entire modeled time interval, for example, as shown below, the six weeks January 7-February 14 (shown here as weeks 1, 2, 3, 4, 5, and 6). Each product in each store (here store "Z") is gridded this way. For example:

| Grid | Date | Store | Product | Units | Price |
|---|---|---|---|---|---|
| 1 | 1/7 | Z | Y | 10 | 1.99 |
| 2 | 1/14 | Z | Y | 12 | 2.19 |
| 3 | | | | | |
| 4 | 1/28 | Z | Y | 8 | 1.99 |
| 5 | 2/7 | Z | Y | 10 | 1.99 |
| 6 | | | | | |

Review of the grid (Step 1103) shows that records are "missing" for dates January 21 and Febrauary 14 (i.e., grid 3 and grid 6). Placeholders are set in the records defined by grid 3 and grid 6 (Step 1105). For example, an easily detectable or arbitrarily large value can be put in the price column of the grid, e.g. 999. Alternatively, a simple X can be placed as a placeholder in the price column. In the present example, "X's" can be placed in the price columns of grid 3 and grid 6.

If the first or last grid in the dataset (here grid 1 or grid 6) has few or no observations, those records are deleted from the dataset (Step 1107). For purposes of the above analysis, a grid having "few" observations is defined as a grid having 50% fewer observations than is normal for the grids in the middle of the dataset. Here, for example, the record for grid 6 (the last week) is deleted because no records are present for that week. Also, using client-supplied stocking information, products which have been discontinued during the modeled time interval do not have their grids filled out for the discontinued time period (Step 1109). Also, products which are introduced during the modeled time interval have their time grid filled out only for those time periods occurring after the product introduction date. Thus, certain data aberrations are removed from the modeled dataset, permitting more accurate modeling.

The mean units (sold) and the STD for units are then calculated (Step 1111). For example, in dataset depicted above, the mean is 10 units. The missing record is then compared with the mean value (Step 1113). Here, a missing record (grid 3) is assigned an initial unit value=0. If the value of zero units lies within one (1) STD of the calculated mean, it is assumed that an actual value of zero units is feasible and that record is treated as if the record is valid (unit volume=0). However, if zero lies at greater than one STD from the mean, it is assumed that the value of zero units is due to a "stock-out". In such case, it is assumed that had product been present in the store an average number of units would have been sold. Therefore, the zero unit value for that record is replaced by a unit value equal to the calculated mean unit value, thereby correcting for the "stock-out". In this case, units for grid 3 will be corrected to calculated mean units (i.e., 10).

The product histories of the dataset can also be examined. If the subject product was introduced or discontinued as a salable item at the subject store during the modeled time interval, the grid is not filled out (with either zero or average values) for those time periods where the product was not offered for sale in the subject store. In this way missing records do not corrupt the dataset.

Further aspects of the fourth error detection and correction include a detection and elimination of outlying price data points (outliers). A satisfactory way of accomplishing this begins with a calculation of the mean price for each product within a given store, as determined over the modeled time interval. Once a mean price and STD are determined, all price data for the modeled time interval is examined. If it is determined that a price record lies within three (3) STD from the mean price it is deemed accurate and not an outlier. However, prices lying outside three (3) STD are treated as outliers. These outliers are assigned adjusted prices. The adjusted prices have the value of the immediately preceding time period (e.g., the previous day's or week's price for that product within the store). This adjusted price data is again checked for outliers (using the original mean and STD). Again, outliers are checked against the original mean and STD and again price adjusted if necessary. This usually removes all the remaining outliers. However, the process may optionally continue, iteratively, until there are no further outliers.

The net result of execution of the process Steps 1011-1031 disclosed hereinabove is the generation of a cleansed initial dataset which can be used for its own purpose or input into other econometric processes. One such process is the generation of imputed econometric variables.

2. Generation of Imputed Econometric Variables

The foregoing steps (1011-1031) concern cleansing the raw econometric data to create an error detected and error corrected ("cleansed") initial dataset. The cleansed initial dataset created in the foregoing steps can now be used to generate a variety of useful imputed econometric variables (Step 1033). These imputed econometric variables are useful in their own right and may also be output for use in further processing (Step 1035). One particularly useful application of the imputed econometric variables is that they can be input into an optimization engine which collects data input from a variety of sources and processes the data to provide very accurate economic modeling information.

a. Imputed Base Price

Figure 12A:
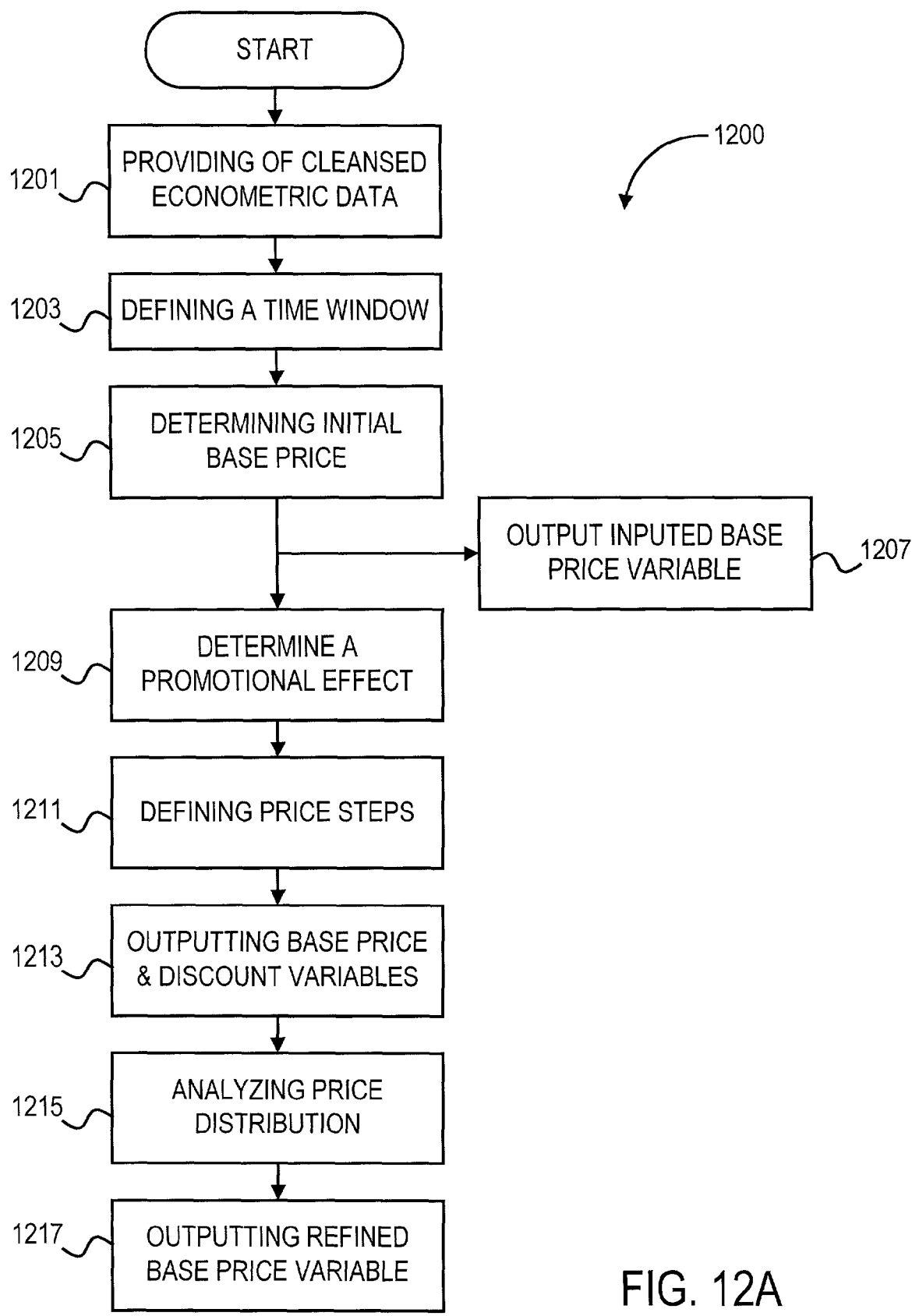
FIG. 12A is a flow chart depicting a process flow by which an imputed base price variable can be generated in accordance with one embodiment of the present invention.

One imputed econometric variable that can be determined using the initial dataset created in accordance with the forgoing, is an imputed base price variable (or base price). FIG. 12A is a flowchart 1200 outlining one embodiment for determining the imputed base price variable. The process begins by providing the process 1200 with a "cleansed" initial dataset (Step 1201), for example, the initial dataset created as described in Steps 1011-1031 of FIG. 10. The initial dataset is examined over a defined time window (Step 1203). Defining a time window (Step 1203) includes choosing an amount of time which frames a selected data point allowing one to look forward and backward in time from the selected data point which lies at the midpoint in the time window. This is done for each data point in the dataset, with the time window being defined for each selected data point. The time frame can be user selected or computer selected. The time window includes T time periods and the time period for the selected data point. One preferred set of T time periods is eight (8) weeks. It is contemplated that time windows of greater or lesser size can be selected. Referring to a preferred example, the selected (or current) data point is centered in the time window having T/2 time periods before the selected data point and T/2 time periods after the selected data point. In the present example, the time window includes the four weeks preceding the selected data point and the four weeks after the selected data point.

Figure 12B:
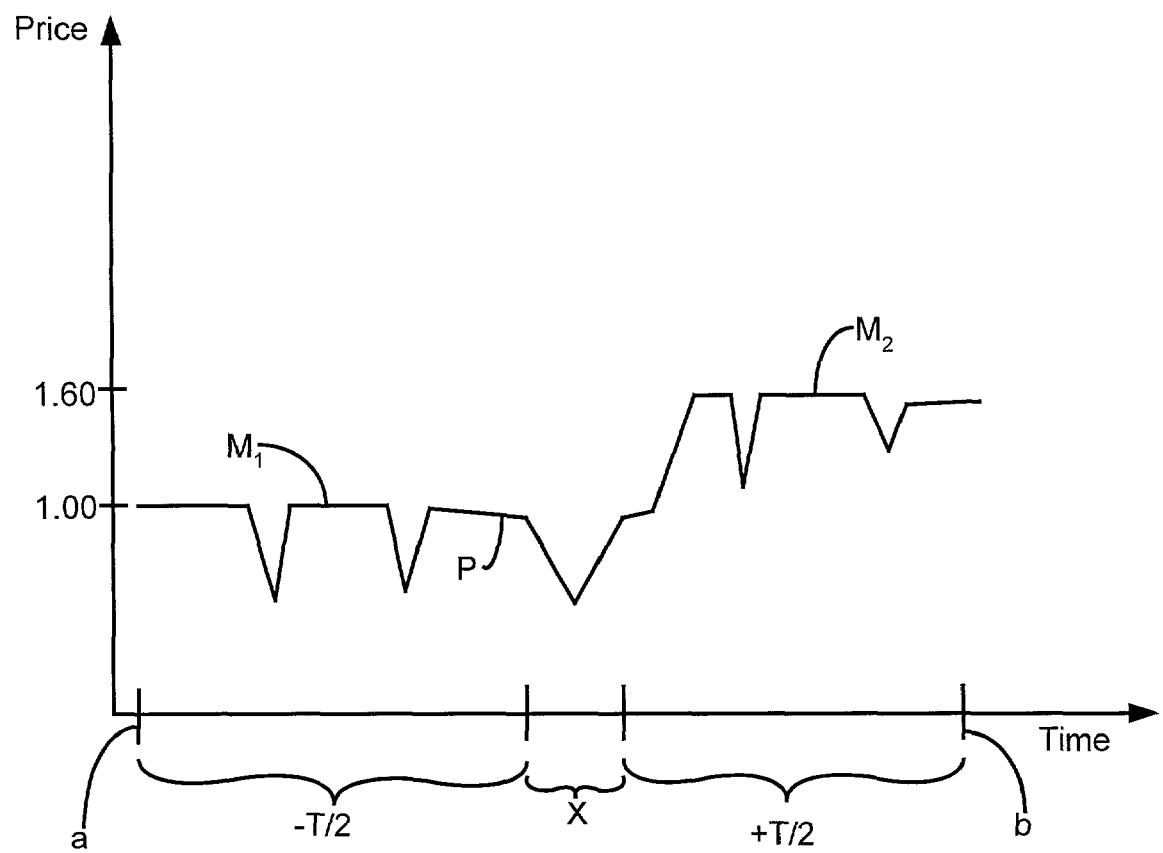
FIG. 12B is a price time diagram which illustrates an aspect of generating an imputed base price variable in accordance with one embodiment of the present invention.

Referring to FIG. 12B, the selected data point "X" (shown as a single week) is framed by a time period of −T/2 (shown here as 4 weeks) before the data point "X" and a time period of +T/2 (shown here as 4 weeks) after the data point "X". The time window comprising all the time (i.e., −T/2, X, T/2) between points a and b.

Referring again to FIG. 12A, once the time window is defined, an "initial base price" is determined (Step 1205). This can be accomplished by the following process. With reference to FIG. 12B, two price maxima are determined ($M_1$, $M_2$), one for each of the T/2 time periods before and after the current data point. The lesser value of the two maxima (here $M_1$) comprises the initial base price. The actual price (in selected data point "X") is compared with this initial base price (here, $M_i$). If initial base price is higher than the actual price (as shown in the pictured example), then the "initial base price" is reset to reflect the price for the previous time period. In the pictured example, the lesser maxima $M_1$ is $1.00, the actual price during the data point "X" is less than $1.00 so the initial base price is reset to the price of the previous time period "P" (here $1.00).

Alternatively, the initial base price can be determined using other methods. For example, the average price of the product over the −T/2 time period (4 weeks) preceding the data point X may be used as the initial base price. Whatever method used, the initial base price is generated for each time period of the modeled time interval. One by one, each data point in the modeled time frame is examined and an initial base price is determined for each time period (e.g., "X") in the modeled time interval.

The initial base price values generated above provide satisfactory values for the imputed base price variable which may be output (Step 1207) and used for most purposes. However, optional Steps 1209-1217 describe an approach for generating a more refined imputed base price variable.

In generating a more refined imputed base price variable, the effect of promotional (or discount) pricing is addressed (Steps 1209-1217). This may be calculated by specifying a discount criteria (Step 1209); defining price steps (Step 1211); outputting an imputed base price variable and an imputed discount variable (Step 1213); analyzing the base price distribution (Step 1215); and outputting a refined base price variable (Step 1217).

Data records are evaluated over a series of time periods (e.g., weeks) and evaluated. The point is to identify price records which are discounted below a base price. By identifying these prices and not including them in a calculation of base price, the base price calculation will be more accurate. Therefore, a discount criterion is defined and input as a variable (Step 1209). A preferred criterion is 2%. Therefore, records having prices which are discounted 2% below the previously determined initial base price are treated as records having "promotional prices". These records are temporarily deleted from the dataset. The remaining records, having zero or small discounts, are treated as "non-promoted" records. So the price of each product for the "non-promoted" time periods (weeks) is averaged over all time periods (weeks) in the modeled time interval. The average non-promoted price is referred to as a base price.

Figure 12C:
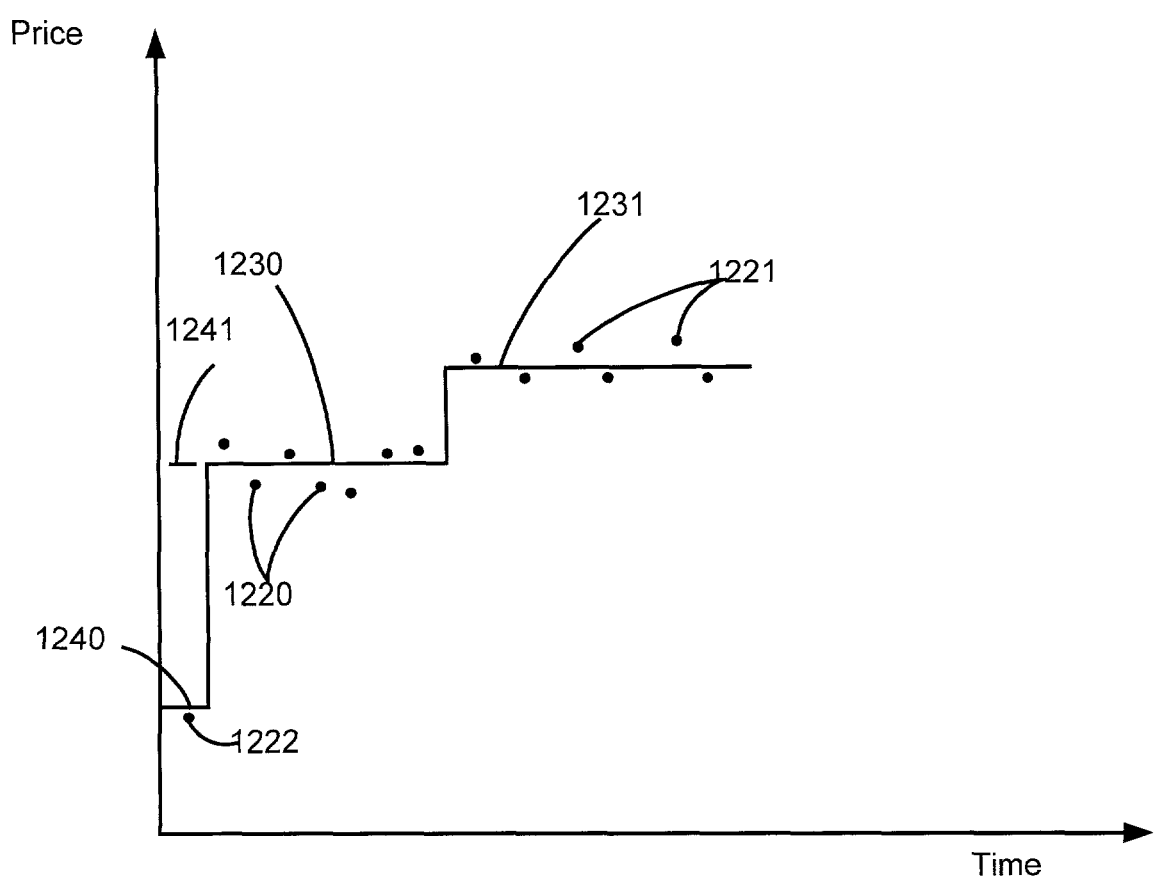
FIG. 12C is a price time diagram which illustrates an aspect of generating an imputed base price step function in accordance with one embodiment of the present invention.

Further analysis is used to define base price "steps" (Step 1211). This process can be more readily illustrated with references to FIG. 12C which shows a distribution of base price data points 1220, 1221, 1222 and their relationship to a projected step function 1230, 1231, 1240, 1241 plotted on a graph of price over time. Base price data points 1220, 1221, 1222 are evaluated. Steps 1230, 1231 are roughly defined such that the base price data points 1220, 1221 lie within a small percent of distance from the step 1230, 1231 to which they are associated (e.g., 2%). This can be accomplished using, for example, a simple regression analysis such as is known to those having ordinary skill in the art. By defining the steps 1230, 1231, the average value for base price over the step is determined. For example, price data points 1220 are averaged to determine the base price of step 1230. Also, price data points 1221 are averaged to determine the base price of step 1231. Thus, the average of the base prices in a step is treated as the refined base price for that step.

Further refining includes an analysis of the first step 1240. If the first step 1240 is short (along the time axis) and considerably lower than the next step 1230, it is assumed that the first step 1240 is based on a discounted price point 1222. As such, the value of the next step 1230 is treated as the base price for the time period of the first step 1241 (represented by the dashed line).

At this point, absolute discount ($\Delta P$) and base price (BP) are used to calculate percent discount ($\Delta P/BP$) for each store product time period. Percent discounts that are less than some value (e.g. 1%) are treated as being no discount and corrected to $\Delta P/BP=0$. The above determined base price variable and percent discount variable are then output (Step 1213).

This base price is subjected to further analysis for accuracy using cross-store checking (Step 1215). This can be accomplished by analyzing the base price data for each product within a given store. A curve is generated for each product. This curve defines the price distribution for each product. The $80^{th}$ percentile for base price is then calculated for the analyzed product (i.e., the base price point below which 80% of the analyzed product (over the modeled time interval) is priced). This is referred to as the "in store $80^{th}$ percentile" for that product. A calculation is then made of the average $80^{th}$ percentile for price of the analyzed product across all stores (the cross-store $80^{th}$ percentile). Each store's prices are then merged with each other store to calculate the average $80^{th}$ percentile for base price over all stores.

The stores are then analyzed product by product. If the base price for a store is greater than two (2) standard deviations from the cross-store average $80^{th}$ percentile for base price and if the in-store 80$^{th}$ store percentile is more than 50% different from the cross-store 80$^{th}$ percentile, this store is flagged as an outlier for the analyzed product.

| Store | Product | In Store 80$^{th}$ % | Cross-Store 80$^{th}$ % | Flagged |
|---|---|---|---|---|
| Y | A | 1.99 | 1.99 | No |
| Y | B | 2.09 | 1.99 | No |
| Y | C | 0.29 | 1.99 | Yes |
| Y | D | 1.89 | 1.99 | No |

Figure 12D:
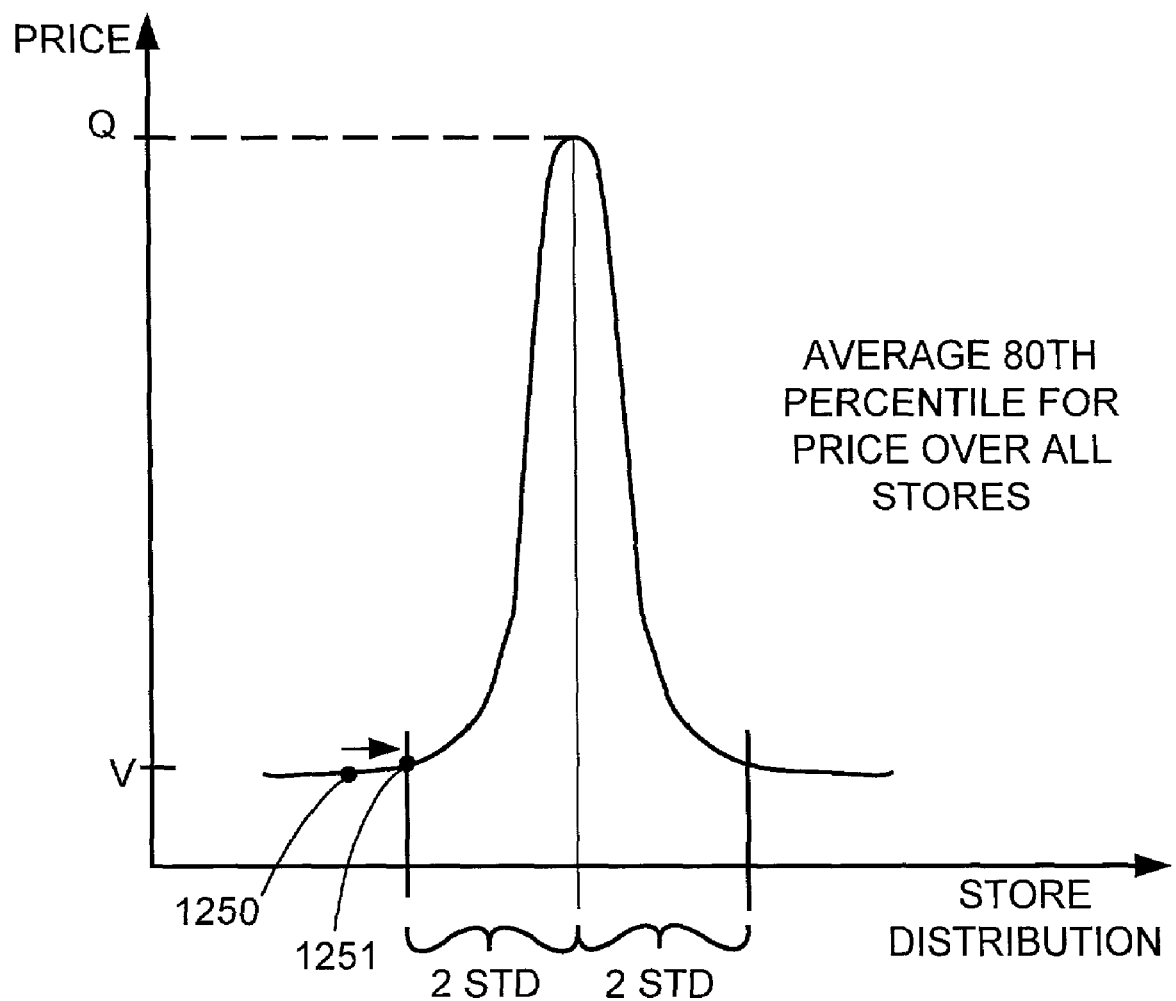
FIG. 12D is a diagram which illustrates an error correction aspect of base price imputation in accordance with one embodiment of the present invention.

The outlier store's base price is adjusted for the analyzed product such that it lies only two (2) standard deviations away from the average cross-store 80$^{th}$ percentile for base price over all stores. This is illustrated in FIG. 12D. The average 80$^{th}$ percentile price over all stores is shown as "Q". If a flagged store has a base price for an analyzed product beyond two (2) STD from the mean, as shown by data point 1250, that data point is corrected by moving the data point to the "edge" at two (2) STD (as shown by the arrow) from the mean. That point 1251 is shown having a new base price of V.

Thus, the foregoing process illustrates an embodiment for determining an imputed base price variable.

b. Imputed Relative Price Variable

Figure 13:
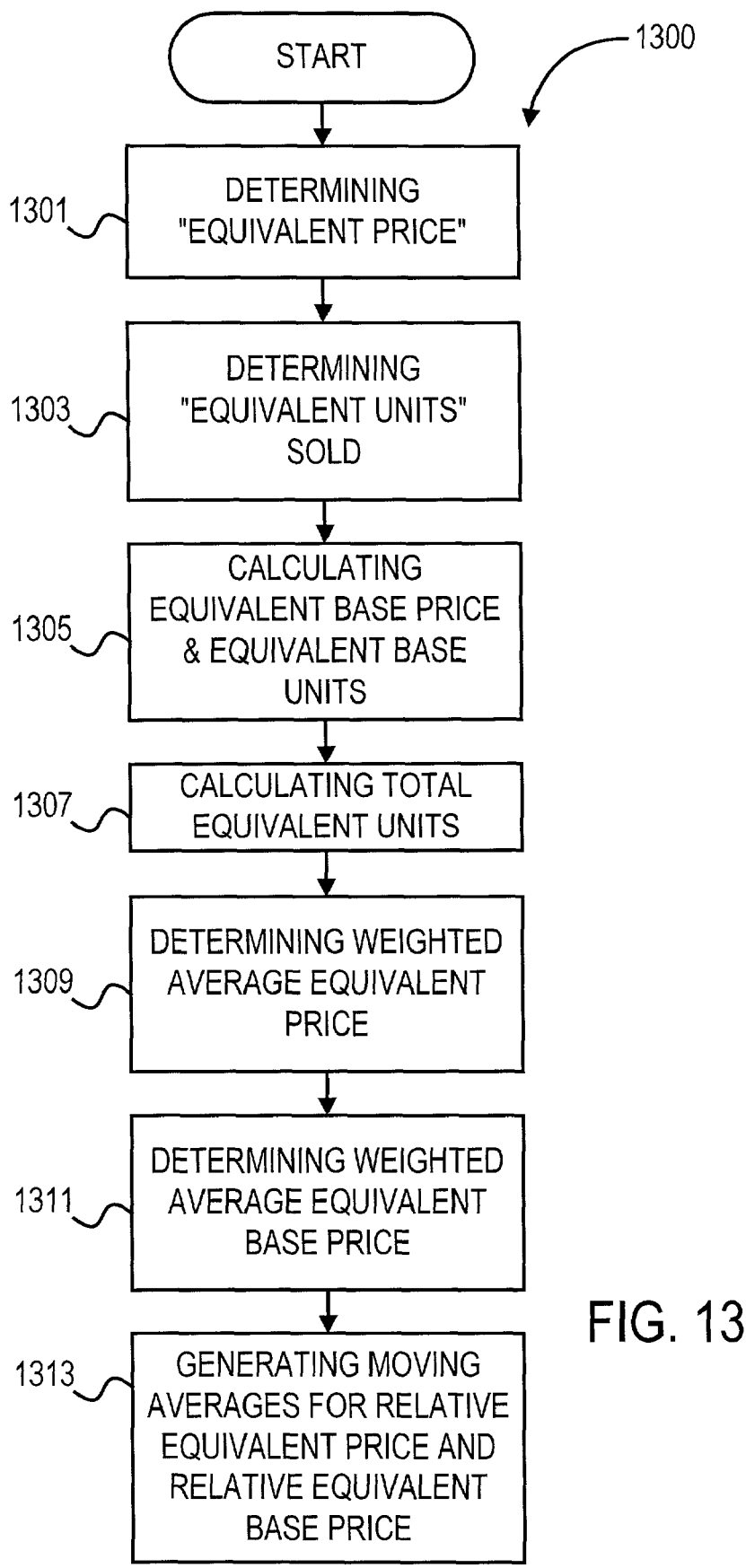
FIG. 13 is a flow chart depicting a process flow by which an imputed relative price variable can be generated in accordance with one embodiment of the present invention.

Reference is now made to the flowchart 1300 of FIG. 13 which illustrates an embodiment for generating relative price variables in accordance with the principles of the present invention. In the pictured embodiment, the process begins with a calculation of an "equivalent price" for each product sold for each store (Step 1301). The following example will use soda to illustrate an aspect of the present invention. An example dataset is shown below:

| Product | Size | Equivalent Factor | Actual Price | Units | Equivalent Units | Equivalent Price |
|---|---|---|---|---|---|---|
| A | 8 | 16 | 1.00 | 500 | 250 | 2.00 |
| B | 16 | 16 | 2.00 | 300 | 300 | 2.00 |
| C | 32 | 16 | 3.00 | 100 | 200 | 1.50 |

Using this data, relative price may be calculated. As disclosed earlier, an equivalizing factor is defined. For this example, let the equivalizing factor be 16. Using the equivalizing factor, an equivalent price can be calculated (Step 1301).

$$\text{Equivalent Price} = \text{Actual Price} \cdot \left(\frac{Equivalizing factor}{size}\right)$$

Thus for A: Equivalent Price = $1.00\left(\frac{16}{8}\right) = \$2.00$

B: $\$2.00\left(\frac{16}{16}\right) = \$2.00$

C: $\$3.00\left(\frac{16}{32}\right) = \$1.50$ the results of these calculations are shown in the "Equivalent Price" column of the table above.

Next equivalent units sold ("units") can be calculated (Step 1303).

$$\text{Equivalent Units} = \text{units} \cdot \left(\frac{size}{equivalizing factor}\right)$$

Thus for A: Equivalent units = $500\left(\frac{8}{16}\right) = 250$

B: $300 \times \left(\frac{16}{16}\right) = 300$

C: $100 \times \left(\frac{32}{16}\right) = 200$

In a similar vein, equivalent base price and equivalent base units are calculated (Step 1305) using the imputed values for base price (for example, as determined in Steps 1201-1207) and for base units (also referred to as base volume which is determined as disclosed below).

For each Store, each demand group, and each date, the total equivalent units is determined (Step 1307). For example, using the dataset above (assuming that the data is from the same store), a total of 750 (i.e., 250+300+200) equivalent units were sold.

Defining A, B, and C as products in a demand group, the equivalent values for the demand group are depicted below:

| Product | Equivalent Units | Equivalent Price |
|---|---|---|
| A | 250 | $2.00 |
| B | 300 | $2.00 |
| C | 200 | $1.50 |

A weighted calculation of relative equivalent price is then made (Step 1309). For example, such relative price value is determined as follows:

Equivalent price is divided by a weighted denominator.

The weighted denominator is calculated by multiplying equivalent units for each product times the equivalent units sold. For each product, only the values of other products are used in the calculation. This means excluding the product being analyzed. For example, if products A, B, and C are being analyzed in turn, when product A is analyzed the value for A is excluded from the denominator. Using the above data, the relative price of A is determined as follows:

$$rel_A = \frac{equiv \cdot price of A}{\left[\frac{(equiv \cdot units of B)(Equiv \cdot price of B) + (equiv \cdot units of C)(Equiv \cdot price of C)}{total equivalent units - equivalent units of A}\right]}$$

$$= \frac{2}{\left[\frac{(300)(200) + (200)(1.50)}{(250 + 300 + 200) - 250}\right]}$$

$$= 1.111$$

$$rel_B = \frac{2}{\left[\frac{(250)(2.00) + (200)(1.50)}{750 - 300}\right]}$$

$$= 1.125$$

$$rel_C = \frac{1.50}{\left[\frac{(250)(2.00) + (300)(2.00)}{750 - 200}\right]}$$

$$= 0.75$$

To insure that all members of a demand group are counted at least at some minimal level, if equivalent units=0, a value of "1" is added to all units. In an example where equivalent units were A=0; B=5; C=11, the units would be revalued as A=1; B=6; C=12, and the calculations as disclosed above would be conducted. Also, where the number of products in a demand group is equal to one, the weighted average equivalent price for the single product is equal to the equivalent price for that product. If a value for equivalent price is missing, the equivalent price for the previous record is used for equivalent price.

Also, a weighted average equivalent base price is calculated using the method disclosed hereinabove. The only difference being that instead of using the actual equivalent price, the calculated base price values per equivalent are used (Step 1311). Using the previously disclosed techniques, a moving average is generated for relative actual equivalent price and relative equivalent base price (Step 1313).

This moving average is generally calculated by first defining a time period window framing each analyzed date (e.g., four weeks, two weeks prior, two weeks after). This framing time period is specified as an input. Second, for each date in the time period window, a weighted average of actual equivalent price and a weighted average of equivalent base price are calculated. For time period windows where there are insufficient days preceding the analyzed date (e.g., if the time window requires two week's worth of data but only one week is available), imputed values are provided for base price or actual price. Such imputed values are just the average value for base price or actual price, respectively. Third, once the time period window is defined, calculations are made defining average relative actual equivalent price and average relative equivalent base price over the time period window, thereby defining a moving average for both relative actual equivalent price and relative equivalent base price. This, is repeatedly done with the window being moved incrementally through the dataset thereby obtaining a moving average.

Thus a variety of imputed relative price variables can be generated (e.g., relative equivalent price, relative equivalent base price. etc.).

c. Imputed Base Volume Variable

Figure 14A:
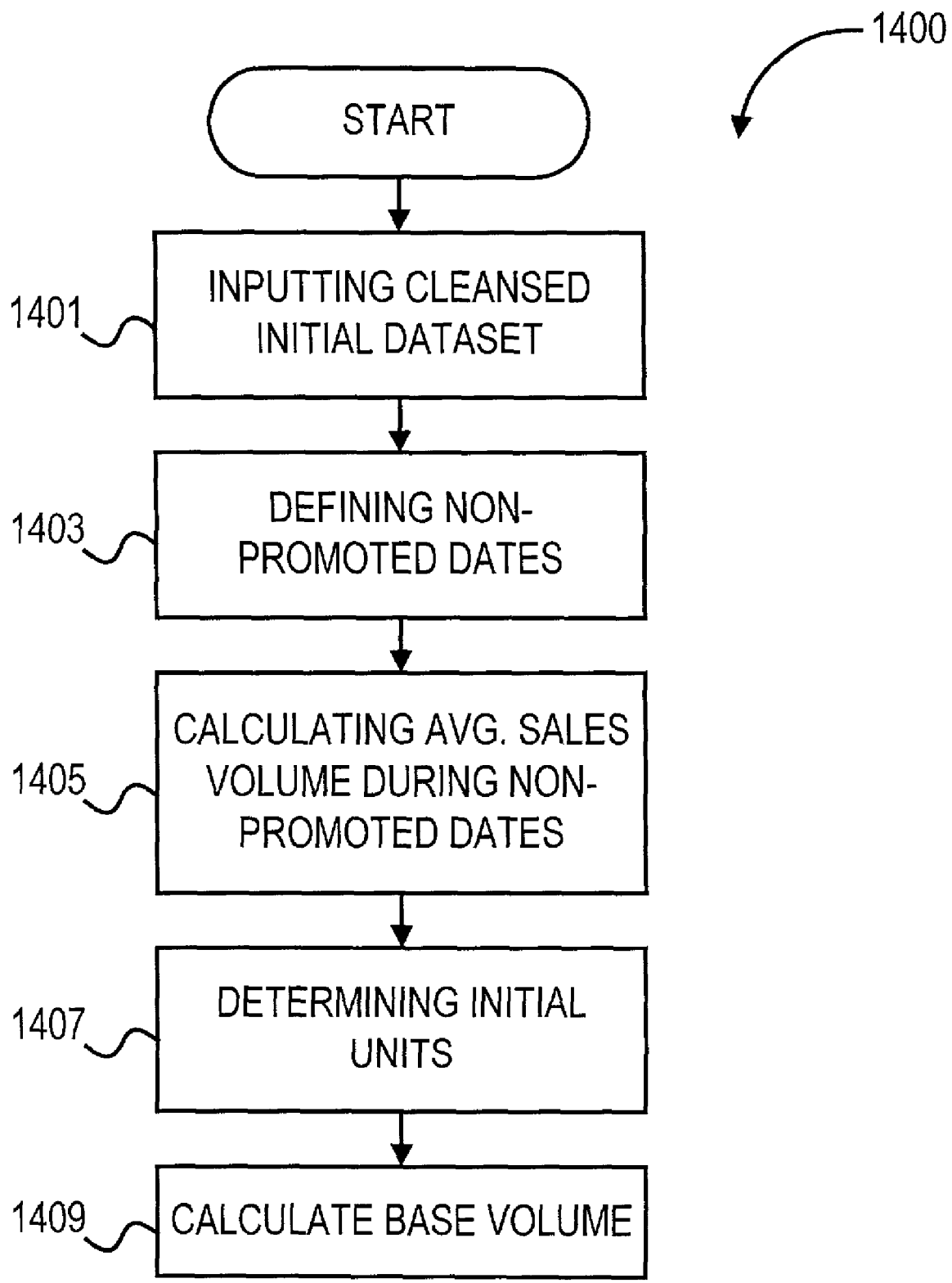
FIG. 14A is a flow chart depicting a process flow by which an imputed base unit sales volume variable can be generated in accordance with one embodiment of the present invention.

A flowchart 1400 shown in FIG. 14A illustrates one embodiment for generating an imputed base volume variable. Base volume refers to the volume of product units sold in the absence of discount pricing or other promotional effects. Base volume is also referred to herein as simply "base units". The determination of base volume begins by receiving the cleansed initial dataset information for each product and store (Step 1401). The initial dataset information is processed to determine "non-promoted dates" (Step 1403). For example, using the percent discount (AP/BP) information generated above, product records having a percent price discount that is less than some predetermined discount level (e.g., 2%) are treated as non-promoted products for the time periods where the percent discount is less than the predetermined discount level (e.g., 2%). These records are used to generate a data subset defining the dates where the products are not significantly price discounted i.e., "non-promoted dates". This data subset is also referred to herein as the non-promoted data subset.

Using the non-promoted data subset, an average value for "units" and a STD is calculated (i.e., an average value for product unit sales volume for each product during the non-promoted dates is calculated) (Step 1405). The average units are rounded up to the nearest integer value, this value shall be referred to as the "non-promoted average units".

An initial value for base units ("initial base units") is now determined (1407). This value is determined for all dates in the dataset, not just the non-promoted dates. For those records having a percent price discount that is less than the predetermined discount level (e.g., 2%) the actual units sold are treated as "initial base units". However, where such records (those the 2% or less discount) also have an actual value for units sold which is greater than 1.5 STD from the non-promoted average unit value (as calculated above), then the actual value for units sold is not used. Instead, it is replaced with the non-promoted average unit value in calculating "initial base units". For the other records (those having a percent price discount that is equal to or greater than the predetermined discount level (e.g., 2%)), the previously calculated non-promoted average unit value is used for "initial base units".

Figure 14B:
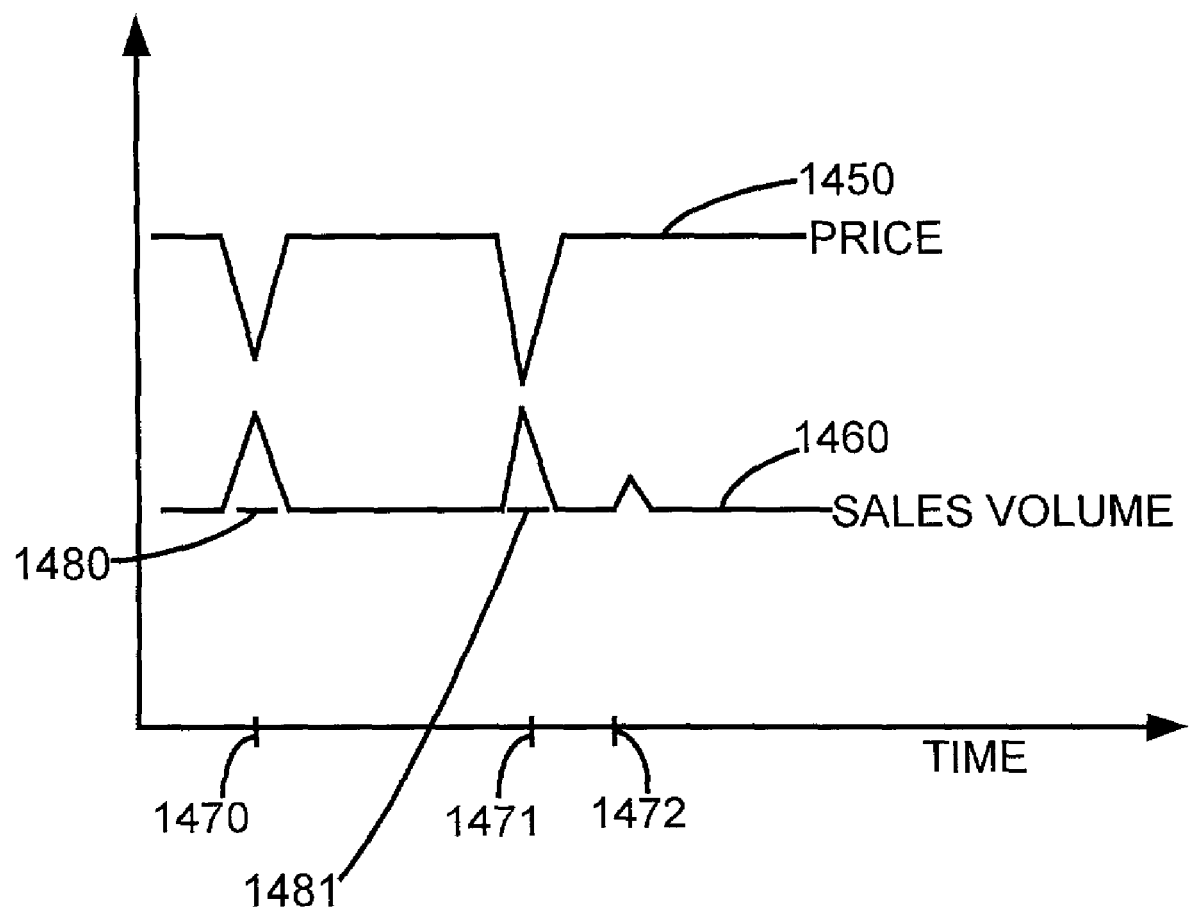
FIG. 14B is a diagram used to illustrate the comparative effects of sales volume increase and price discounts.

This principle can be more readily understood with reference to FIG. 14B. The price behavior 1450 can be compared with sales behavior 1460. Typically, when the price drops below a certain level, sales volume increases. This can be seen at time periods 1470, 1471. This can be reflective of, for example, a 2% or greater price discount. This is to be expected, and as a result, these sales records should not affect calculations of "base volume". In such a case, the actual units sold (more than usual) are not included in a base volume determination. Rather, those records are replaced with the average volume value for the non-promoted dates (the non-promoted average unit value, shown with the dotted lines 1480, 1481). However, where a sales volume increases during a period of negligible discount (e.g., less than 2%), such as shown for time period 1472, the actual units sold (actual sales volume) are used in the calculation of base volume. However, if the records show a sales volume increase 1472 which is too large (e.g., greater than 1.5 standard deviations from the non-promoted average unit value), it is assumed that some other factor besides price is influencing unit volume and the actual unit value is not used for initial base units but is replaced by the non-promoted average unit value.

A calculated base volume value is now determined (Step 1409). This is accomplished by defining a time window. One preferred window is four (4) weeks, but the time window may be larger or smaller. For each store and product, the average value of "initial base units" is calculated for each time window. This value is referred to as "average base units". This value is calculated for a series of time windows to generate a moving average of "average base units". This moving average of the average base units over the modeled time interval is defined as the "base volume variable".

d. Supplementary Error Detection and Correction

Figure 15A:
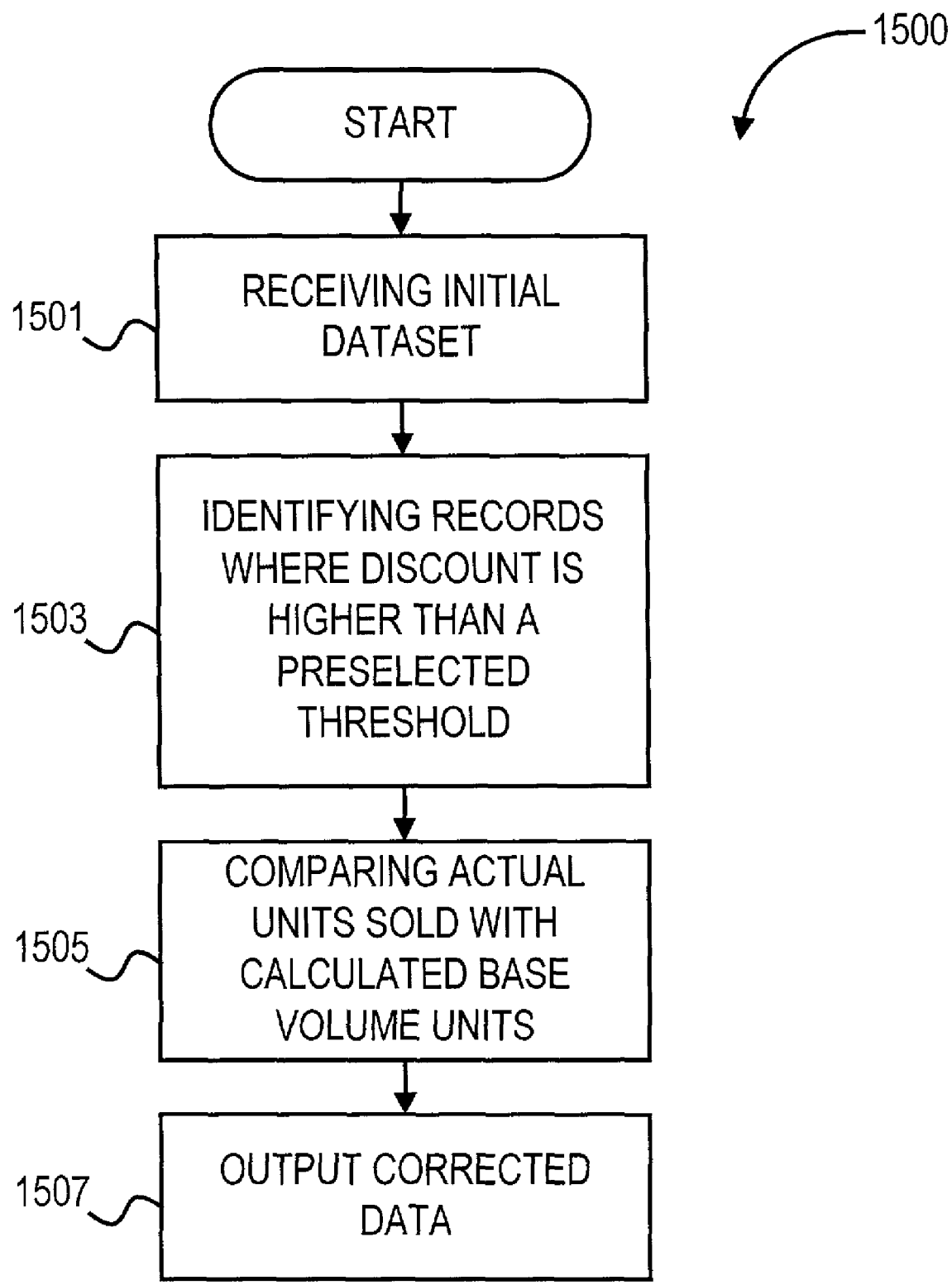
FIG. 15A is a flow chart depicting a process flow by which supplementary error detection and correction can be generated in accordance with an embodiment of the present invention.

Based on previously determined discount information, supplementary error detection and correction may be used to correct price outliers. A flowchart 1500 illustrated in FIG. 15A shows one embodiment for accomplishing such supplementary error detection and correction. Such correction begins by receiving the cleaned initial dataset information for each product and store (Step 1501). In addition the previously calculated discount information is also input, or alternatively, the discount information (e.g., P/BP) can be calculated as needed. The initial dataset and discount information is processed to identify discounts higher than a preselected threshold (e.g., 60% discount) (Step 1503). For those time periods (e.g., weeks) having price discounts higher than the preselected threshold (e.g., greater than 60%), a comparison of actual units sold to calculated base volume units (as calculated above) is made (Step 1505).

Figure 15B:
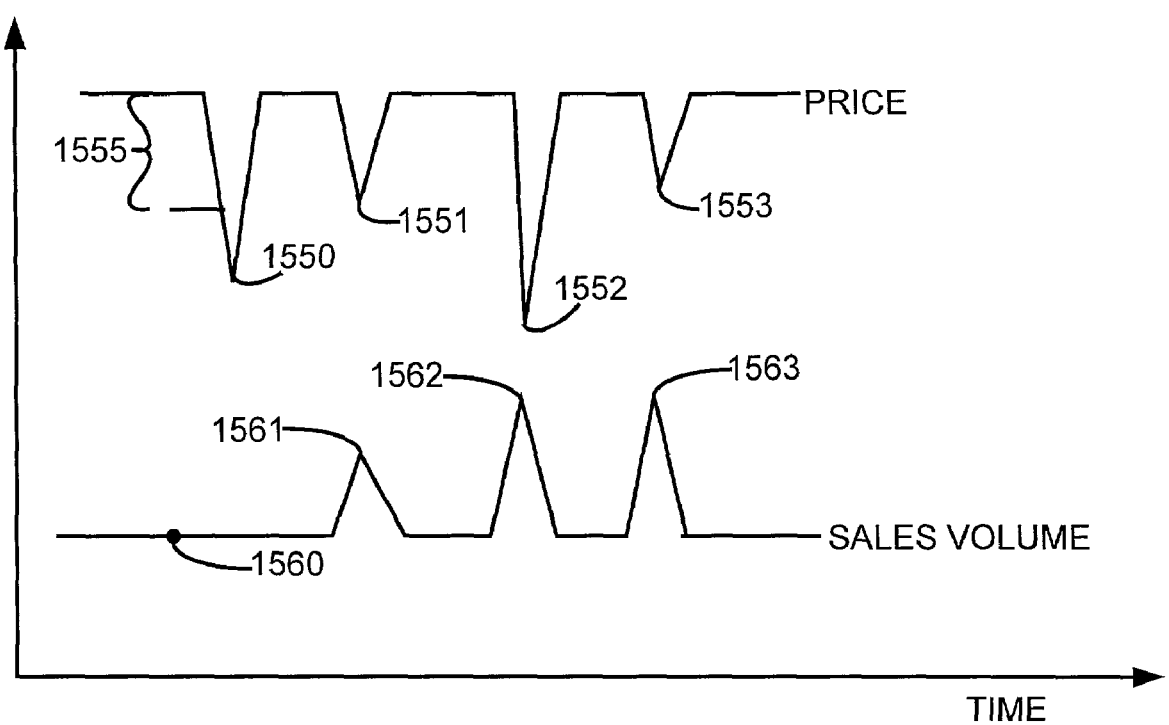
FIG. 15B is a diagram used to illustrate the comparative effects of sales volume increase and price discounts.

The concepts are similar to that illustrated in FIG. 14B and may be more easily illustrated with reference to FIG. 15B. The principles of this aspect of the present invention are directed toward finding unexplained price aberrations. For example, referring to FIG. 15B, price discounts are depicted at data points 1550, 1551, 1552, and 1553. Also, corresponding sales increases are depicted by at data points 1561, 1562, and 1563. The data point 1550 has a discount greater than the threshold 1555 (e.g., 60%). So an analysis is made of data point 1550.

If the number of actual units sold (shown as 1560) lies within two (2) STD of the calculated base volume, then it is assumed that the actual price 1550 is actually an erroneous record and the actual value 1560 is replaced with the calculated base price.

Figure 16:
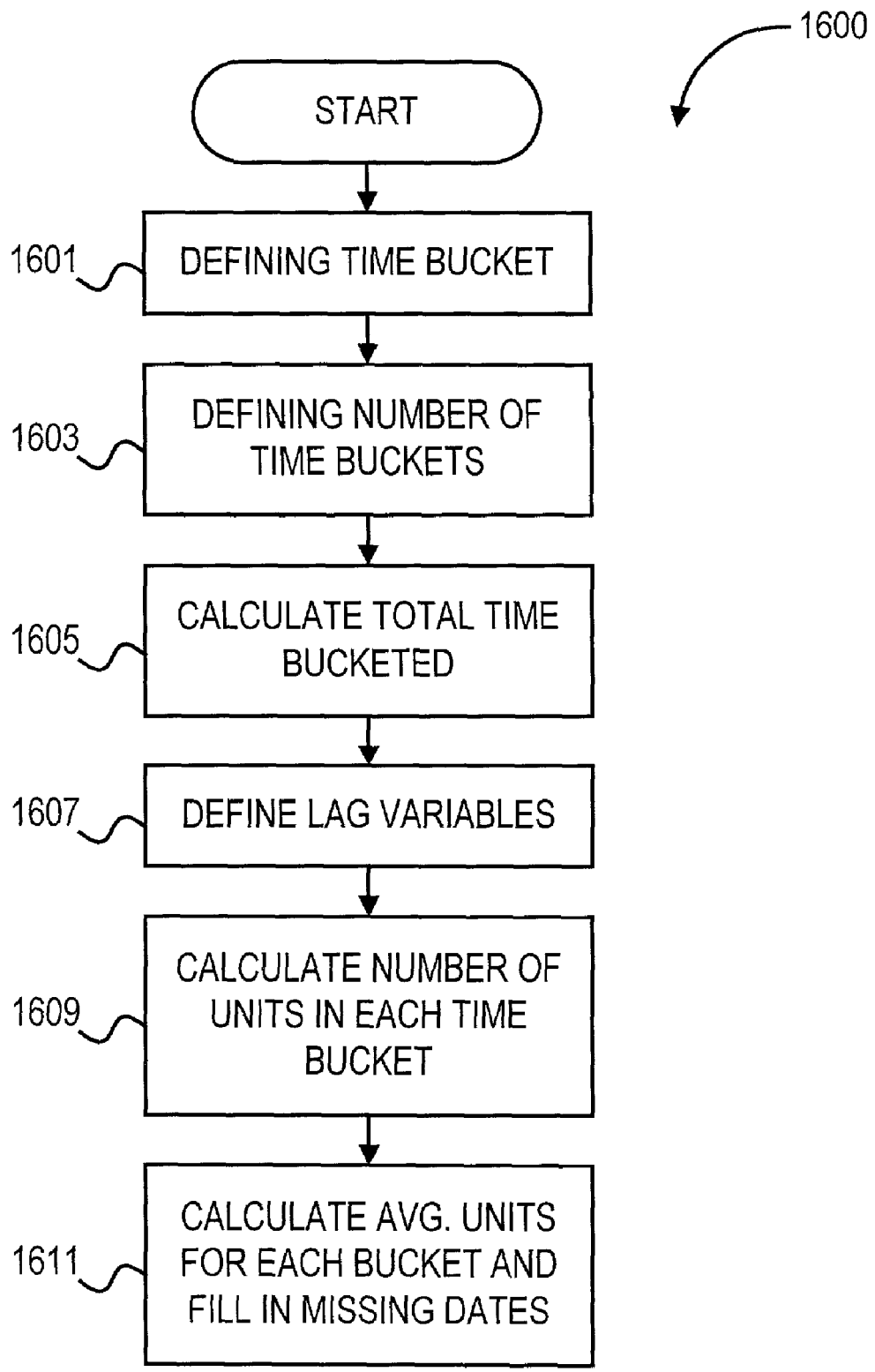
FIG. 16 is a flow chart depicting a process flow by which an imputed stockpiling variable can be generated in accordance with an embodiment of the present invention.

However, if the number of actual units sold is greater than two (2) STD from the calculated base volume, it is assumed that the volume number is correct and the price is reset to reflect a discount of 60% and the price is recalculated based on the 60% discount. In short, the discount is capped at the chosen value (here 60%). Once the data is corrected, it can be output (step 1507).

e. Determining Imputed Variables which Correct for the Effect of Consumer Stockpiling With reference to FIG. 16, a flowchart 1600 illustrating a method embodiment for generating stockpiling variables is depicted. The pictured embodiment 1600 begins by defining the size of a "time bucket" (m), for example, the size of the bucket can be measured in days (Step 1601). A preferred embodiment uses a bucket of one (1) week or seven (7) days. Additionally, the number (τ) of time buckets to be used is also defined (Step 1603). The total amount of time "bucketed" (m×τ) is calculated (Step 1605).

"Lag" variables which define the number of product units sold ("units") in the time leading up to the analyzed date are defined (Step 1607). For example:

Lag1(units)=number of product units sold in one (1) time period (e.g., a day or week) before the analyzed date;

Lag2(units)=number of product units sold in two (2) time periods (e.g., a day or week) before the analyzed date;

Lagt(units)=number of product units sold in t time periods (e.g., a day or week) before the analyzed date.

Then the total number of product units sold is calculated for each defined time bucket (Step 1609). For example:

Bucket1=sum of units sold during the previous m days;
Bucket2=sum of units sold from between the previous m+1 days to 2 m days;
Bucket3=sum of units sold from between the previous 2 m+1 days to 3 m days;
Bucket(τ)=sum of units from between the previous (τ−1) m+1 days to (τ)m days.

Correction can be made at the "front end" of the modeled time interval. For example, the data can be viewed as follows:

If working near the front end of a dataset, units from previous weeks cannot always be defined and in their place an averaged value for bucket sum can be used (Step 1611). For example, referring to Bucket 1, there is no Bucket 1 data for Week 1. As a result, the Bucket 1 data for weeks 2-7 are averaged and that value is put into Week 1 of Bucket 1. Similarly, with reference to Bucket 2, Week 1 and Week 2 are missing a value for Bucket 2, Weeks 1-3 are missing a value for Bucket 3, and Weeks 1-4 are missing a value for Bucket 4. The average values are generated for the missing values from weeks. For example, for Bucket 2, an average value for Weeks 3-7 is generated. This average value is used to fill out the missing dates of Bucket 2 (Weeks 1-2). Similarly, for Bucket 3, the average value for Weeks 4-7 are averaged and used to fill out the missing dates (Weeks 1-3). The same principle applies to Bucket 4. These Buckets define variables which are used to model the impact of promotional activity in previous time periods. The Buckets are used as variables in models which can be used to determine if there is a relationship between sales volume between a previous time as compared with a current time. The idea is to detect and integrate the effects of consumer stockpiling on into a predictive sales model.

f. Day of the Week Analysis

Figure 17:
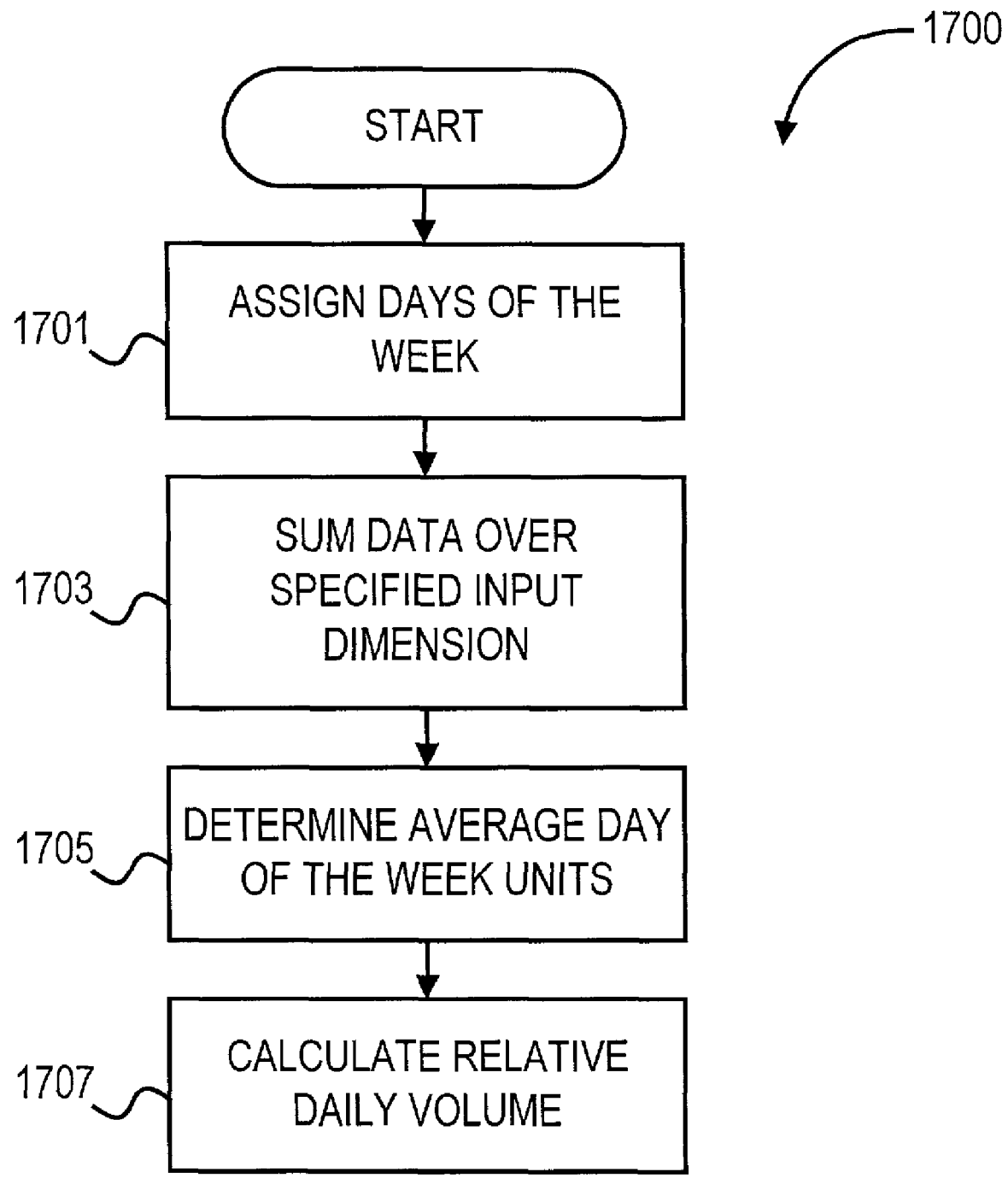
FIG. 17 is a flow chart depicting a process flow by which an imputed day-of-week variable can be generated in accordance with an embodiment of the present invention.

With reference to FIG. 17, a flowchart 1700 illustrating one embodiment for determining a Day of the Week variable is shown. It is necessary to have data on a daily basis for a determination of Day of the Week effects. In accordance with the principles of the present invention the embodiment begins by assigning the days of the week numerical values (Step 1701). A first date in the dataset is assigned. This can be arbitrarily assigned, but typically the first date for which data is available is selected as the "first date". This date is assigned Day of Week="1". The next six days are sequentially assigned Days of the Week=2, 3, 4, 5, 6, 7, respectively. This process continues with the next consecutive days data starting over again with Day of Week="1", continuing throughout all the days of the modeled time interval.

Once categorized by day of the week the product units (sold) are summed for a specified dimension or set of dimensions. Dimension as used herein means a specified input variable including, but not limited to, Product, Brand, Demand Group, Store, Region, Store Format, and other input variable which may yield useful information (Step 1703). For example, if Region is the specified dimension (e.g., all the stores in Los Angeles, Calif.), all of the unit volume for selected products in the Los Angeles stores is summed for each Day of Week (i.e., 1, 2, 3, 4, 5, 6, and 7).

For each Day of Week and each dimension specified, the average units (sold) are determined (Step 1705). For each date, a "relative daily volume" variable is also determined (Step 1707). For example, relative daily volume for a given Store is provided by (total Store daily units)/(average Store daily units). Such calculation can be accomplished for any input variable.

|  | Week 1 | Week 2 | Week 3 | Week 4 | Week 5 | Week 6 | Week 7 |
|---|---|---|---|---|---|---|---|
| Bucket 1 | — | Week 1 | Week 2 | Week 3 | Week 4 | Week 5 | Week 6 |
| Bucket 2 | — | — | Week 1 | Week 2 | Week 3 | Week 4 | Week 5 |
| Bucket 3 | — | — | — | Week 1 | Week 2 | Week 3 | Week 4 |
| Bucket 4 | — | — | — | — | Week 1 | Week 2 | Week 3 |

One numeric example can be shown as follows. A store sells 700 units of X over a given modeled time interval. Average daily units=700/7=100. If sales for all of the Friday's of the modeled time interval amount to 150 units, it can be shown that, for that Store, Friday's relative daily volume is 1.5, i.e., more than average. This information may prove valuable to a client merchant and can comprise an input variable for other econometric models.

g. Imputed Seasonality Variable Generation

Another useful imputed variable is an imputed seasonality variable for determining seasonal variations in sales volume. One preferred approach for generating this variable is in accordance with the method described by Robert Blattberg and Scott Neslin in their book "*Sales Promotion: Concepts, Methods, and Strategies*", at pages 237-250 (Prentice Hall, N.J., 1990).

Figure 18:
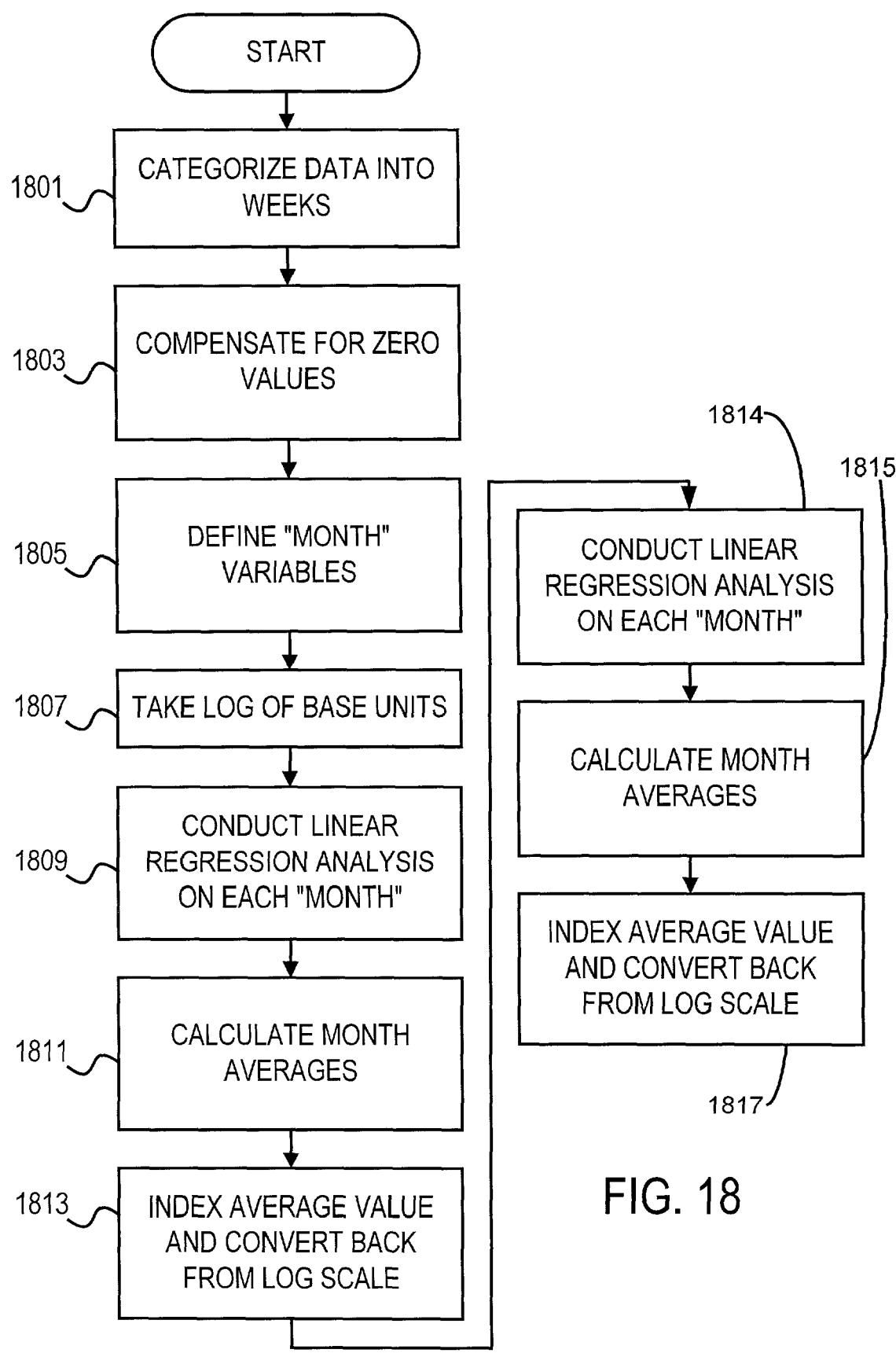
FIG. 18 is a flow chart depicting a process flow by which an imputed seasonality variable can be generated in accordance with an embodiment of the present invention.

Referring to FIG. 18, a flowchart 1800 illustrating one embodiment in accordance with the present invention for determining an imputed seasonality variable is shown. The process begins with categorizing the data into weekly data records, if necessary (Step 1801). Zero values and missing records are then compensated for (Step 1803). "Month" variables are then defined (Step 1805). A logarithm of base units is then taken (Step 1807). Linear regressions are performed on each "Month" (Step 1809). "Months" are averaged over a specified dimension (Step 1811). Indexes are averaged and converted back from log scale to original scale (Step 1813). The average of normalized estimates are calculated and used as Seasonality index (Step 1815). Individual holidays are estimated and exported as imputed seasonality variables (Step 1817).

The embodiment begins by categorizing the data into weekly data records. Chiefly, this comprises aggregating daily data into weekly groups (Step 1801). For missing sales records or records having zero volume values, insert average volume data (Step 1803).

A set of month variables is first defined (Step 1805). A series of models of base units are constructed using each defined month variable as the predictor.

The process of defining month variables is as follows:
1) Define the Month Variable
   a. Starting with Week1, Day 1, assign a month number to each week (Month1)
   b. Assume 4 weeks per month
   c. Depending on the time frame of the dataset, there may be 12 or 13 months defined
2) Repeat definition of month variable three more times
   a. Advance Week 1 to the second week in the dataset
   b. Assign a month number to each week (Month2)
   c. Advance Week 1 to the third week in the dataset
   d. Assign a month number to each week (Month3)
   e. Advance Week 1 to the fourth week in the dataset
   f. Assign a month number to each week (Month4)

| Week | Month1 | Month2 | Month3 | Month4 |
|------|--------|--------|--------|--------|
| 1 | 1 | 12 | 12 | 12 |
| 2 | 1 | 1 | 12 | 12 |
| 3 | 1 | 1 | 1 | 12 |
| 4 | 1 | 1 | 1 | 1 |
| 5 | 2 | 1 | 1 | 1 |
| 6 | 2 | 2 | 1 | 1 |
| 7 | 2 | 2 | 2 | 1 |
| 8 | 2 | 2 | 2 | 2 |
| ... | ... | ... | ... | ... |

The values determined for base units are now processed. By taking the log of base units the effect of extreme variations in base units can be reduced (Step 1807). A linear regression is run on the log of base units for Month1 (Step 1809). The regression models the log of base units as a function of Month1 levels and Week number: (log(base units)=f(Month1, Week number)). The regression analysis is repeated using months Month2, Month3, and Month4 to determine, respectively log(base units)=f(Month2, Week number); log(base units)=f(Month3, Week number); and log(base units)=f(Month4, Week number).

Figure 19A:
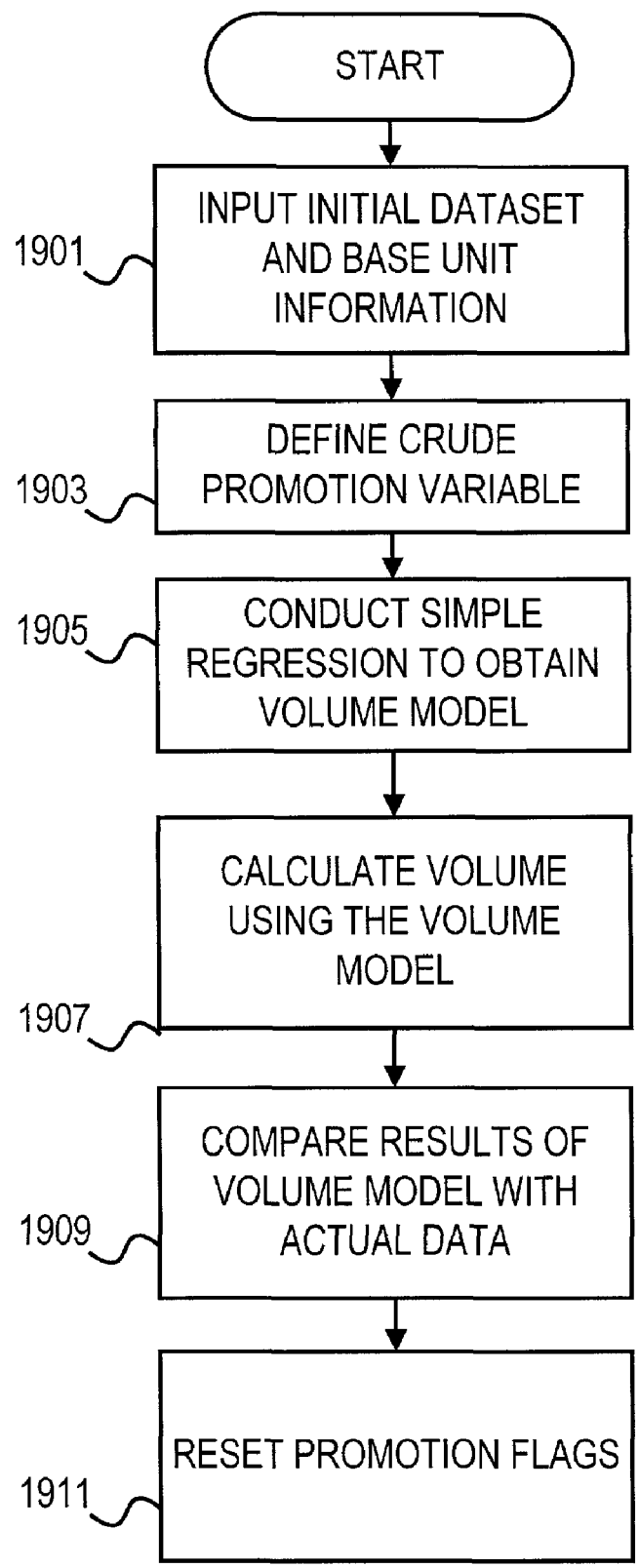
FIG. 19A is a flow chart depicting a process flow by which an imputed promotional effects variable can be generated in accordance with an embodiment of the present invention.

3) The average value across the 12 (or 13) levels of the Month1-Month4 estimates within the specified dimension (e.g. demand group) is calculated.
4) The estimates are indexed to the average estimate value and the indexes are converted back to original scale:
   a. Seasindx1=exp(estimate of Month1−avg. estimate of Month1)
   b. Seasindx2=exp(estimate of Month2−avg. estimate of Month2)
   c. Seasindx3=exp(estimate of Month3−avg. estimate of Month3)
   d. Seasindx4=exp(estimate of Month4−avg. estimate of Month4)
5) The average of the four normalized estimates is output as the Final Seasonality index
   a. Seasindx=Avg.(Seasindx1, Seasindx2, Seasindx3, Seasindx4)
   b. The values for Seasindx will be centered around 1.0, and typically range from 0.7 to 1.3.
6) After estimating individual holidays, combine estimates with index prior to tool export h. Imputed Promotional Variable Another useful variable is a variable which can predict promotional effects. FIG. 19A provides a flowchart illustrating an embodiment enabling the generation of imputed promotional variables in accordance with the principles of the present invention. Such a variable can be imputed using actual pricing information, actual product unit sales data, and calculated value for average base units (as calculated above). This leads to a calculation of an imputed promotional variable which takes into consideration the entire range of promotional effects.

Figure 19B:
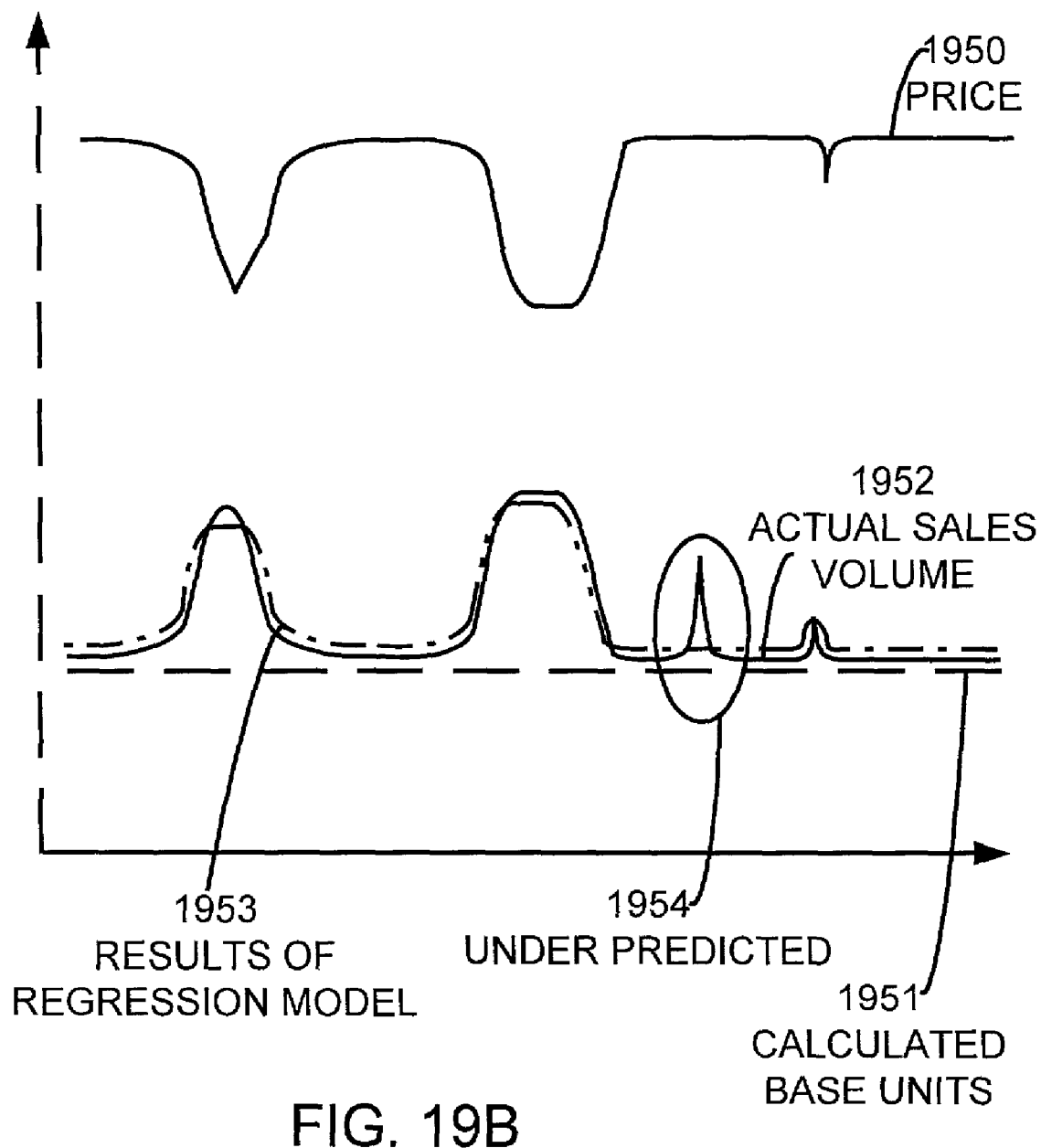
FIG. 19B is a diagram depicting the modeling effects of a promotional effects variable in accordance with an embodiment of the present invention.

FIG. 19B provides a useful pictorial illustration depicting a relationship between product price 1950, calculated average base units 1951, and actual units sold 1952 and the results of a simple regression model 1953 used to predict actual sales volume.

Referring back to FIG. 18A, the process begins by inputting the cleansed initial dataset and the calculated average base units information (Step 1901). A crude promotional variable is then determined (Step 1903). Such a crude promotional variable can be defined using promotion flags. These promotion flags may be set by an analysis of the unit sales for each date. If the actual unit sales (1952 of FIG. 19B) are greater than two (2) STD's from the average base units value (1951 of FIG. 19B) for the same date, then the price is examined. If the price for the same date has zero discount or a small discount (e.g., less than 1%) and no other promotional devices (other than discount) are involved (based on promotional information provided by the client), then the promotional flag is set to "1". For all other dates, if the above-mentioned conditions are not met the promotional flag is set to "0" for those dates. This set of "0's" or "1's" over the modeled time period defines a crude promotional variable. A simple regression analysis, as is known to those having ordinary skill in the art, (e.g., a mixed effects regression) is run on sales volume to obtain a model for predicting sales volume (Step 1905). This analysis will be designed to estimate the impact on sales volume of: price discount; the crude promotion variable; and other client supplied promotion including, but not limited to, advertisements, displays, and couponing. Using the model a sample calculation of sales volume is performed (Step 1907). The results of the model 1953 are compared with the actual sales data 1952 to further refine the promotion flags (Step 1909). If the sales volume is underpredicted (by the model) by greater than some selected percentage (e.g., 30-50%, preferably 30%) the promotion flag is set to "1" to reflect the effects of a probable non-discount promotional effect. For example, if we refer to the region shown as 1954, and the predicted sales volume is 60 units but the actual sales volume was 100 units, the model has underpredicted the actual sales volume by 40%, greater than the preselected level of 30%. Therefore, for that date the promotion flag is set to "1". This will reflect the likelihood that the increase in sales volume was due to a non-discount promotional effect. Since the remaining modeled results more closely approximate actual sales behavior, the promotion flags for those results are not reset and remain at "0" (Step 1911). The newly defined promotion flags are incorporated into a new model for defining the imputed promotional variable.

i. Imputed Cross-Elasticity Variable

Figure 20:
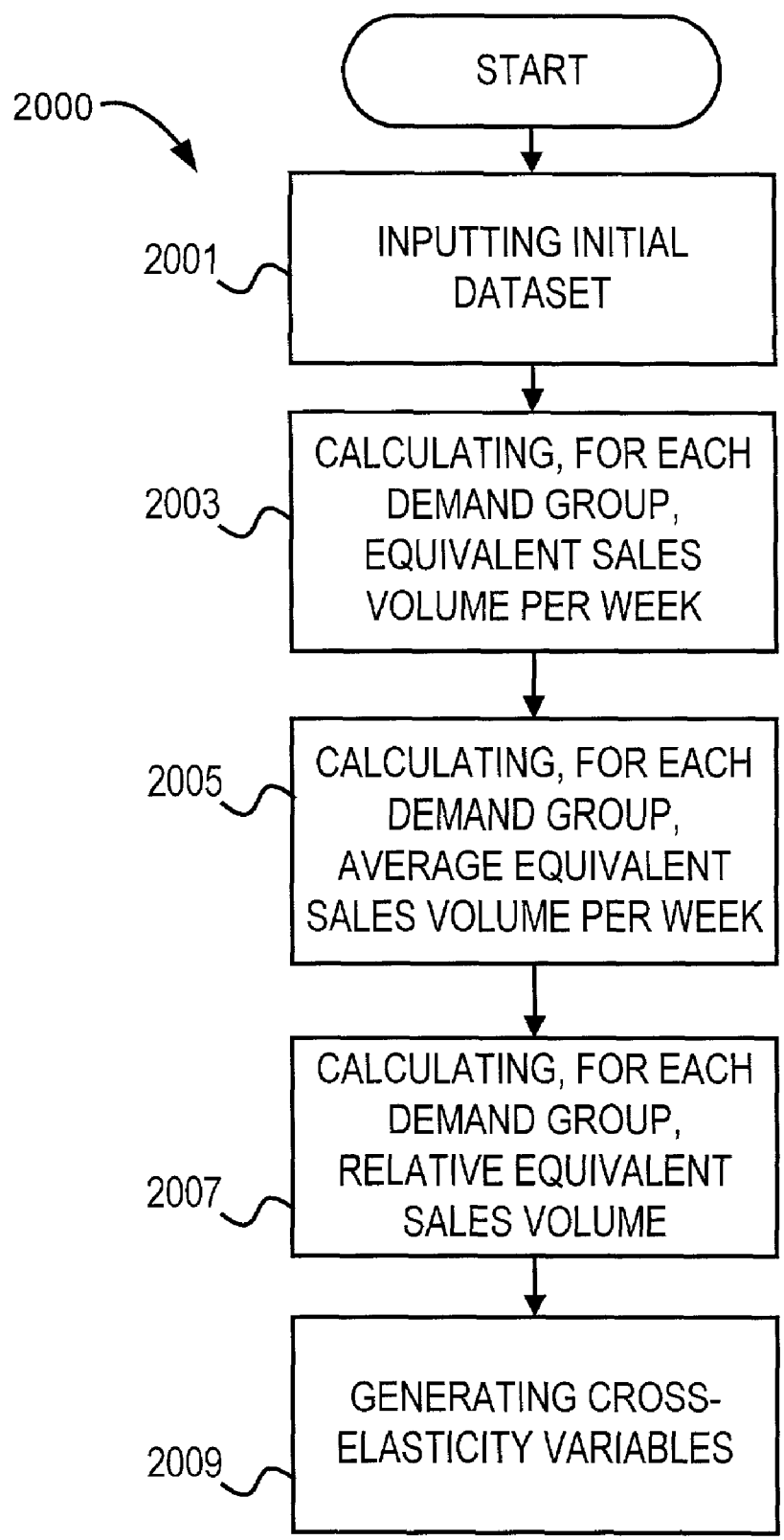
FIG. 20 is a flow chart depicting a process flow by which an imputed cross-elasticity variable can be generated in accordance with a preferred embodiment of the present invention.

Another useful variable is a cross-elasticity variable. FIG. 20 depicts a flowchart 2000 which illustrates the generation of cross-elasticity variables in accordance with the principles of the present invention. The generation of an imputed cross-elasticity variable allows the analysis of the effects of a demand group on other demand groups within the same category. Here, a category describes a group of related demand groups which encompass highly substitutable products and complementary products. Typical examples of categories are, among many others, Italian foods, breakfast foods, or soft drinks.

An embodiment for generating cross-elasticity variables in accordance with the principles of the present invention will be illustrated with reference to the following example. The subject category is an abbreviated soft drink category defined by demand groups for diet soft drinks (diet), regular cola soft drinks (reg), caffeine free soft drinks (caff-free), and root beer soft drinks (RB).

The initial dataset information is input into the system (Step 2001). For each demand group the total equivalent sales volume for each store is calculated for each time period (for purposes of this illustration the time period is a week) during the modeled time interval (Step 2003). For each week and each demand group, the average total equivalent sales volume for each store is calculated for each week over the modeled time interval (Step 2005). For each demand group the relative equivalent sales volume for each store is calculated for each week (Step 2007). This may be calculated for each store for each week in accordance with the formula below:

Relative Demand Group Equivalent Sales Volume=Total Equivalent Sales Volume For a Specific Week divided by Average Total Equivalent Sales Volume as Determined For All Weeks in The Modeled Time Interval.

The purpose of the cross-elasticity variable is to quantify the effects of sales of one demand group upon the sales of another demand group. Therefore, when examining a first demand group, the sales of other demand groups within the same category are treated as variables which affect the sales of the first demand group. As such, the relative demand group equivalent sales volume for the other demand groups is quantified and treated as a variable in the calculation of sales volume of the first demand group, thereby generating cross-elasticity variables (Step 2009). This can be illustrated more easily with reference to the partial dataset illustrated in Tables A and B. These tables reflect one week's data (week 1).

TABLE A

| WEEK | PRODUCT | DEMAND GROUP | RELATIVE DEMAND GROUP EQUIVALENT VOLUME |
|---|---|---|---|
| 1 | A | Diet | (VolA + VolB + VolC) / avg.(VolA + VolB + VolC) |
| 1 | B | Diet | (VolA + VolB + VolC) / avg.(VolA + VolB + VolC) |
| 1 | C | Diet | (VolA + VolB + VolC) / avg.(VolA + VolB + VolC) |
| 1 | D | Regular | (VolD + VolE + VolF) / avg.(VolD + VolE + VolF) |
| 1 | E | Regular | (VolD + VolE + VolF) / avg.(VolD + VolE + VolF) |
| 1 | F | Regular | (VolD + VolE + VolF) / avg.(VolD + VolE + VolF) |
| 1 | G | Caff-free | (VolG + VolH + VolI) / avg.(VolG + VolH + VolI) |
| 1 | H | Caff-free | (VolG + VolH + VolI) / avg.(VolG + VolH + VolI) |
| 1 | I | Caff-free | (VolG + VolH + VolI) / avg.(VolG + VolH + VolI) |
| 1 | J | RB | (VolJ + VolK + VolL) / avg.(VolJ + VolK + VolL) |
| 1 | K | RB | (VolJ + VolK + VolL) / avg.(VolJ + VolK + VolL) |
| 1 | L | RB | (VolJ + VolK + VolL) / avg.(VolJ + VolK + VolL) |

TABLE B

| PRODUCT | DEMAND GROUP | $CE_{Diet}$ | $CE_{Regular}$ | $CE_{Caff-free}$ | $CE_{RB}$ |
|---|---|---|---|---|---|
| A | Diet | — | X | X | X |
| B | Diet | — | X | X | X |
| C | Diet | — | X | X | X |
| D | Regular | X | — | X | X |
| E | Regular | X | — | X | X |
| F | Regular | X | — | X | X |
| G | Caff-free | X | X | — | X |
| H | Caff-free | X | X | — | X |
| I | Caff-free | X | X | — | X |
| J | RB | X | X | X | — |
| K | RB | X | X | X | — |
| L | RB | X | X | X | — |

With reference to Table A it is shown that a calculation of Relative Demand Group Equivalent Volume for product A (a diet soda) is the total of all equivalent sales volume for the diet soda demand group for the time period (here week 1). This includes the sum of all equivalent sales volume for diet soda A, all equivalent sales volume for diet soda B, and all equivalent sales volume for diet soda C. This sum is divided by the average sum of equivalent sales volume for diet soda A, diet soda B, and diet soda C. This Relative Demand Group Equivalent Volume is a cross-elasticity coefficient ($CE_{diet}$) for products other than diet soda (here, regular soda, caffeine-free soda, and root beer). The same type of calculation is performed with respect to regular soda (reg) and, for that matter, Caffeine-Free (caff-free) and Root Beer (RB) as well. This yields four cross-elasticity coefficients ($CE_{diet}$, $CE_{reg}$, $CE_{caff-free}$, and $CE_{RB}$). Table B illustrates the relationship between each product, demand group, and the four cross-elasticity coefficients ($CE_{diet}$, $CE_{reg}$, $CE_{caff-free}$, and $CE_{RB}$). The cross-elasticity coefficients are used generate cross-elasticity variables for each product. In Table B the "-" means the indicated cross-elasticity coefficient is not applicable to the indicated product. An "x" means the indicated cross-elasticity coefficient is applicable to the indicated product. For example, if product D (Regular soft drink) is examined, beginning with Table A, the equation for Relative Demand Group Equivalent Volume (for product A) is shown. This equation also yields the cross-elasticity coefficient ($CE_{reg}$) for the demand group regular soda. Referring now to Table B, the row for product D is consulted. There are "x's" for the coefficients which apply to a determination of a cross-elasticity variable for product D. Thus, cross-elasticity for product D is a function of cross-elasticity coefficients $CE_{diet}$, $CE_{caff-free}$, and $CE_{RB}$. Therefore, the cross-elasticity variable for product D includes cross-elasticity coefficients $CE_{diet}$, $CE_{caff-free}$, and $CE_{RB}$.

The calculated imputed variables and data are outputted from the imputed variable generator 304 to the coefficient estimator 308. Some of the imputed variables may also be provided to the financial model engine 108.

B. Coefficient Estimator

The coefficient estimator 308 uses the imputed variables and data to estimate coefficients, which may be used in an equation to predict demand. In a preferred embodiment of the invention, sales for a demand group (S) is calculated and a market share (F) for a particular product is calculated, so that demand (D) for a particular product is estimated by D=S·F. A demand group is defined as a collection of highly substitutable products. In the preferred embodiments, the imputed variables and equations for sales (S) of a demand group and market share (F) are as follows:

1. Modeling Framework

The econometric modeling engine relies on a mixed-model framework, simultaneously utilizing information across all stores and products in a client category, where a category is defined as a collection of substitutable or complementary products. The mixed model methodology is also referred to as "Bayesian Shrinkage" Modeling, because by combining data from various stores and/or products, one can "shrink" individual parameter estimates towards the average estimate, dampening the extreme values that would result if traditional regression were used. A basic rationale for this approach is as follows.

In developing product-level volume models for each store within a chain, one may be presented with a wide range of historical data in terms of modeling sufficiency. For some stores and/or products, the history will be quite rich, with many price changes and a variety of promotion patterns. For other stores and/or products, the history will be quite sparse, with very few price changes and little promotional activity. To maximize the stability of estimated model parameters, one might consider developing a single regression model across stores and/or products. This model might have stable parameter estimates; however, it would not fully leverage the store and/or product variability, and the resulting model would likely not predict well for a particular store and/or product. On the other hand, one might consider developing individual regression models for each store and/or product, to utilize the specific information contained in the data history. While these models might fit and predict well for the stores and/or products with substantial price variability, models would not be estimable for stores and/or products without a rich data history.

A mixed-model framework addresses the need for both highly predictive models and the existence of an estimable model for each store and product. In a mixed-effect model, information (in the form of data history) is leveraged across all stores and products, and a single cohesive model is built. Stores and products with little or no information in their data history default to an "average" (fixed-effect) model. Likewise, stores and products with a wealth of information in their data history will end up with unique parameter estimates tailored to their response pattern, via estimation of non-zero store and/or product-specific adjustment factors (random effects) which are added to the fixed-effect portion of the model.

2. Terminology

The equivalent price of a product is defined as the price of a standardized unit of measure, which may be calculated based on the product description and the spread of sizes/counts that apply to that description. Each individual product price is divided by this standardized unit of measure to obtain the equivalent price.

A demand group is defined as a set of products that are substitutes or near substitutes for each other. A product can belong to only one demand group. A product category consists of one or more demand groups. For this example, attention is restricted to a single category consisting of multiple demand groups.

Both Models:

Subscript i: Demand group (primary). A demand group is a collection of highly substitutable products.

Subscript j: Demand group (secondary). A secondary demand group is another demand group in the same category as the primary demand group, where a category is defined as a collection of substitutable or complementary products.

Subscript k: Product, where products are items with common UPC numbers.

Subscript t: Time period, which may be days, weeks, or hours.

Subscript B: Baseline, which is a state of product if there was no promotion.

Subscript n: Number of time periods away from current time period.

$\in$: Error term for regression equations, with appropriate subscripts per context.

3. Stage 1 (Sales) Model a. Sales Model Multipliers (Data Values, or Covariates) and Dependent Variables $S_{i,t}$: The equivalent sales of demand group i in period t in store s in dollars. Equivalent sales may be defined as sales of equivalent units of products being compared.

$S_{Bi,t}$: The equivalent baseline sales of demand group i in store s in period t.

$\overline{S}_{i,t}$: The equivalent sales of demand group i in store s averaged over periods leading up to period t.

$R_{i,t}$: The equivalent revenue of demand group i in period t.

$R_{Bi,t}$: The equivalent baseline revenue of demand group i in period t, which would be baseline sales times the baseline price.

$\overline{R}_{i,t}$: The equivalent revenue of demand group i averaged over periods leading up to period t.

$P_{i,t}$: The equivalent price of demand group i at store s in time period t, calculated as total equivalent revenue of demand group i divided by total equivalent sales in the period ($S_{i,t}/R_{i,t}$), and where the equivalent price is the price of an equivalent unit, such as a price per ounce.

$\overline{P}_{i,t}$: The average equivalent price of demand group i in store s for time period t, calculated as average total equivalent revenue of demand group i divided by average total equivalent sales ($\overline{S}_{i,t}/\overline{R}_{i,t}$).

$\overline{\overline{P}}_{i,t}$: The average competitor (e.g. a competing store in the area) equivalent price of demand group i in store s for time period t, calculated as average competitor total equivalent revenue of demand group i divided by average competitor total equivalent sales.

$M_{i,t}$: The promotion level for demand group i in store s in period t. $X_{i,t}$: The seasonality index for demand group i in store s in period t.

$TS_t$: The total dollar sales for the entire store in period t, computed using historical data.

$\overline{TS}_t$: The total dollar sales for the region in period t, computed using historical data. A region would be a grouping of stores possibly in a certain geographical area.

b. Sales Model Factors (Parameters to be Estimated)

$\gamma_i$: The price elasticity factor for demand group i measured with respect to the deviations of the weighted average price of the demand group from the past weighted average price of the group. It measures the sensitivity of sales of equivalized units of the demand group with respect to the group price.

$\nu_i$: The promotion factor for demand group i. This factor measures the sensitivity of the equivalent sales of the demand group to the general promotion level of the group. $\psi_i$: The seasonality factor for demand group i. This factor measures the sensitivity of the equivalent sales of the demand group to seasonality.

$\kappa_i$: The seasonality-price interaction factor that measures the interaction of weighted average price deviations and seasonality for demand group i. The seasonality and the group price may interact with each other in a nonlinear way. This factor measures a degree of nonlinearity.

$\delta_{i,n}$: The time lag factor for demand group i and delay of n weeks. The time lag factor measures the level of forward buying or stockpiling activity by customers. Note that this is the only factor that is estimated at the demand group level rather than the store-demand group level.

$\Phi_{i,j}$: The cross elasticity factor for demand group i and demand group j. This factor measures how sales of a demand group are affected by sales of other demand groups in the same category.

$\eta_{i,t}$: The competitive price factor for demand group i measured with respect to the difference between the weighted average price of the demand group within the store and outside competitors. This factor measures the effect of competitive activity on the sales of products in a given demand group.

$\pi_i$: The traffic factor for demand group i. Sales may be affected by the overall traffic through a store. This factor quantifies the relationship.

$\theta_i$: The day-of-week (DOW) effect for demand group i. Each day of a week could have a different sales pattern. This factor quantifies the relationship.

$K_i$: The constant (intercept) associated with demand group i.

c. The Sales Model is:

$$\ln\left(\frac{\hat{S}_{1,t}}{S_{Bi,t}}\right) = \hat{K}_1 + \hat{\gamma}_i \frac{P_{1,t}}{\overline{P}_{i,t}} + \hat{\nu}_i M_{1,t} + \hat{\psi}_1 X_{1,t} + \hat{\kappa}_1 X_{i,t} \frac{P_{1,t}}{\overline{P}_{i,t}} + \sum_{n=1}^{\tau} \hat{\delta}_{1,n} \frac{\sum_{r=t-mn}^{t-m(n-1)-1} S_{i,r}}{\sum_{r=t-mn}^{t-m(n-1)-1} \overline{S}_{i,r}} + \sum_{j \neq 1} \hat{\phi}_{1,j} \frac{\hat{S}_{j,t}}{\overline{S}_{j,t}} + \hat{\eta}_{1,t}\left(\frac{\overline{P}_{i,t} - \overline{\overline{P}}_{i,t}}{\overline{\overline{P}}_{1,t}}\right) + \hat{\pi}_i \frac{TS_t}{\overline{TS}_t} + \hat{\theta}_i \frac{S_{1,t-7}}{\overline{S}_{1,t-7}}$$

Equation 1

In the above model (Equation 1), the dependent variable, demand group equivalent sales, is indexed (divided) by baseline demand group equivalent sales to provide a type of normalization. This normalizing allows easier comparison within a demand group and between demand groups. If a reasonable approximation of baseline demand group sales cannot be imputed, the dependent variable may alternatively be indexed by demand group equivalent sales averaged over a specified number of time periods prior to the current one ($\overline{S}_{i,t}$).

In the time lag term, $\tau$ represents the number of "time buckets" preceding a time period that will be included in the model, and m represents the size of the "time bucket," in number of time periods.

Inclusion of several covariates (day-of-week, store traffic, within-market competitive pricing) is contingent upon the time dimension and scope of available client data. Therefore, if data is reported on a weekly basis, so that there is no data according to day of the week, the day of the week parameters will not be included.

d. Sales Model Unbiasing Factor

In regression calculations, returning to the original scale after a logarithmic transformation creates a bias. To correct for this bias, the Baskersville's method is used which consists of adding an unbiasing factor to the equation. This factor is the mean square error ($\hat{\sigma}^2$) of the sales model divided by 2.

The equation for predicting demand group sales is thus:

$$\left(\frac{\hat{S}_{1,t}}{S_{Bi,t}}\right) = \exp\left(\hat{K}_1 + \hat{\gamma}_1 \frac{P_{1,t}}{\overline{P}_{i,t}} + \hat{\nu}_i M_{1,t} + \hat{\psi}_1 X_{1,t} + \hat{\kappa}_1 X_{i,t} \frac{P_{1,t}}{\overline{P}_{i,t}} + \sum_{n=1}^{\tau} \hat{\delta}_{1,n} \frac{\sum_{r=t-mn}^{t-m(n-1)-1} S_{i,r}}{\sum_{r=t-mn}^{t-m(n-1)-1} \overline{S}_{i,r}} + \sum_{j \neq 1} \hat{\phi}_{1,j} \frac{\hat{S}_{j,t}}{\overline{S}_{j,t}} + \hat{\eta}_{1,t}\left(\frac{\overline{P}_{i,t} - \overline{\overline{P}}_{i,t}}{\overline{\overline{P}}_{1,t}}\right) + \hat{\pi}_i \frac{TS_t}{\overline{TS}_t} + \hat{\theta}_i \frac{S_{1,t-7}}{\overline{S}_{1,t-7}} + \frac{\hat{\sigma}^2}{2}\right)$$

Equation 2

4. Stage 2 (Share) Model a. Share Model Multipliers (Data Values, or Covariates) and Dependent Variables $F_{i,k,t}$: The fraction of demand group i equivalent sales comprised by product k in time period t (market share of product k).

$F_{i,\bullet,t}$: The average fraction of demand group i equivalent sales with respect to time period t. To allow linear modeling of the regression equation, this data value is used to provide centering.

$P_{Bi,k,t}$: The equivalent base price of product k in demand group i in time period t.

$\overline{P}_{Bi,(k),t}$: The average equivalent base price of all products other than product k in demand group i for time period t.

$P_{R\ Bi,k,t}$: The relative equivalent base price of product k in demand group i for time period $$t\left(=\frac{P_{Bi,k,t}}{\overline{P}_{Bi,(k),t}}\right).$$

$\overline{P}_{R\ Bi,\bullet,t}$: The average relative equivalent base price in demand group i for time period t.

$M_{p,i,k,t}$: The level of promotion type p (kind of promotion) for product k in demand group i in time period t. There can be up to $n_p$ promotion factors estimated in the model.

$\overline{M}_{p,i,\bullet,t}$: The average level of promotion type p in demand group i for time period t.

b. Share Model Factors (Parameters to be Estimated)

$\rho_{i,k}$: The relative base price elasticity factor for product k in demand group i.

$\sigma_{p,i,k}$: The promotion factor p for product k in demand group i. There can be up to $n_p$ promotion factors estimated in the model.

$\chi_{i,k,n}$: The time lag factor for product k in demand group i and delay of n weeks.

$\Lambda_{i,k}$: The constant (intercept) associated with product k in demand group I.

The model for predicting product share (market share) is:

$$\hat{F}_{i,k,t} = \frac{\exp\left\{\hat{\Lambda}_{i,k} + \hat{\rho}_{i,k}(P_{Ri,k,t}) + \sum_{p=1}^{n_p}\hat{\sigma}_{p,i,k}(M_{p,i,k,t}) + \sum_{n=1}^{\tau}\hat{\chi}_{i,k,n}\sum_{r=t-mn}^{t-m(n-1)-1}(F_{i,k,r})\right\}}{\sum_{l \in Dem_t}\exp\left\{\hat{\Lambda}_{i,l} + \hat{\rho}_{i,l}(P_{Ri,l,t}) + \sum_{p=1}^{n_p}\hat{\sigma}_{p,i,l}(M_{p,i,l,t}) + \sum_{n=1}^{\tau}\hat{\chi}_{i,k,n}\sum_{r=t-mn}^{t-m(n-1)-1}(F_{i,l,r})\right\}}$$

Equation 3

This model calculates demand for a product divided by demand for the demand group of the product.

The product intercept $\Lambda_{i,k}$ is not individually estimated in the model. Instead, each product is characterized according to product attributes, such as brand, size group (small/medium/large), form, flavor, etc. A store-specific estimate of the effect corresponding to each attribute level effects is obtained, and each product intercept is then constructed by summing over the applicable attribute level estimates.

Thus, $$\hat{\Lambda}_{t,k} = \sum_{a=1}^{n_a}\sum_{b=1}^{n_{b(a)}}\hat{\xi}_{a_b}\cdot I_{k,a_b},$$

where $\xi_{a_b}$ is the effect of attribute a, level b, and $I_{k,a_b}$ is an indicator variable for product $k$, = $\begin{cases} 1, & \text{if product has level } b \text{ of } a \\ 0, & \text{else} \end{cases}$ The attribute values may be used to predict sales of new products with various attribute combinations.

5. Linearization of Multinomial Logistic Equation

The multinomial logistic function that defines the market share equations for each product is nonlinear but there exist standard techniques to transform it to a linear function instead, which may make modeling easier. An example of a transformation to a linear function is as follows:

In this section the store index is ignored.

For a particular time period t:

$$\text{Let } F_{i,k} = \frac{\exp\left(\alpha_{i,k} + \sum_{p=1}^{P}\beta_p \cdot X_{pi,k} + \varepsilon_{i,k}\right)}{\sum_{J=1}^{k}\exp\left(\alpha_{i,J} + \sum_{p=1}^{P}\beta_p \cdot X_{pi,J} + \varepsilon_{i,J}\right)},$$

where $\alpha_i$ is the intercept for demand group i, $\beta$ are the covariates, and P is the number of covariates in the share model $$\log(F_{i,k}) = \alpha_{i,k} + \sum_{p=1}^{P}\beta_p \cdot X_{pi,k} + \varepsilon_{i,k} -$$

$$\log\left(\sum_{J=1}^{k}\exp\left(\alpha_{i,J} + \sum_{p=1}^{P}\beta_p \cdot X_{pi,j} + \varepsilon_{i,j}\right)\right) \text{ Let } \log(\tilde{F}_i) =$$

$$\frac{1}{k}\sum_{j=1}^{k}\log(F_{i,k}) = \overline{\alpha}_i + \sum_{p=1}^{P}\beta_p \cdot \overline{X}_{pi} + \overline{\varepsilon}_i -$$

$$\log\left(\sum_{J=1}^{k}\exp\left(\alpha_{i,J} + \sum_{p=1}^{P}\beta_p \cdot X_{pi,J} + \varepsilon_{i,J}\right)\right) \text{ Thus, } \log\left(\frac{F_{i,k}}{\tilde{F}_i}\right) =$$

$$\alpha_{i,k} + \sum_{p=1}^{P}\beta_p \cdot X_{pi,k} + \varepsilon_i - \log\left(\sum_{J=1}^{k}\exp\left(\alpha_{i,J} + \sum_{p=1}^{P}\beta_p \cdot X_{pi,J} + \varepsilon_{i,J}\right)\right) -$$

-continued $$\overline{\alpha}_i - \sum_{p=1}^{P} \beta_p \cdot \overline{X}_{pi} - \overline{\varepsilon}_i + \log\left(\sum_{J=1}^{k} \exp\left(\alpha_{i,J} + \sum_{p=1}^{P} \beta_p \cdot X_{pi,J} + \varepsilon_{i,J}\right)\right) =$$

$$(\alpha_{i,k} - \overline{\alpha}_i) + \sum_{p=1}^{P} \beta_p (X_{pi,k} - \overline{X}_{pi}) + (\varepsilon_{i,J} - \overline{\varepsilon}_i)$$

To model share in a linear framework, we simply center all covariates and model $\log(F_{1,k})-\log(\tilde{F}_1)$, where $\tilde{F}_1$ is geometric mean of $F_{1,k}$:

$$\log(F_{i,k,t}) - \log(\tilde{F}_{i,\cdot,t}) = \Lambda_{i,k,t} + \rho_{i,k}(P_{Ri,k,t} - \overline{P}_{Ri,\cdot,t}) +$$

$$\sum_{p=1}^{n_p} \sigma_{p,i,k}(M_{p,i,k,t} - \overline{M}_{p,i,\cdot,t}) + \sum_{n=1}^{\tau} \chi_{i,k,n} \sum_{r=t-mn}^{t-m(n-1)-1} (F_{i,k,r} - \overline{F}_{i,\cdot,r})$$

C. Combined (Product Sales) Model

The model for predicting sales for product k in demand group i in time period t is thus given by:

$$\hat{D}_{i,k,t} = \hat{F}_{i,k,t} \hat{S}_{i,t}$$

III. Financial Model Engine

Figure 5:
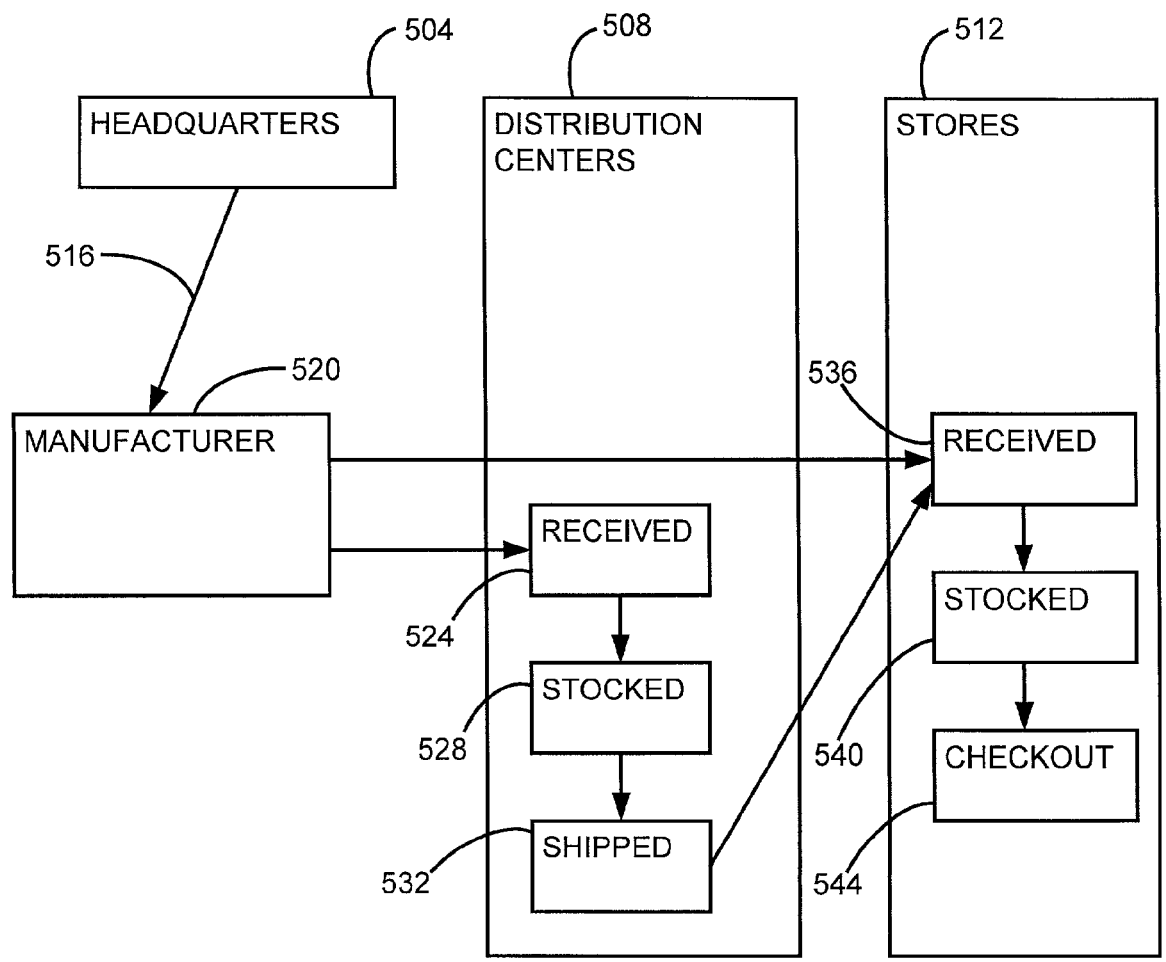
FIG. 5 is a block diagram to illustrate some of the transaction costs that occur in retail businesses of a chain of stores.

The financial model engine 108 receives data 132 from the stores 124 and may receive imputed variables (such as baseline sales and baseline prices) and data from the econometric engine 104 to calculate fixed and variable costs for the sale of each item. To facilitate understanding, FIG. 5 is a block diagram to illustrate some of the transaction costs that occur in retail businesses of a chain of stores. The chain of stores may have a headquarters 504, distribution centers 508, and stores 512. The headquarters 504 may place an order 516 to a manufacturer 520 for goods supplied by the manufacturer 520, which generates an order placement cost. The manufacturer 520 may ship the goods to one of the distribution centers 508. The receiving of the goods by the distribution center 508 generates a receiving cost 524, a cost for stocking the goods 528, and a cost for shipping the goods 532 to one of the stores 512. The store 512 receives the goods from one of the distribution centers 508 or from the manufacturer 520, which generates a receiving cost 536 and a cost for stocking the goods 540. When a customer purchases the item, the stores 512 incur a check-out cost 544. With the large number of retail chains, different purchasing and delivery processes may be used. Even within a single chain, different manufacturers may provide different invoicing and delivery procedures and costing system, which may be different than the processes illustrated in FIG. 5.

The financial model engine 108 should be flexible enough to provide a cost model for these different procedures. These different costs may have variable cost components where the cost of an item is a function of the amount of sales of the item and fixed cost components where the cost of an item is not a function of the amount of sales of the item. The financial model engine 108 uses these fixed and variable costs to determine $C_{s,i,k,t}$, where $C_{s,i,k,t}$ is a cost for a particular product (k) given a store (s), demand group (i), and a day (t). The financial model engine 108 uses industry data to provide standard estimates. For example, instead of measuring how long it takes to stock a box of an item, an industry data may be used to estimate this time. The standard estimates helps to reduce the amount of data that must be collected. In a preferred embodiment of the invention, the stores may only need to supply labor costs of the stores and distribution centers, cost of capital, size of an item, and number of items in a case to allow a cost modeling. Likewise, the preferred embodiment may infer the amount of shelf-space an item utilizes from the cubic feet of the item, the volume of sales of the item, and how often the store is replenished with the item. By using these estimations, costs may be more easily calculated on a store level, instead of being averaged over all of the stores. This is because if large amounts of data are measured by hand, measuring such data for each store would be difficult. The tailoring of costs per store allows the maximization of profits for each store. In an example of the preferred embodiment of the invention, the financial model engine 108 comprises an activity-based costing module that uses the parameters and calculations as follows:

A. DEFINITIONS

The Activity-based costing module computes variable and fixed costs for products at specific store locations. The ABC modeling component introduces the Distribution Center entity to track costing activities at retailers' distribution centers and regional stores.

Some numbers related to properties of the product. For each product a CasePack number is provided, which is the number of products in a case. A CaseCube number provides the cubic feet of each case of the product.

Certain specifiers are used to determine costs related to a distribution center. A ReceivingMethod specifier allows the specification of receiving the items by pallet or by individual cases, which specify different stocking costs. A ShelfStockMethod specifier allows the specification of the type of method that may by used to stock a shelf. For example, with baby food with many individual bottles, if the case provides a tray, which allows all bottles in the case to be quickly slid onto the shelf, then the stocking costs would be less than for a case without a tray, where all bottles must be manually lifted out of the case and placed on the shelf. If an entire box or case of an item may be placed on a shelf, the shelf stocking costs would also be less. A CaseListCost specifier specifies the wholesale price for a case. The CaseAllowance specifier specifies any discount off of the wholesale price of a case. The AllowBackhaul specifier allows the specification of a deduction provided by a manufacturer when a store is near the manufacturer so that on a return trip to a distribution center the store hauls the goods from the manufacturer. The BackhaulPerCase is the amount of the back haul discount per case. The VendorDaysCredit specifier allows the specification of the number of days of credit a manufacturer may give after shipment. The InventoryInDays specifier allows the specification of the number of days that the product is held as inventory at the distribution center.

If a wholesaler or manufacturer ships the product directly to the store, then different cost factors may be required, while distribution center related costs may be eliminated. The DropShipMethod specifier allows the specification of whether the directly shipped product is directly shipped to the shelf, a store back room or to a retailer's distribution center.

The AvgWklyCase specifier specifies the average weekly number of cases of product sold by a store. This would be the average number of units of product sold by the store divided by the number of units of product per case.

Various costs may be associated with the process of having a product shipped directly to a store. The DropShipMethod specifier is used to specify whether a manufacturer delivers a product to a store shelf, or to a store back room, or to a distribution center.

Various labor costs may be associated with different distribution centers and stores. The DCLaborRate is a specifier used to specify the average labor rate at each distribution center. The StoreStockLaborRate is a specifier used to specify the average labor rate of a stock clerk at a store. The StoreCheckoutLaborRate is a specifier used to specify the average labor rate of a cashier at a store. Each of these labor rate averages may be different between different stores and different distribution centers. Each average per store or per distribution center may be used in the database.

A ProductStorageType specifier allows the specification of dry warehouse storage for dry items, or refrigerated storage, or frozen storage, which each have different costs. A DCDryCostPFT specifier is used to specify the cost of storing dry items, per cubic foot at the distribution center. This cost may be provided by the distribution center, but an industry average may be used as a default value. A DCRefrigCostPFT specifier is used to specify the cost of storing refrigerated items, per cubic foot at the distribution center. This cost may be provided by the distribution center, but an industry average may be used as a default value. A DCFrozenCostPFT specifier is used to specify the cost of storing frozen items, per cubic foot at the distribution center. This cost may be provided by the distribution center, but an industry average may be used as a default value. A StoreDryCostPFT specifier is used to specify the cost of storing dry items, per cubic foot at the store. This cost may be provided by the store, but an industry average may be used as a default value. A StoreRefrigCostPFT specifier is used to specify the cost of storing refrigerated items, per cubic foot at the store. This cost may be provided by the store, but an industry average may be used as a default value. A StoreFrozenCostPFT specifier is used to specify the cost of storing frozen items, per cubic foot at the store. This cost may be provided by the store, but an industry average may be used as a default value.

A DCCubeSecs specifier specifies the number of seconds it takes to handle a cubic foot of product at the distribution center. This time may be provided by the distribution center or an industry average may be used as a default value. A DCCaseUnitizedSecs specifier specifies the average number of seconds required to handle a palletized load at the distribution center. This time may be provided by the distribution center or an industry average may be used as a default value. A DCCaseDeadPileSecs specifier specifies the average number of seconds required to handle a non-palletized load (a dead pile) at the distribution center. This time may be provided by the distribution center or an industry average may be used as a default value.

A StoreCubeNTSecs specifier specifies a time in seconds to handle a non-tray cubic foot of product at a store. This time may be provided by the store or an industry average may be used as a default value. A StoreCaseNTSecs specifier is used to specify a time in unitized seconds to handle a non-tray case of a product at a store. This time may be provided by the store or an industry average may be used as a default value. A StorePkgNTSecs specifier is used to specify a time in unitized seconds to handle a non-tray package of a product at a store. This time may be provided by the store or an industry average may be used as a default value. So in a case with twenty four packages, when a package is purchased one twenty fourth of a case is purchased, which may have a volume of a tenth of a cubic foot.

A StoreCubeTraySecs specifier specifies a time in seconds to handle a cubic foot of a tray product at a store. This time may be provided by the store or an industry average may be used as a default value. A StoreCaseTraySecs specifier is used to specify a time in unitized seconds to handle a case of a tray product at a store. This time may be provided by the store or an industry average may be used as a default value. A StorePkgTraySecs specifier is used to specify a time in unitized seconds to handle a package of a tray product at a store. This time may be provided by the store or an industry average may be used as a default value.

A StoreCheckoutPkgSecs specifier specifies the time it takes to check out a package of product. This time may be provided by the store or an industry average may be used as a default value. An AvgDeliveryDistance is an average distance for shipping from a distribution center to a store. A TruckCubic specifier specifies the number of cubic feet that may be loaded on a truck. A StoreLaborPct specifier specifies the percentage of store labor that is required for the different delivery methods. If a distribution center delivers an item to a store, then the StoreLaborPct is 100%, since such products must be fully processed. If a vendor delivers a product directly to a backroom of the store, then a StoreLaborPct of 75% may be used, since the store does not need to do as much work. If a vendor delivers a product directly to a store shelf, then a StoreLaborPct of 25% may be used, since the store may be allowed to do less work for such deliveries.

An AnnualOpptyCost specifier specifies the annual opportunity cost of the inventory in the distribution centers and stores. Annual opportunity cost may be calculated by determining the inventory in the distribution centers and the inventory in the stores to determine the dollar value of the inventory and then subtract the dollar value of inventory that is on credit and multiplying the difference by the cost of capital percentage. Generally, the inventory may be calculated from the raw data, so that the customer only needs to provide the cost of capital to determine annual opportunity cost. An InvoiceProcessing specifier specifies the cost of providing an invoice (placing an order for a product with a vendor) per case. A Transportation specifier specifies a cost of transporting an item per mile. A ShoppingBag specifier specifies the cost of a shopping bag.

A database would provide an identification code for each distribution center and would provide for the specification of the location of each distribution center. Similarly, each store would have an identification code and the database would also allow the specification of the location of each store. A DeliveryFrequency specifier allows the specification of the number of days between deliveries to a store.

B. COST CALCULATION

To calculate $C_{s,i,k,t}$ (the cost of a product (i) in a demand group (k) in a store (s) at a time (t) fixed and variable cost components are computed from the given data structures, as follows:

The bag cost calculation computes total shopping bag costs for a product in a distribution center's region.

1. Bag Costs

The bag cost calculation is:

$$BagCost=(DistributionCenter.ShoppingBag/0.6)*Product.CaseCube/Product.CasePack,$$

where one bag in this example is 0.6 cubic feet, so that bag cost is the cost of a bag divided by the volume of a bag, the quantity times the volume of a case of a product divided by the number of products in a case. The distribution center identifier used in the equation is so that if bags have different costs at different distribution centers, the different cost may be noted by the distribution center identifier.

2. Checkout Labor Costs

The checkout labor costs is computed as cost per package from the rate at which items are checked out and the checkout clerk's pay rate. The Checkout Labor Cost Calculation is:

CheckoutCostPerPkg=StoreCheckoutPkgSecs*StoreCheckoutLabor
Rate/3600, so that the Checkout Labor cost is the product of the store check out rate in packages per second and the store labor rate in dollars per hour divided by 3600 seconds per hour.

3. Distribution Center Inventory Costs

The Distribution Center Inventory Costs computes the inventory cost per package at a given distribution center. If a product is not stored at a distribution center, then the inventory cost is zero. If a product can be backhauled, the inventory cost is reduced by the backhaul rate. The Distribution Center Inventory Cost Calculation is as follows:

DCInvCostPerPkg=ISNULL(ProductDistributionCen-
ter.InventoryInDays,0)*(DistributionCenter.An-
nualOpptyCost/365)*(Product.CaseListCost−
Product.CaseAllowance−IIf
(Product.AllowBackHaul=1,
Product.BackhaulPerCase,0))/Product.CasePack.

The zero in the first factor allows the cost to be zero if direct shipping is used. Otherwise, the inventory costs are the inventory costs for a distribution center times the annual opportunity cost for the distribution center divided by 365 days times the cost per case minus the allowances such as a product case allowance and back haul, with the back haul discount being zero if there is no back haul, where the product is divided by the number of products per case or package.

4. Distribution Center Labor Costs

The Distribution Center's Labor Costs per package is computed depending upon the distribution center's receiving method. If a product is not shipped from the distribution center, the cost is zero. The calculation of labor costs at the distribution center calculates the time it takes to process a product at the distribution center and multiplies it by a labor rate. An example of an algorithm for calculating distribution center labor costs is as follows:

Distribution Center Labor Cost Calculation
If Product.ReceivingMethod=1 Then

DCLaborCostPerPkg=
((DistributionCenter.DCCubeSecs*Product.CaseCube/Product.
CasePack)+(DistributionCenter.DCCaseUnit-
izedSecs/Product.CasePack))*(Distribution-
Center.DCLaborRate/3600)

Else

DCLaborCostPerPkg=
((DistributionCenter.DCCubeSecs*Product.CaseCube/Product.
CasePack)+(DistributionCenter.DCCaseDead-
PileSecs/Product.CasePack))*(Distribution-
center.DCLaborRate/3600)

In the first branch of the algorithm for a unitized (palletized) load, first the number of seconds to process a cubic foot of product processed by the distribution center is multiplied by the number of cubic feet per case divided by the number of products per case to obtain the number of seconds to process a product at the distribution center. The number of seconds to process a unitized (palletized) case by the distribution center divided by the number of products per case yields the number of seconds for each product being processed by the distribution center. These two products are added to obtain a total number of second to process a product processed by the distribution center. This total is multiplied by the distribution center labor rate per hour divided by 3600 seconds per hour to obtain the distribution center labor cost for palletized product.

In the second branch of the algorithm for a dead pile (non-palletized) load, first the number of seconds to process a cubic foot of product processed by the distribution center is multiplied by the number of cubic feet per case divided by the number of products per case to obtain the number of seconds to process a product at the distribution center. The number of seconds to process a dead pile (non-palletized) case by the distribution center divided by the number of products per case yields the number of seconds for each product being processed by the distribution center. These two products are added to obtain a total number of seconds to process a product processed by the distribution center. This total is multiplied by the distribution center labor rate per hour divided by 3600 seconds per hour to obtain the distribution center labor cost for non-palletized products.

5. Distribution Center Calculations

The Distribution Center figures are aggregated by Product Type.

a. Sum of Average Weekly Cases

The SumOfAvgWklyCases specifier specifies the total of all average weekly cases of all stores for a particular product for a particular distribution center. This specifier may be calculated as follows:

SumOfAvgWklyCases=SUM(ProductLocDC.Avg-
WklyCases)

b. Count of Product Location Distribution Centers

The CountProdLocDC specifier specifies the number of stores per distribution center that sell the product.

c. Average Distribution Center Inventoried Days

The AvgOfDCInvDays specifier specifies the average number of days of inventory of a particular product at a distribution center. The distribution center may provide this number or an industry standard may be used as a default value.

d. Average Product Case Cubes

The AvgOfCaseCube specifier specifies an average cubic foot volume of a case of a product. This average may use an industrial standard as a default if a volume of a case of a product is not provided.

e. Distribution Center Space

The DCSpace specifier is a calculation of the volume of space of a product in the inventory of a distribution center. The calculation for DCSpace is as follows:

DCSpace=(AvgOfDCInvDays/7)
*SumOfAvgWklyCase*AvgOfCaseCube

The DCSpace may be the product of the Average Distribution Center Inventoried Days divided by seven (to convert days into weeks) times the Sum of the Average Weekly Cases of the product times the Average Product Case Cube to yield the volume.

f. Distribution Center Cube

The DC_Cube specifier specifies the volume of the distribution center allocated to the product. The distribution center may be divided into slots. In this embodiment, only whole numbers of slot spaces may be allocated to a product. In this example, the slot space is 80 cubic feet. Therefore, the volume used by inventory must be rounded up to the next 80 cubic feet increment. In such an example, an algorithm for calculating the number of slots allocated to the product is as follows:

If DC_Space>0 Then

DC_Cube=Int((DC_Space/80)+0.999)*80

Else

DC_Cube=0

In the first branch, if the Distribution Center Space is greater than zero, then the Distribution Center Space is divided by 80 cubic feet and the result is added to 0.999. The integer value of the resulting sum is used, so that the non-integer part of the sum is truncated. The integer value is multiplied by 80 cubic feet to convert the number of slots that are allocated to the product to a volume.

In the second branch, if the Distribution Center Space is equal to zero, no slots are allocated to the product.

g. Distribution Center Space Cost per Store

The DCSpaceCostPerStore specifier specifies distribution center space cost per store. In this embodiment, an algorithm to calculate DCSpaceCostPerStore, where dry goods are ProductStorageType 1, refrigerated goods are ProductStorageType 2 and frozen goods are ProductStorageType 3, is as follows:

If ProductStorageType=1 Then

DCSpaceCostPerStore=DC_Cube*DCDryCostPFT/(Product.CasePack*52*CountProdLocDC)

If ProductStorageType=2 Then

DCSpaceCostPerStore=DC_Cube*DCRefrigCostPFT/(Product.CasePack*52*CountProdLocDC)

If ProductStorageType=3 Then

DCSpaceCostPerStore=DC_Cube*DCFrozenCostPFT/(Product.CasePack*52*CountProdLocDC)

In the first branch of the algorithm for dry goods, first the Distribution Center Cube is multiplied by the DCDryCostPFT. This product is then divided by the product of the number of product per case times 52 weeks in a year times the number of stores per distribution center to obtain the Distribution Center Space Cost Per Store.

In the second branch of the algorithm for refrigerated goods, first the Distribution Center Cube is multiplied by the DCRefrigCostPFT. This product is then divided by the product of the number of product per case times 52 weeks in a year times the number of stores per distribution center to obtain the Distribution Center Space Cost Per Store.

In the third branch of the algorithm for refrigerated goods, first the Distribution Center Cube is multiplied by the DCFrozenCostPFT. This product is then divided by the product of the number of product per case times 52 weeks in a year times the number of stores per distribution center to obtain the Distribution Center Space Cost Per Store.

6. Invoice Processing

The Invoice Processing calculation computes the Invoice processing cost per Product. To calculate Invoice Processing (HQInvPro), the cost of Invoice Processing per case is divided by the number of products per case, as follows:

HQInvProc=InvoiceProcessing/Product.CasePack

7. Product Location Space

The Product Location (store) Space calculation computes a store's available space for a product.

a. Average Delivery Frequency Calculation

The AvgDeliveryFreq specifier specifies the average number of deliveries to a store per week averaged over several weeks. An equation to calculate AvgDeliveryFreq is:

AvgDeliveryFreq=AVG(Location.DeliveryFrequency)

b. Sum of Average Weekly Cases Calculation

The SumOfAvgWklyCases specifier is the sum of the AvgWklyCases over several weeks.

SumOfAvgWklyCases=SUM(.AvgWklyCases)

c. Average Case Cube Calculation

The AvgCaseCube specifier specifies the average volume of a case of a product.

d. Location (Store) Cube Calculation

The LocationCube specifier specifies the volume of the store (location) that the product takes up on the shelf and/or back room. An equation for calculating LocationCube may be as follows:

LocationCube=(0.5*Product.CaseCube)+(Product.CaseCube*AvgWklyCases/DeliveryFrequency)

A volume of half a case is the first term. The second term is the volume of a case times the average number of cases delivered weekly divided by the frequency of deliveries per week, which estimates the volume of inventory delivered to the store with each delivery. So this sum estimates that the store will need a volume of about the volume for each delivery plus half a case to be used for the product.

e. Location Space Cost Calculation

After determining the volume of a product in the store, the store space cost (LocationSpaceCost) may be calculated. This cost is dependent upon whether the product is a dry item ProductStorageType=1, a refrigerated item ProductStorageType=2, or a frozen item ProductStorageType=3.

If ProductStorageType=1 Then

LocationSpaceCost=LocationCube*StoreDryCostPFT/(Product.CasePack*52)

If ProductStorageType=2 Then

LocationSpaceCost=LocationCube*StoreRefrigCostPFT/(Product.Casepack*52)

If ProductStorageType=3 Then

LocationSpaceCost=LocationCube*StoreFrozenCostPFT/(Product.Casepack* 52)

In the first branch of the algorithm for dry goods, first the Location (store) Cube is multiplied by the StoreDryCostPFT to obtain a store storage cost per week. This product is then divided by the product of the number of product per case times 52 weeks in a year to obtain the Location Space Cost, which is the store storage cost per week per item of product.

In the second branch of the algorithm for refrigerated goods, first the Location (store) Cube is multiplied by the StoreRefrigCostPFT to obtain a store storage cost per week. This product is then divided by the product of the number of product per case times 52 weeks in a year to obtain the Location Space Cost, which is the store storage cost per week per item of product.

In the third branch of the algorithm for refrigerated goods, first the Location (store) Cube is multiplied by the StoreFrozenCostPFT to obtain a store storage cost per week. This product is then divided by the product of the number of product per case times 52 weeks in a year to obtain the Location Space Cost, which is the store storage cost per week per item of product.

8. Transportation Cost Per Package

The Transportation Cost Per Package (TransCostPerPkg) computes the cost to truck products to stores. Transportation Cost Per Package may be calculated as follows:

TransCostPerPkg=Product.CaseCube/
(TruckCubic*Product.CasePack)
*Transportation*AvgDeliveryDistance The volume of the case is divided by the product of the volume of the truck times the number of items in each case. The result is multiplied by the cost per mile of delivery times the average delivery distance.

9. Product Location (Store) Inventory Cost

The Product Location Inventory Cost calculation computes a store's inventory cost for a product. An equation for calculating Product Location Inventory Cost may be as follows:

ProductLocInvCost=(((LocationCube*0.75/Product-
.CaseCube)/SumOfAvgWklyCases)−(Vendor-
DaysCredit/7))*((Product.CaseListCost−Product-
.CaseAllowance−IIf(Product.AllowBackhaul=1,
Product.BackhaulPerCase,0))/Product.CasePack)
*AnnualOpptyCost/52

The volume of inventory in a store LocationCube is multiplied by 0.75. The 0.75 is an estimated adjustment since items are always being sold so that the actual inventory is a bit less than the actual volume of product delivered. This product is divided by the number of items per case. This result is divided by the Sum of the Average Weekly Cases to obtain an average cost per item. Then the Vendors Days Credit is divided by seven to get Vendor weeks credit, which is subtracted from the average cost per item. This difference is multiplied by the product list cost minus any allowances or discounts and back haul discounts and divided by the number of products per case to obtain the cost per product. This product is multiplied by the annual opportunity cost divided by 52 weeks in a year.

10. Location Receiving Stock Cost

The Location Receiving Stock Cost computes the labor cost to stock shelves. The cost depends upon tray and non-tray stocking rates. Products are marked as tray or non-tray stock depending upon the product's shelf stocking method.

An algorithm for calculating Location Receiving Stock is as follows:

If ProductShelfStockingMethod=2 Then

LocationRcvgStkCost=
((DistributionCenter.StoreCubeNTSecs*Product.CaseCube/
Product.CasePack)+(DistributionCenter.Store-
CaseNTSecs/Product.CasePack)+Distribution-
Center.StorePkgNTSecs)*DistributionCenter-
.StoreStockLaborRate/3600

Else

LocationRcvgStkCost=
((DistributionCenter.StoreCubeTraySecs*Product.CaseCube/
Product.CasePack)+(DistributionCenter.Store-
CaseTraySecs/Product.CasePack)+Distribution-
Center.StorePkgTraySecs)*DistributionCenter-
.StoreStockLaborRate/3600

In the first branch of the algorithm for a non-tray stocked item, first the time in seconds to handle a cubic foot of a non-tray product at a store is multiplied by the cubic feet of each case of the product divided by the number of products per case to obtain the number of products per second of the non-tray product is stocked on the shelves. The time in unitized seconds to handle a non-tray case of a product at a store divided by the number of products per case yields the time per product of handling a product in stocking the shelves. These two products are added to obtain a total number of seconds per product for stocking the non-tray product on the shelves. This total is multiplied by the store stocking labor rate per hour divided by 3600 seconds per hour to obtain the cost of stocking the non-tray product on the shelf. In the second branch of the algorithm for a tray stocked item, first the time in seconds to handle a cubic foot of a tray product at a store is multiplied by the cubic feet of each case of the product divided by the number of products per case to obtain the number of products per second of the tray product is stocked on the shelves. The time in unitized seconds to handle a tray case of a product at a store divided by the number of products per case yields the time per product of handling a product in stocking the shelves.

These two products are added to obtain a total number of seconds per product for stocking the tray product on the shelves. This total is multiplied by the stocking labor rate per hour divided by 3600 seconds per hour to obtain the cost of stocking the tray product on the shelf.

11. Product Location Variable Cost Calculation

The ProdLocVariableCost specifier specifies variable cost for each product given a store, demand group, and day. In other embodiments of the invention the time period may be a week instead of a day. The ProdLocVariableCost specifier may be computed from the following equation:

ProdLocVariableCost=BagCost+ProductLocInvCost+
CheckoutCostPerPkg+LocationRcvgStkCost+
TransCostPerPkg+DCInvCostPerPkg+DCLabor-
CostPerPkg+HQInvProc 12. Fixed Cost Calculation ProdLocFixedCost is the Fixed cost for each product given a store, demand group, and day, may be computed from a combination of costs computed above.

The fixed cost of a product may be calculated by the equation:

ProdLocFixedCost=LocationSpaceCost+DCSpace-
CostPerStore

13. $C_{s,i,k,t}$ Calculation

Where $C_{s,i,k,t}$, is a cost for a particular product (k) given a store (s), demand group (i), and a day (t), $C_{s,i,k,t}$, may be calculated as:

$C_{s,i,k,t}$=ProdLocVariableCost+ProdLocFixedCost.

IV. Price Optimization Engine and Support Tool

A. Overview

Figure 4:
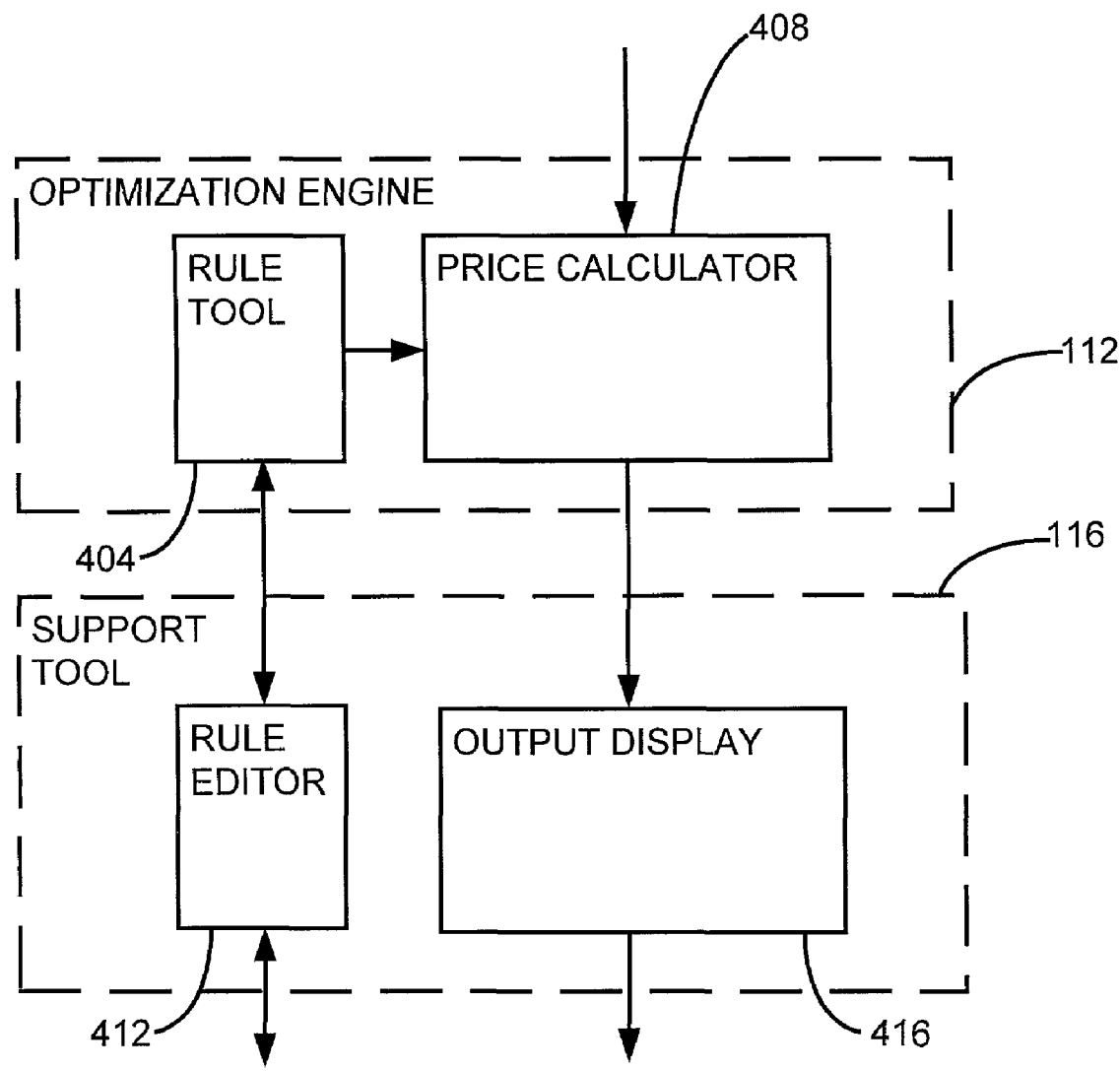
FIG. 4 is a more detailed schematic view of an optimization engine and support tool.

FIG. 4 is a more detailed schematic view of the optimization engine 112 and the support tool 116. The optimization engine 112 comprises a rule tool 404 and a price calculator 408. The support tool 116 comprises a rule editor 412 and an output display 416.

In operation, the client (stores 124) may access the rule editor 412 of the support tool 116 and provides client defined rule parameters (step 228). If a client does not set a parameter for a particular rule, a default value is used. Some of the rule parameters set by the client may be constraints to the overall weighted price advance or decline, branding price rules, size pricing rules, unit pricing rules, line pricing rules, and cluster pricing rules. These rules will be discussed in more detail regarding the preferred embodiment of the invention. The client defined parameters for these rules are provided to the rule tool 404 of the optimization engine 112 from the rule editor 412 of the support tool 116. Within the rule tool 404, there may be other rules, which are not client defined, such as a group sales equation rule. The rule parameters are outputted from the rule tool 404 to the price calculator 408. The demand coefficients 128 and cost data 136 are also inputted into the price calculator 408. The client may also provide to the price calculator 408 through the support tool 116 a desired optimization scenario rules. Some examples of scenarios may be to optimize prices to provide the optimum profit, set one promotional price and the optimization of all remaining prices to optimize profit, or optimized prices to provide a specified volume of sales for a designated product and to optimize price. The price calculator 408 then calculates optimized prices. The price calculator 408 outputs the optimized prices to the output display 416 of the support tool 116, which allows the stores 124 to receive the optimized pricing (step 232). In preferred embodiments, the rules and optimizing algorithm are as follows:

B. Preferred Embodiment of Optimization Module

The optimization engine uses the group sales equation and the market share equation previously defined in the section on the econometric engine to predict group sales and product market share, respectively. These two are then combined to predict product sales at the store level. The three equations are produced here:

1. First Stage Prediction

The predictive model for the group sales is:

$$\ln\left(\frac{\hat{S}_{S,i,t}}{S_{S,Bi,t}}\right) = \hat{K}_{s,i} + \hat{\gamma}_{s,i}\frac{P_{s,i,t}}{\overline{P}_{s,i,t}} + \hat{v}_{s,i}M_{s,i,t} +$$

$$\hat{\psi}_{s,i}X_{s,i,t} + \hat{\kappa}_{s,i}X_{s,i,t}\frac{P_{s,i,t}}{\overline{P}_{s,i,t}} + \sum_{n=1}^{\tau}\hat{\delta}_{i,n}\frac{\sum_{r=t-mn}^{t-m(n-1)-1}S_{S,i,r}}{\sum_{r=t-mn}^{t-m(n-1)-1}\overline{S}_{S,i,r}} +$$

$$\sum_{j\neq i}\hat{\phi}_{S,i,j}\frac{\hat{S}_{s,j,t}}{\overline{S}_{s,j,t}} + \hat{\eta}_{s,i,t}\left(\frac{\overline{P}_{s,i,t}-\overline{P}_{s,i,t}}{\overline{P}_{s,i,t}}\right) + \hat{\pi}_{s,i}\frac{TS_{s,t}}{T\overline{S}_{s,t}} + \hat{\theta}_{s,i}\frac{S_{s,i,t-7}}{\overline{S}_{s,i,t-7}}$$

2. Second Stage Prediction

The predictive model for estimating the fraction of group sales due to a product is:

$$\hat{F}_{s,i,k,t} = \frac{\exp\left\{\hat{\Lambda}_{s,i,k} + \hat{\rho}_{s,i,k}(P_{s,Ri,k,t}) + \sum_{p=1}^{n_p}\hat{\sigma}_{s,p,i,k}(M_{s,p,i,k,t}) + \sum_{n=1}^{\tau}\hat{\chi}_{s,i,k,n}\sum_{r=t-mn}^{t-m(n-1)-1}(F_{s,i,k,r})\right\}}{\sum_{l\in Dem_t}\exp\left\{\hat{\Lambda}_{s,i,l} + \hat{\rho}_{s,i,l}(P_{s,Ri,l,t}) + \sum_{p=1}^{n_p}\hat{\sigma}_{s,p,i,l}(M_{s,p,i,l,t}) + \sum_{n=1}^{\tau}\hat{\chi}_{s,i,k,n}\sum_{r=t-mn}^{t-m(n-1)-1}(F_{s,i,l,r})\right\}}$$

The predictive model for demand for a given product is then given by $$\hat{D}_{s,i,k,t} = \hat{F}_{s,i,k,t}\hat{S}_{s,i,t}$$

3. The Optimization Model

Regression models and the predictive equations derived from the above equations are used to construct the optimization model.

The objective is to maximize profit:

$$\sum_{l\in G}\sum_{k\in Dem_t}\hat{D}_{s,i,k,t}(P_{s,i,k,t}-C_{s,i,k,t}) = \sum_{l\in G}\sum_{k\in Dem_t}\hat{F}_{s,i,k,t}\hat{S}_{s,i,t}(P_{s,i,k,t}-C_{s,i,k,t})$$

and the constraints are:

a. Obey the Regression Equations Governing $$\hat{S}_{i,t}\,\forall\,i,k$$

$$\ln\left(\frac{\hat{S}_{s,i,t}}{S_{s,Bi,t}}\right) = \hat{K}_{s,i} + \hat{\gamma}_{s,i}\frac{P_{s,i,t}}{\overline{P}_{s,i,t}} + \hat{v}_{s,i}M_{s,i,t} +$$

$$\hat{\psi}_{s,i}X_{s,i,t} + \hat{\kappa}_{s,i}X_{s,i,t}\frac{P_{s,i,t}}{\overline{P}_{s,i,t}} + \sum_{n=1}^{\tau}\hat{\delta}_{i,n}\frac{\sum_{r=t-mn}^{t-m(n-1)-1}S_{s,i,r}}{\sum_{r=t-mn}^{t-m(n-1)-1}\overline{S}_{s,i,r}} +$$

$$\sum_{j\neq i}\hat{\phi}_{s,i,j}\frac{\hat{S}_{s,j,t}}{\overline{S}_{s,j,t}} + \hat{\eta}_{s,i,t}\left(\frac{\overline{P}_{s,i,t}-\overline{P}_{s,i,t}}{\overline{P}_{s,i,t}}\right) + \hat{\pi}_{s,i}\frac{TS_{s,t}}{T\overline{S}_{s,t}} + \hat{\theta}_{s,i}\frac{S_{s,i,t-7}}{\overline{S}_{s,i,t-7}}$$

b. Obey the Market Share Equations $$\hat{F}_{s,i,k,t} = \frac{\exp\left\{\hat{\Lambda}_{s,i,k} + \hat{\rho}_{s,i,k}(P_{s,Ri,k,t}) + \sum_{p=1}^{n_p}\hat{\sigma}_{s,p,i,k}(M_{s,p,i,k,t}) + \sum_{n=1}^{\tau}\hat{\chi}_{s,i,k,n}\sum_{r=t-mn}^{t-m(n-1)-1}(F_{s,i,k,r})\right\}}{\sum_{l\in Dem_t}\exp\left\{\hat{\Lambda}_{s,i,l} + \hat{\rho}_{s,i,l}(P_{s,Ri,l,t}) + \sum_{p=1}^{n_p}\hat{\sigma}_{s,p,i,l}(M_{s,p,i,l,t}) + \sum_{n=1}^{\tau}\hat{\chi}_{s,i,k,n}\sum_{r=t-mn}^{t-m(n-1)-1}(F_{s,i,l,r})\right\}}$$

c. Constrain Price Changes to be within a Given Range of Current Prices.

$$PMIN_{s,i,k,t} \leq P_{s,i,k,t} \leq PMAX_{s,i,k,t}$$

To simplify notation, the time index may be removed from the equations. Next, all constant terms in each of the expressions may be grouped together. So the objective becomes:

Maximize:

$$\sum_{l\in G}\sum_{k\in Dem_t}\hat{F}_{s,i,k}\hat{S}_{s,i}(P_{s,i,k}-C_{s,i,k})$$

The regression equations for $\hat{S}_{i,t} \forall i,k$ become $$\log(\hat{S}_{s,i}) = \alpha_{s,i} + b_{s,i} \sum_{k \in Dem_t} P_{s,i,k} F_{s,i,k} + \sum_{\substack{j \in G \\ j \neq i}} c_{s,i,j} S_{s,j} + const_{s,i} \text{ where } c_{s,i,J} =$$

$$\frac{\overline{S}_{s,i}}{\overline{S}_{s,i}} \hat{\phi}_{s,i,j}, \quad b_{s,i} = \frac{\overline{S}_{s,i}}{\overline{P}_{s,i}} (\hat{\gamma}_{s,i} + \hat{\kappa} X_{s,i}) \; a_{s,i} =$$

$$\frac{\overline{S}_{s,i} \pi_{s,i}}{\overline{TS}_s} \; Const_{s,i} = \log(\overline{S}_{s,i}) + \sum_{n=1}^{\tau} \hat{\delta}_{s,i,n} \frac{\sum_{r=t-mn}^{t-m(n-1)-1} S_{s,i,r}}{\sum_{r=t-mn}^{t-m(n-1)-1} \overline{S}_{s,i,r}} + \hat{\psi}_{s,i} X_{s,i} -$$

$$\hat{\gamma}_{s,i} + \hat{\eta}_{s,i} (\overline{P}_{s,i,t} - \overline{P}_{s,i,t}) - \hat{k}_{s,i} X_{s,i} + \hat{v}_{s,i} R_{s,i} + \hat{\theta}_{s,i} \frac{S_{s,i,t-7}}{\overline{S}_{s,i,t-7}} + K_{s,i}$$

Similarly, the regression equations for the market share fractions become:

$$\hat{F}_{s,i,k} = \frac{\exp\left\{\frac{\hat{\rho}_{s,i,k}}{\overline{P}_{s,i,k}} P_{s,i,k} + Const_{s,i,k}\right\}}{\sum_{l \in Dem_t} \exp\left\{\frac{\hat{\rho}_{s,i,l}}{\overline{P}_{s,i,l}} P_{s,i,l} + Const_{s,i,l}\right\}} \text{ where } Const_{s,i,k} =$$

$$-\rho_{s,i,k} + \hat{\sigma}_{s,i,l} R_{s,i,l} + \sum_{n=1}^{\tau} \hat{\chi}_{s,i,k,n} \frac{\sum_{r=t-mn}^{t-m(n-1)-1} F_{s,i,k,r}}{\sum_{r=t-mn}^{t-m(n-1)-1} \overline{F}_{s,i,k,r}} + \hat{\Lambda}_{s,i,k}$$

With this, the optimization problem may be written as:

4. Problem P1

Maximize:

$$\sum_{s \in Stores} \sum_{i \in G} \sum_{k \in Dem_t} \frac{\exp\left\{\frac{\hat{\rho}_{s,i,k}}{\overline{P}_{s,i,k}} P_{s,i,k} + Const_{s,i,k}\right\}}{\sum_{l \in Dem_t} \exp\left\{\frac{\hat{\rho}_{s,i,l}}{\overline{P}_{s,i,l}} P_{s,i,l} + Const_{s,i,l}\right\}} \hat{S}_{s,i}(P_{s,i,k} - C_{s,i,k})$$

Subject to a. $\log(\hat{S}_{s,i}) = a_{s,i} + b_{s,i} \sum_{k \in Dem_t} P_{s,i,k} F_{s,i,k} + \sum_{\substack{j \in G \\ j \neq i}} c_{s,i,j} S_{s,j} + const_{s,i}$, b. $\hat{F}_{s,i,k} = \frac{\exp\left\{\frac{\hat{\rho}_{s,i,k}}{\overline{P}_{s,i,k}} P_{s,i,k} + Const_{s,i,k}\right\}}{\sum_{l \in Dem_t} \exp\left\{\frac{\hat{\rho}_{s,i,l}}{\overline{P}_{s,i,l}} P_{s,i,l} + Const_{s,i,l}\right\}}$ and c. $PMIN_{s,i,k} \leq P_{s,i,k} \leq PMAX_{s,i,k}$ Now, in addition to the constraints listed above, the preferred embodiment may model several other business rules via constraints. These include limits on group price advance or decline, brand pricing rules, size pricing rules, and unit pricing rules.

d. Group Price Advance or Decline.

Since demand groups are made up of like or substitutable products, managers often wish to constrain the overall weighted price advance or decline in price for them, where the weights are the market shares of the products that constitute the demand groups. The constraints are:

$$\forall s, i, PMIN_{s,i} \leq \sum_k F_{s,i,k} P_{s,i,k} \leq PMAX_{s,i}$$

e. Brand Pricing Rules:

Products are described and categorized by attributes such as brand, size and flavor. Therefore, each product may be associated with a set of attributes and values. These attributes are useful to us for several reasons. The attributes may be used in the regression modeling in order to create a parsimonious set of regression coefficients. They may also be used in setting rules. For instance, category managers might wish to offer store brands at lower prices compared to the competing national brands. They might also wish to constrain some product brands to be less expensive than others, either for strategic considerations or to meet their contractual obligations. Specifically, a manager can create a set $Brand_{s,i} = \{(p_{s,i,1}, p_{s,i,k_2}): p_{s,i,k_1} \text{ must cost less than } p_{s,i,k_2}\}$, which leads to the following constraints:

$\forall s, i$ and $(p_{s,i,k_1}, p_{s,i,k_2}) \in Brand_{s,i} p_{s,i,k_1} \leq p_{s,i,k_2}$ f. Size Pricing Rules:

Managers might also wish to create rules that relate the price of one product versus another based on their sizes. For instance, they might wish for products belonging to the same brand and sharing other attributes, but with different sizes to be priced such that the larger sized product costs less per equivalent unit of measure than a smaller one. They $cSize_{s,i,1}, p_{s,i,k_2}): p_{s,i,k_1}$ must cost less than $p_{s,i,k_2}$ an create a set, which leads to the following constraints:

$\forall s, i$ and $(p_{s,i,k_1}, p_{s,i,k_2}) \in Size_{s,i} p_{s,i,k_1} = p_{s,i,k_2}$ g. Unit Pricing Rules:

Continuing in the same vein, managers might wish to ensure that two products that are identical in every respect but size should be priced such that the larger product costs more than the smaller one. This rule is closely related to the size pricing rule. To implement this rule, managers can create a set $Unit_{s,i} = \{(p_{s,i,1}, p_{s,i,k_2}): e_{s,i,k_1} p_{s,i,k_1} \text{ must cost less than } e_{s,i,k_2} p_{s,i,k_2}\}$, where $e_{s,i,k}$ is the multiplicative factor to convert equivalent units into whole product units. This leads to the following constraints:

$\forall s, i$ and $(p_{s,i,k_1}, p_{s,i,k_2}) \in Unit_{s,i} e_{s,i,k_1} p_{s,i,k_1} \leq e_{s,i,k_2} p_{s,i,k_2}$ h. Line Pricing Rules:

Retail customers expect common prices for certain groups of products such as, for example, cough lozenges of the same brand but different flavors. These rules may be classified as line pricing rules and implement them as follows. Product groups called line price groups may be defined as $L_l l = 1, \ldots \|L\|$, where every product within a line group must have the same price in a store; i.e., $\forall L_l l = 1, \ldots \|L\|$, and $\forall k_1, k_2 \in L_l P_{s,i,k_1} = P_{s,i,k_2}$ i. Cluster Pricing:

Retailers define geographic and other regions within which they maintain the same price for a given product. This may be translated to the notion of store clusters. A store cluster $Cluster_c$ is a set of stores such that the price of every product is invariant within the cluster. In other words, every product has the same price in every store within the cluster although each product may have a different price. In order to implement these constraints the set of stores may be partitioned into store clusters Cluster$_1$, ..., Cluster$_{\|C\|}$ where C≡{Cluster$_1$, ..., Cluster$_{\|C\|}$}, and define a new price variable $P_{c,i,k}$ which represents the common price for product k in cluster Cluster$_c$. This variable may be used in place of the original price variable $P_{s,i,k}$ whenever s∈Cluster$_c$. The entire problem P1 can be rewritten as P2:

5. Problem P2:

Maximize:

$$\sum_{c=1}^{\|C\|} \sum_{s \in Cluster_c} \sum_{i \in G} \sum_{k \in Dem_t} \frac{\exp\left\{\frac{\hat{P}_{s,i,k}}{\overline{P}_{s,i,k}} P_{c,i,k} + Const_{s,i,k}\right\}}{\sum_{l \in Dem_t} \exp\left\{\frac{\hat{P}_{s,i,l}}{\overline{P}_{s,i,l}} P_{c,i,l} + Const_{s,i,l}\right\}} \hat{S}_{s,i}(P_{c,i,k} - C_{s,i,k})$$

(Profit Maximizing Objective)

Subject to:

a. $\log(\hat{S}_{s,i}) = a_{s,i} + b_{s,i} \sum_{k \in Dem_t} P_{s,i,k} F_{s,i,k} + \sum_{\substack{j \in G \\ j \neq i}} c_{s,i,j} S_{s,j} +$ const$_{s,i}$, (Group Sales equation)

b. $\hat{F}_{s,i,k} = \frac{\exp\left\{\frac{\hat{P}_{s,i,k}}{\overline{P}_{s,i,k}} P_{s,i,k} + Const_{s,i,k}\right\}}{\sum_{l \in Dem_t} \exp\left\{\frac{\hat{P}_{s,i,l}}{\overline{P}_{s,i,l}} P_{s,i,l} + Const_{s,i,l}\right\}}$ (Market Share equation)

c. $\forall c, s \in Cluster_c, i, PMIN_{s,i} \leq \sum_k F_{s,i,k} P_{s,i,k} \leq$ $PMAX_{s,i}$ (Group price advance/decline)

d. PMIN$_{c,i,k} \leq P_{c,i,k} \leq$ PMAX$_{c,i,k}$, $\forall i,k$ (Product price advance/decline)

e. $\forall c,i$ and $(p_{c,i,k_1}, p_{c,i,k_2}) \in$ Brand$_{c,i}$, $p_{c,i,k_1} \leq p_{c,i,k_2}$ (Brand Pricing)

f. $\forall c,i$ and $(p_{c,i,k_1}, p_{c,i,k_2}) \in$ Size$_{c,i}$, $p_{c,i,k_1} \leq p_{c,i,k_2}$ (Size Pricing)

g. $\forall c,i, (p_{c,i,k_1}, p_{c,i,k_2}) \in$ Unit$_{c,i}$, s∈Cluster$_c$, $e_{s,i,k_1} \leq e_{s,i,k_2} p_{c,i,k_2}$ (Unit Pricing)

h. $\forall L_l, l=1, \ldots \|L\|$, $\forall k_1, k_2 \in L_l$, $\forall c, P_{c,i,k_1} = P_{c,i,k_2}$ (Line Pricing)

The optimization problem P2 has the following features: the objective and the group sales equations are nonlinear, while the rest of the constraints are linear. In the preferred embodiment, a heuristic approach is used to generate a good feasible starting point for the problem, if one exists. The heuristic works by repeatedly solving a related problem involving all the linear constraints 4-8, a set of linear constraints that approximate the group price advance and decline constraints (3), and an objective that involves the marginal contribution to profit of each product.

6. Heuristic to Generate the Feasible Solution:

The problem may be decomposed by store cluster and hence attention may be restricted to a single cluster Cluster$_c$. for this explanation.

In the preferred embodiment, the heuristic focuses on finding good initial feasible solutions to the problem. First, a related problem is defined.

The market shares of all products are calculated based on a set of initial prices. Then these initial market shares are used as fixed weights to develop linear constraints that limit the advance and decline of demand group prices at each store. Specifically, let $$\overline{p}_{Cluster_c,i} = \begin{pmatrix} P_{c,i,k} \\ \vdots \\ P_{c,i,|Dem_t|} \end{pmatrix}, \overline{p}_{Cluster_c} = \begin{pmatrix} \overline{p}_{Cluster_c,1} \\ \vdots \\ \overline{p}_{Cluster_c,|G|} \end{pmatrix}, \text{ and}$$

-continued $$G_{s,i,k}(\overline{p}_{Cluster_c,i}) \equiv \frac{\exp\left\{\frac{\hat{P}_{s,i,k}}{\overline{P}_{s,i,k}} P_{c,i,k} + Const_{s,i,k}\right\}}{\sum_{l \in Dem_t} \exp\left\{\frac{\hat{P}_{s,i,l}}{\overline{P}_{s,i,l}} P_{c,i,l} + Const_{s,i,l}\right\}} \forall s \in Cluster_c,$$

the market share of product k at store s given price vector $\overline{p}_{Cluster_c,i}$ at the store for demand group i. Then, if the initial price vectors are $\overline{q}_{Cluster_c,i}$, $\forall s \in$ Cluster$_c$, i, the approximate group price constraints are defined to be:

$\forall s \in$ Cluster$_c$, $\forall i, PMIN_{s,i} \leq \sum_k G_{s,i,k}(\overline{q}_{Cluster_c,i}) P_{c,i,k} \leq PMAX_{s,i}$.

Note that the weights $G_{s,i,k}(\overline{q}_{Cluster_c,i})$ are constants and so the constraints are linear in $P_{c,i,k}$. Now problem P3 is defined as follows:

7. Problem P3($\overline{q}_{Cluster_c}$)

Maximize:

$$\sum_{s \in Cluster_c} \sum_{i \in G} \sum_{k \in Dem_t} \frac{\exp\left\{\frac{\hat{P}_{s,i,k}}{\overline{P}_{s,i,k}} P_{c,i,k} + Const_{s,i,k}\right\}}{\sum_{l \in Dem_t} \exp\left\{\frac{\hat{P}_{s,i,l}}{\overline{P}_{s,i,l}} P_{c,i,l} + Const_{s,i,l}\right\}} (P_{c,i,k} - C_{s,i,k})$$

Subject to:

1. $\forall s \in$ Cluster$_c$, $\forall i, PMIN_{s,i} \leq$ $\sum_k G_{s,i,k}(\overline{q}_{Cluster_c,i}) P_{c,i,k} \leq PMAX_{s,i}$ (Group Pricing-approximate)

2. PMIN$_{c,i,k} \leq P_{c,i,k} \leq$ PMAX$_{c,i,k}$, $\forall i,k$ (Product price advance/decline)

3. $\forall i$ and $(p_{c,i,k_1}, p_{c,i,k_2}) \in$ Brand$_{c,i}$ $p_{c,i,k_1} \leq p_{c,i,k_2}$ (Brand Pricing)

4. $\forall i$ and $(p_{c,i,k_1}, p_{c,i,k_2}) \in$ Size$_{c,i}$, $p_{c,i,k_1} \leq p_{c,i,k_2}$ (Size Pricing)

5. $\forall i$, $(p_{c,i,k_1}, p_{c,i,k_2}) \in$ Unit$_{c,i}$, s∈Cluster$_c$, $e_{s,i,k_1} p_{c,i,k_1} \leq e_{s,i,k_2} p_{c,i,k_2}$ (Unit Pricing)

6. $\forall L_l, l=1, \ldots \|L\|$, $\forall k_1, k_2 \in L_1$, $P_{c,i,k_1} = P_{c,i,k_2}$ (Line Pricing)

Problem P3 has a nonlinear objective but only linear constraints. Note that the Problem P3 does not include group sales. The objective maximizes the sum of marginal profit for all products over all the stores in the cluster. This approach may be easily extended to include a multiplier that approximates the group sales of all groups over all stores.

Figure 6:
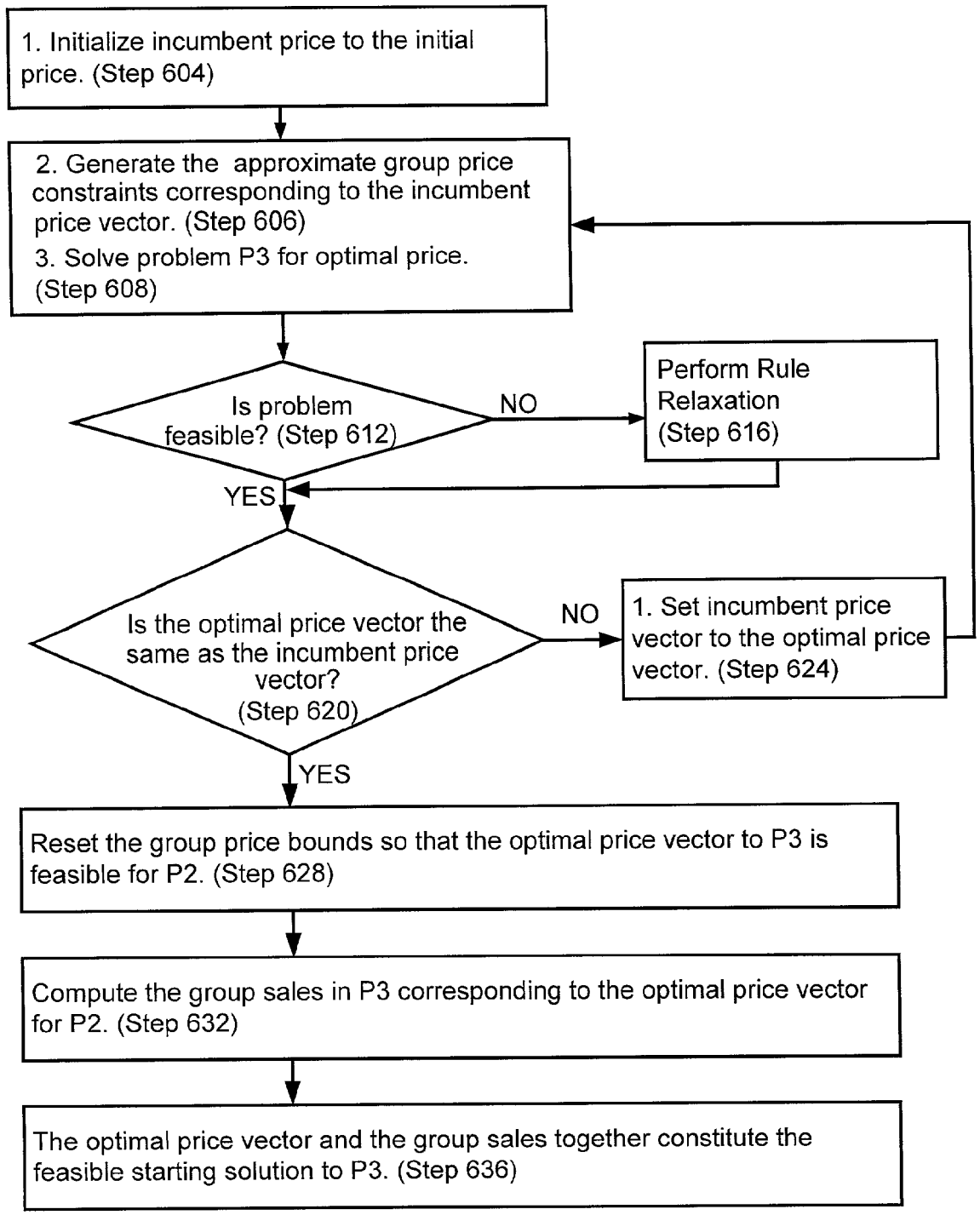
FIG. 6 is a flow chart of the preferred embodiment of the invention for providing an initial feasible solution.

To facilitate understanding, FIG. 6 is a flow chart of the preferred embodiment of the invention for providing a good initial feasible solution derived by solving Problem P3 iteratively as follows:

1. Set current incumbent prices to equal initial prices, which are prices currently used by the stores (step 604).
2. Set $q_{Cluster_c}$ to be the set current incumbent prices for products at the stores in the cluster. Calculate the product market shares for each product at each store and generate the approximate group price constraints as a function of $q_{Cluster_c}$ (Step 606). Solve problem P3($\bar{q}_{Cluster_c}$) for the optimal solution $\bar{p}_{Cluster_c}$ (Step 608). Check to see if problem is feasible (Step 612). If the problem is infeasible, then the rule relaxation process is performed as discussed below in part V entitled "Rule Relaxation" (Step 616).
3. Compare the optimal solution $\bar{p}^*_{Cluster_c}$ to the problem P3($\bar{q}_{Cluster_c}$) to $\bar{q}_{Cluster_c}$ (Step 620). If they are the same, then go to step 5. Else
4. Let $\bar{q}_{Cluster_c} = \bar{p}^*_{Cluster_c}$ (Step 624) and go to step 2.
5. Redefine the bounds $PMIN_{c,t}$ and $PMAX_{c,t}$ as follows:

$$PMIN_{s,i} \equiv MIN\left(PMIN_{s,i}, \sum_k G_{s,i,k}(\bar{p}_{Cluster_c,i})P_{c,i,k}\right) \text{ and}$$

$$PMAX_{s,i} \equiv MAX\left(PMAX_{s,i}, \sum_k G_{s,i,k}(\bar{p}_{Cluster_c,i})P_{c,i,k}\right).$$

This ensures that $\bar{p}^*_{Cluster_c}$ is feasible for P2 (Step 628).
6. Compute the group sales corresponding to $\bar{p}^*_{Cluster_c}$. This is done by solving P2 with $\bar{p}_{Cluster_c}$ fixed (Step 632).
7. Use resulting optimal price vector $\bar{p}^*_{Cluster_c}$ and group sales as a feasible starting solution to P3 (Step 636).

In practice, convergence is declared in step 2 when the change in prices is below an acceptable tolerance threshold.

This method turns out to have several advantages. First, it finds an initial feasible solution by solving iteratively a non-linear problem with linear constraints. Problem P3 is considerably easier to solve than Problem P1 and Problem P2. Second, the initial feasible solution turns out to be a good starting solution to Problem P2. It converges quite quickly from this starting point. Therefore these initial feasible solutions are provided as a starting point for solving Problem P2.

An example of this would have two products A and B. Each would be currently priced in the store at $1. In this example the rules only provide one constraint, which in this example is the Group price advance/decline constraint so that $\forall c, s \in Cluster_c, i$, $$PMIN_{s,i} \leq \sum_k F_{s,i,k}P_{s,i,k} \leq PMAX_{s,i}.$$

Therefore, for step 604, the current incumbent prices are set equal to the current price in the store ($1). Using the demand and market share models, the market share for each product A and B is calculated for the given incumbent prices of $1. For example, the market share of A may be calculated to be 50% (0.5) and the market share of B may be calculated to be 50% (0.5). Therefore, the constraint $$PMIN_{s,i} \leq \sum_k F_{s,i,k}P_{s,i,k} \leq PMAX_{s,i}$$

may be approximated by $PMIN_{s,i} \leq F_A P_A + F_B P_B \leq PMAX_{s,i}$, which yields the constraint equation $PMIN_{s,i} \leq (0.5)P_A + (0.5)P_B \leq PMAX_{s,i}$ (Step 606). The present incumbent prices of $1, the linear constraint equation, and the non-linear objective of maximizing profit are solved with a non-linear optimization problem software package to find optimized prices when the constraint equation is $PMIN_{s,i} \leq (0.5)P_A + (0.5)P_B \leq PMAX_{s,i}$ (Step 608). An example of such non-linear optimization problem software packages are MINOS™, which was invented by Bruce Murtagh and Michael Saunders and is marketed by Stanford Business Software, Inc, and CONOPT™, which was written by Arne Stolbjerg Drud and marketed by ARKI Consulting and Development A/S.

In this example the non-linear optimization software package provides an optimized price for product A to be $0.70 and an optimized price for product B to be $1.20. The current incumbent prices are compared to the optimized price. Since for product A $1≠0.70 or for product B $1≠1.20 (Step 620), then the incumbent prices are set equal to the optimized price (Step 624). From the new incumbent prices new market shares are calculated, using the model for predicting product share. For example, the new calculated market share may be 65% (0.65) for Product A and 35% (0.35) for Product B. The new market shares are placed into the constraint equation to provide a new constraint equation (Step 606), such as $PMIN_{s,i} \leq (0.65)P_A + (0.35)P_B \leq PMAX_{s,i}$. The present incumbent prices of $0.70 and $1.20, the linear constraint equation, and the non-linear objective of maximizing profit are solved with a non-linear optimization problem software package to find optimized prices when the constraint equation is $PMIN_{s,i}(0.65)P_A + (0.35)P_B \leq PMAX_{s,i}$ (Step 608).

In this example the non-linear optimization software package provides an optimized price for Product A to be $0.70 and an optimized price for Product B to be $1.20. Since the optimized prices are now equal to (or are within a threshold delta) the incumbent prices (Step 620), the group price bonds are reset so that the optimized prices for Product A ($0.70) and Product B ($1.20) are feasible for Problem P2 (Step 628). The optimized prices are placed in the demand equation to generate group sales (Step 632). The optimized prices and group sales are then used as a feasible starting solution to Problem P3 (Step 636). This means that the optimized prices, or Product A ($0.70) and Product B ($1.20), the generated group sales, the Profit Optimization Object, and the constraints of Problem P2 are provided to a non-linear optimization problem software, such as MINOS or CONOPT. The use of the optimized prices allows for a quick convergence and an initial feasible solution for the solving of Problem P2. The initial feasible solution is important because in a non-linear equation there may be several local optimal locations and there are several areas where a solution is not feasible or there is no convergence or convergence is very slow. The initial feasible solution provides a feasible local optimal location where there is a faster convergence.

In general, optimizations with a linear objective and linear constraints are the easiest to solve. Optimizations with non-linear objectives and linear constraints may be harder to solve. Optimizations with non-linear objectives with non-linear constraints may be the hardest to solve. Therefore the heuristic uses an iterative approximation to convert an optimization with a non-linear objective and non-linear constraints to an optimization with a non-linear objective and linear constraints to provide an initial solution. Once the initial solution is solved, the initial solution is used as a starting point to optimize a non-linear objective with non-linear constraints. Such optimizations may provide a gradient around the initial solution to determine a direction in which to go. Prices are used in that direction to obtain a next point. A gradient around the new prices is then used to determine a new direction. This may be iteratively done until a boundary is reached or until the prices do not change. Other optimization heuristics and other approaches may be used in different embodiments of the invention.

The use of calculating demand group demand as a function of price and then using market share to calculate a product's demand from the demand group demand in an optimization scheme is a novel aspect of the invention.

Figure 7A:
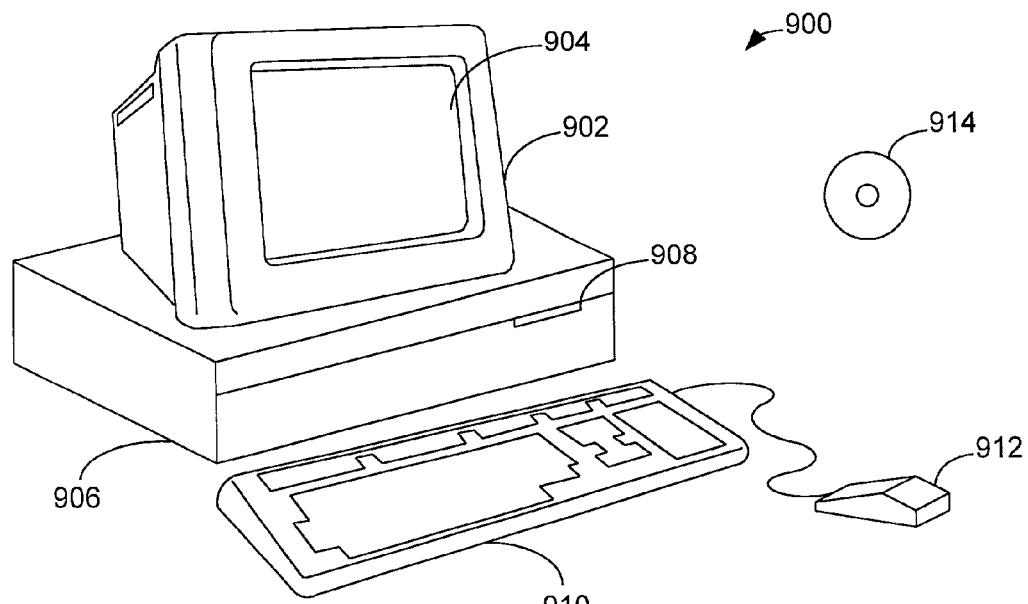
FIGS. 7A and 7B illustrate a computer system, which forms part of a network and is suitable for implementing embodiments of the present invention.
Figure 7B:
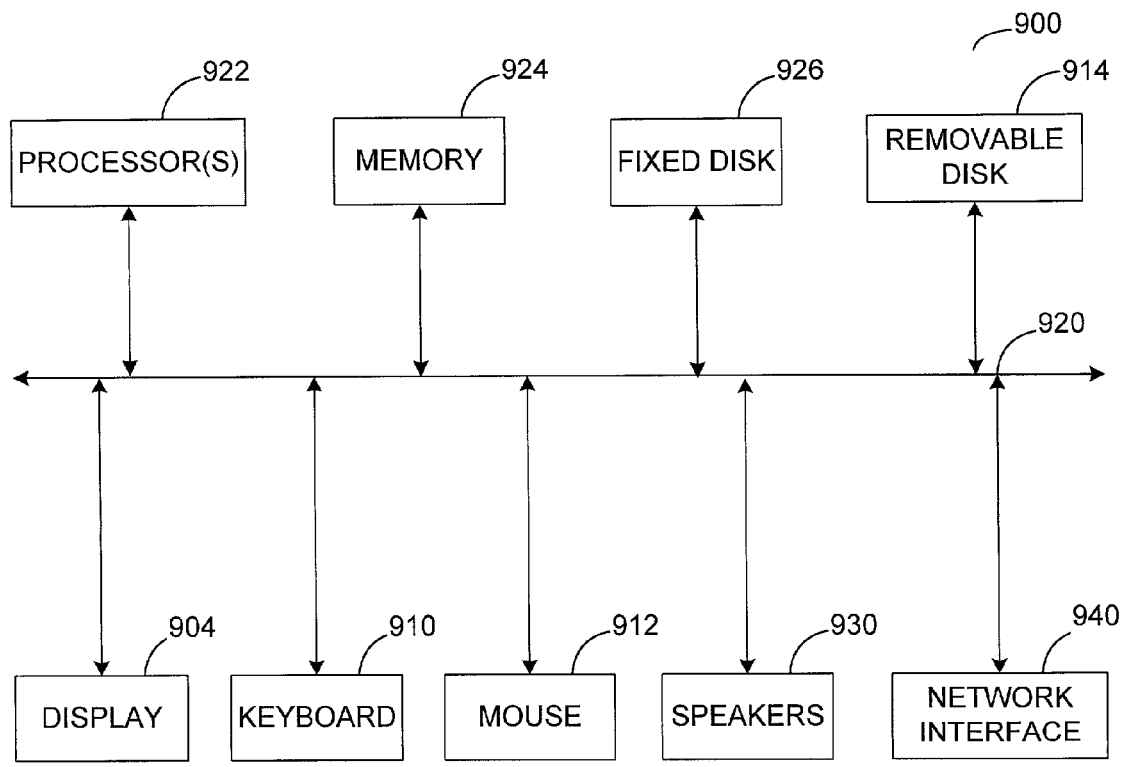

FIGS. 7A and 7B illustrate a computer system 900, which is suitable for implementing embodiments of the present invention. FIG. 7A shows one possible physical form of the computer system. Of course, the computer system may have many physical forms ranging from an integrated circuit, a printed circuit board, and a small handheld device up to a huge super computer. Computer system 900 includes a monitor 902, a display 904, a housing 906, a disk drive 908, a keyboard 910, and a mouse 912. Disk 914 is a computer-readable medium used to transfer data to and from computer system 900.

FIG. 7B is an example of a block diagram for computer system 900. Attached to system bus 920 are a wide variety of subsystems. Processor(s) 922 (also referred to as central processing units, or CPUs) are coupled to storage devices, including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data, and the like and is typically a secondary storage medium (such as a hard disk) that is slower than primary storage. It will be appreciated that the information retained within fixed disk 926 may, in appropriate cases, be incorporated in standard fashion as virtual memory in memory 924. Removable disk 914 may take the form of any of the computer-readable media described below.

CPU 922 is also coupled to a variety of input/output devices, such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter. Computer readable media may also be computer code transmitted by a computer data signal embedded in a carrier wave and representing a sequence of instructions that are executable by a processor.

Figure 8:
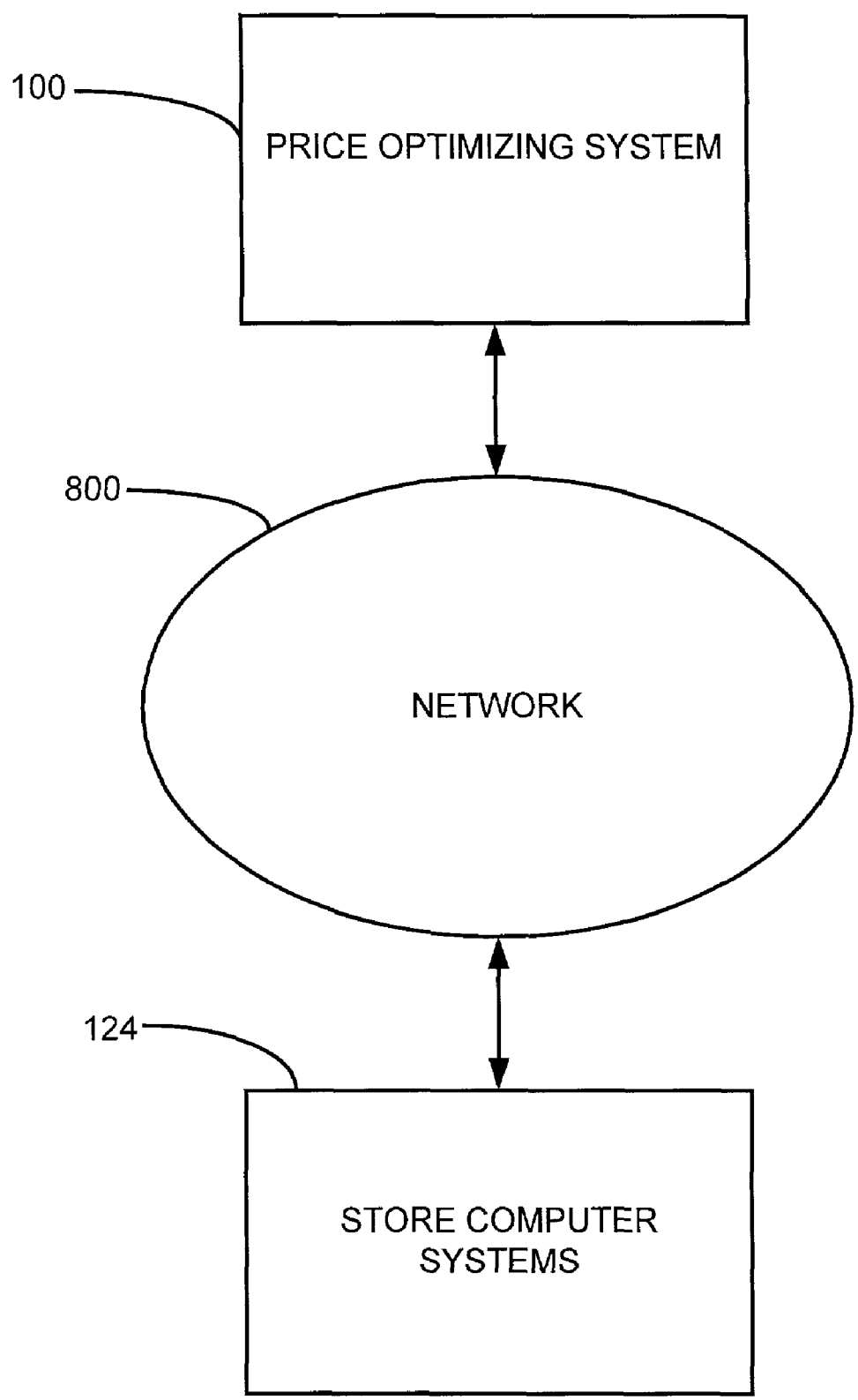
FIG. 8 is a schematic illustration of an embodiment of the invention that functions over a network.

FIG. 8 is a schematic illustration of an embodiment of the invention that functions over a computer network 800. The network 800 may be a local area network (LAN) or a wide area network (WAN). An example of a LAN is a private network used by a mid-sized company with a building complex. Publicly accessible WANs include the Internet, cellular telephone network, satellite systems and plain-old-telephone systems (POTS). Examples of private WANs include those used by multi-national corporations for their internal information system needs. The network 800 may also be a combination of private and/or public LANs and/or WANs. In such an embodiment the price optimizing system 100 is connected to the network 800. The computer systems used by the stores 124 are also connected to the network 800. The computer systems for the stores 124 are able to bi-directionally communicate with the price optimizing system 100 over the network 800.

EXAMPLES OF PRICE OPTIMIZATION

In an example of the invention, using a single category for a chain of stores, the category had 430 products, 6 demand groups, and 433 stores. Table 1 shows the number of products in each demand group. Within each demand group products compete against each other, such as an 8 oz. Coke and a 24 oz. Coke. Within the category products may compete or may be complementary. An example of a category may be drinks. In this example, 12 months of scanner data was collected from the stores to provide the econometric demand model coefficients. In this example costs were not directly accounted for, but instead profit was measured by the difference between selling price and the unit cost.

TABLE 1

|  | Demand Group | | | | | |
| --- | --- | --- | --- | --- | --- | --- |
|  | A | B | C | D | E | F |
| Number of Products | 5 | 44 | 18 | 17 | 74 | 21 |

The econometric demand model coefficients were calculated by the use of the SAS™ program provided by SAS Institute Inc., of Cary N.C. An error analysis was performed on the demand model to determine a confidence interval for one standard deviation (68%). Table 2 shows the error for a one standard deviation confidence interval. Pct. Error is measured as 100*(forecasted value-actual value)/(forecasted value), and Abs. Pct. Error is calculated as the absolute value of Pct. Error.

TABLE 2

| Level | N | Type | Error Weighted Average Mean | Error Weighted Standard Deviation | ErrorWeighted Average Median |
|---|---|---|---|---|---|
| Store Product | 22821 | Pct.Error (Volume) | −13.22% | 46.20% | −1.97% |
| Store Product | 22821 | Abs.Pct.Error (Volume) | 47.54% | 32.61% | 38.48% |
| Store Product | 22821 | Pct.Error (Profit) | −13.26% | 46.59% | −2.01% |
| Store Product | 22821 | Abs.Pct.Error (Profit) | 47.62% | 32.97% | 38.52% |
| Store Demand Group | 2361 | Pct.Error (Volume) | −0.45% | 14.11% | −1.06% |
| Store Demand Group | 2361 | Abs.Pct.Error (Volume) | 12.87% | 9.34% | 12.12% |
| Store Demand Group | 2361 | Pct.Error (Profit) | −0.57% | 17.44% | 0.52% |
| Store Demand Group | 2361 | Abs.Pct.Error (Profit) | 14.34% | 12.28% | 12.99% |
| Store Category | 394 | Pct.Error (Volume) | 0.15% | 7.27% | 0.32% |
| Store Category | 394 | Abs.Pct.Error (Volume) | 6.27% | 4.77% | 5.86% |
| Store Category | 394 | Pct.Error (Profit) | 0.87% | 7.59% | 1.52% |
| Store Category | 394 | Abs.Pct.Error (Profit) | 6.80% | 5.02% | 6.41% |

Table 2 shows that at the Store Category level, the error weighted standard deviation in volume of sales between predicted sales and actual sales was 7.27%. This means that there is a 68% confidence (one standard deviation) that the actual sales would fall within 7.27% of predicted sales or in other words the probability that the actual price would be more than one standard deviation away from the predicted price would be 32%. Examining the Store Demand Group level the error weighted standard deviation in volume increases to 14.11%. At the product level, the error weighted standard deviation in volume increases to 46.20%. Generally, the stores in this example carry extra inventory as safety stock, maybe as long as 4 weeks. It has been estimated that the 46.20% error would be covered by the general safety stock policies in most stores.

In this example group prices were allowed to vary between 85% and 105% of their current prices and the product prices were allowed to vary between 70% and 115% of their current levels. Therefore in this example $PMIN_{s,i}$ there were only two constraints, which were:

1. $\forall\, s \in Cluster_c, \forall\, i, PMIN_{s,i} \leq \sum_k G_{s,i,k}(\overline{q}_{Cluster_c,i}) P_{c,i,k} \leq PMAX_{s,i}$ (Group Pricing—approximate) with PMIN being 85% of current prices and PMAX being 105% of current prices.

2. $PMIN_{c,i,k} \leq P_{c,i,k} \leq PMAX_{c,i,k}, \forall i, k$ (Product Price Advance/Decline) with PMIN being 70% of current prices and PMAX being 115% of current prices Profit was then optimized to provide new optimized prices, using the two constraints. This optimization is of profit is measured at the category level, since aggregated profit is of more interest than profit by demand group. This is because a store may be willing to have lower profits for a single demand group if the profit of an entire category is raised.

Figure 9A:
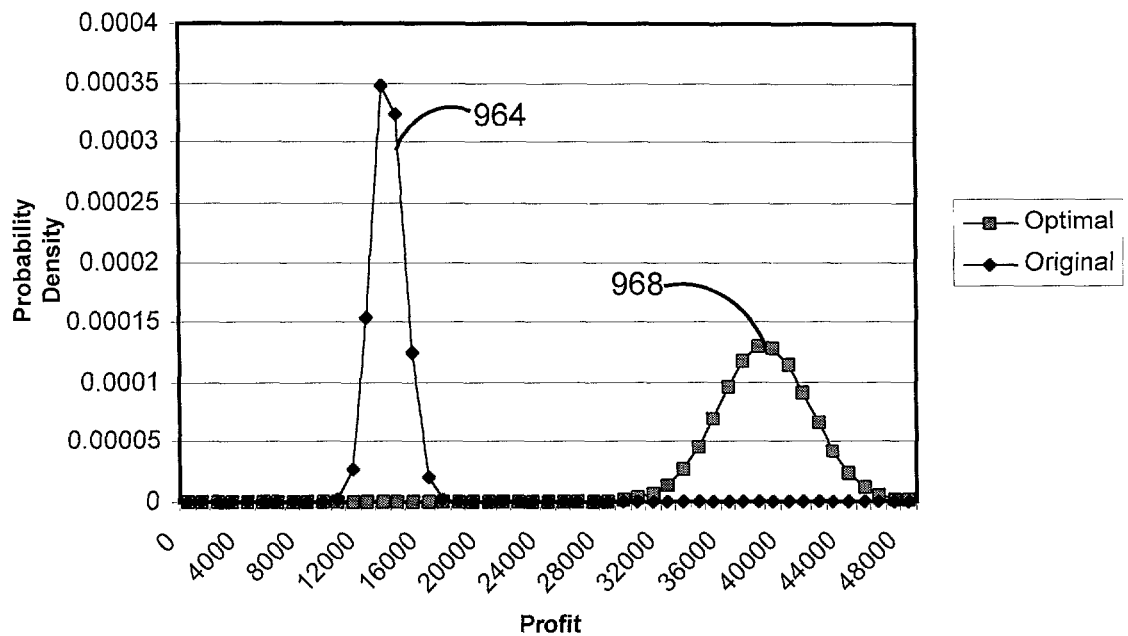
FIG. 9A is a graph of original profit from actual sales of the store using actual prices and optimal profit from optimized sales resulting from the calculated optimized prices bounded by its probability.

FIG. 9A is a graph of original profit 964 from actual sales of the store using actual prices and optimal profit 968 from optimized sales resulting from the calculated optimized prices bounded by its probability. Along the x axis is profit in dollars. Along the y axis is the probability of achieving a particular profit value. The probability of getting at least a certain dollar profit is equal to the area under the right side of the curve. For the original profit there was a highest probability of obtaining between $1,200 and $1,600 profit. For the optimal profit there was a highest probability of obtaining between $3,200 and $4,800 profit. Thus showing a possible two fold increase in profit.

Figure 9B:
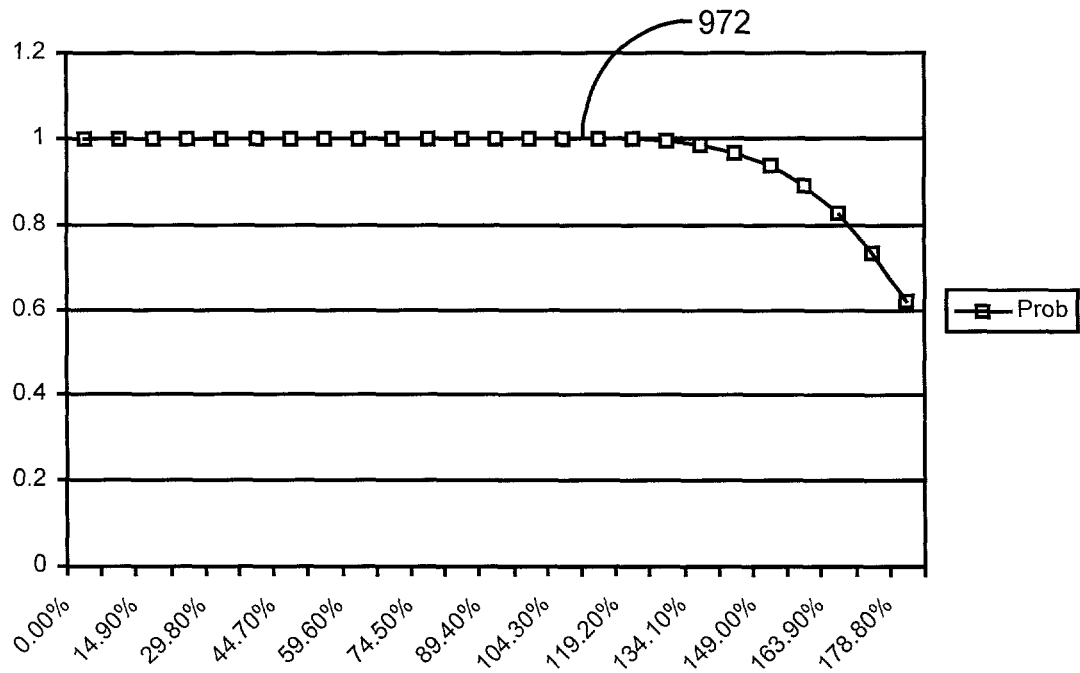
FIG. 9B is a graph of percentage increase in profit and the probability of obtaining at least that percentage increase in profit.

FIG. 9B is a graph 972 of percentage increase in profit calculated by the optimal profit minus the original profit the difference divided by the original profit $$\Delta\% = \frac{(P_{optimal} - P_{original})}{P_{original}},$$

and the probability of obtaining at least that percentage increase in profit. The x axis is the percentage increase in profit and the y axis is the probability of at least obtaining that percentage increase. According to this graph there is almost a 100% chance of increasing profit at least 104.3%.

In the specification, examples of product are not intended to limit products covered by the claims. Products may for example include food, hardware, software, real estate, financial devices, intellectual property, raw material, and services. The products may be sold wholesale or retail, in a brick and mortar store or over the Internet, or through other sales methods.

V. Rule Relaxation

As mentioned above, various rules may be used as constraints for optimization. The rules described above for price optimization are:

1. $\forall\, c, s \in Cluster_c, i, PMIN_{s,i} \leq \sum_k F_{s,i,k} P_{s,i,k} \leq PMAX_{s,i}$ (Group price advance/decline)

2. $PMIN_{c,i,k} \leq P_{c,i,k} \leq PMAX_{c,i,k}, \forall i, k$ (Product price advance/decline)

3. $\forall c,i$ and $(p_{c,i,k_1},p_{c,i,k_2}) \in \text{Brand}_{c,i}$ $p_{c,i,k_1} \leq p_{c,i,k_2}$ (Brand Pricing)

4. $\forall c,i$ and $(p_{c,i,k_1},p_{c,i,k_2}) \in \text{Size}_{c,i}$ $p_{c,i,k_1} \leq p_{c,i,k_2}$ (Size Pricing)

5. $\forall c,i$, $(p_{c,i,k_1},p_{c,i,k_2}) \in \text{Unit}_{c,i}$, $s \in \text{Cluster}_c$, $e_{s,i,k_1}p_{c,i,k_1} \leq e_{s,i,k_2}p_{c,i,k_2}$ (Unit Pricing)

6. $\forall L_l, l=1,\ldots \|L\|$, $\forall k_1, k_2 \in L_1$, $\forall c$, $P_{c,i,k_1} = P_{c,i,k_2}$ (Line Pricing)

Other rules may also be used. An example of such additional rules may be, but is not limited to, a gross margin rule, a store volume rule, or a competition rule.

A gross margin rule provides a constraint on the change of a mark up. A gross margin rule may provide a constraint on the change of the mark up of each individual item in a group or on the average mark up of the group or both. An example of a gross margin rule may be that the percentage change of the average gross margin of a group is not to exceed 5%.

A volume rule provides a constraint on the change or the volume of sales. The volume rule may provide a constraint on the change of volume of sales for each individual store or on the change of total volume of sales for a plurality of stores for an individual product or for a plurality of products. An example of a volume rule may be that for each store, the change of demand for a product is not to exceed 7%.

A competition rule provides a constraint on the difference between a competing store's prices. A competition rule may allow constraints for one or more competitors. An example of a multiple competition rule is that the price of each item must not exceed the price for the same item sold by competitor store X by more than 10% of the price and must not exceed the price of the same item sold by competitor store Y by more than 9% of the price. To implement these constraints a store may use monitors to check prices of items in competitor store X and competitor store Y.

During an optimization, it may be found that a rule is infeasible. A rule is determined to be infeasible, if either it cannot be satisfied when all other rules are satisfied or if an optimization cannot be performed without violating the rule. One method of dealing with an infeasible rule is to drop the rule found to be infeasible.

Figure 21:
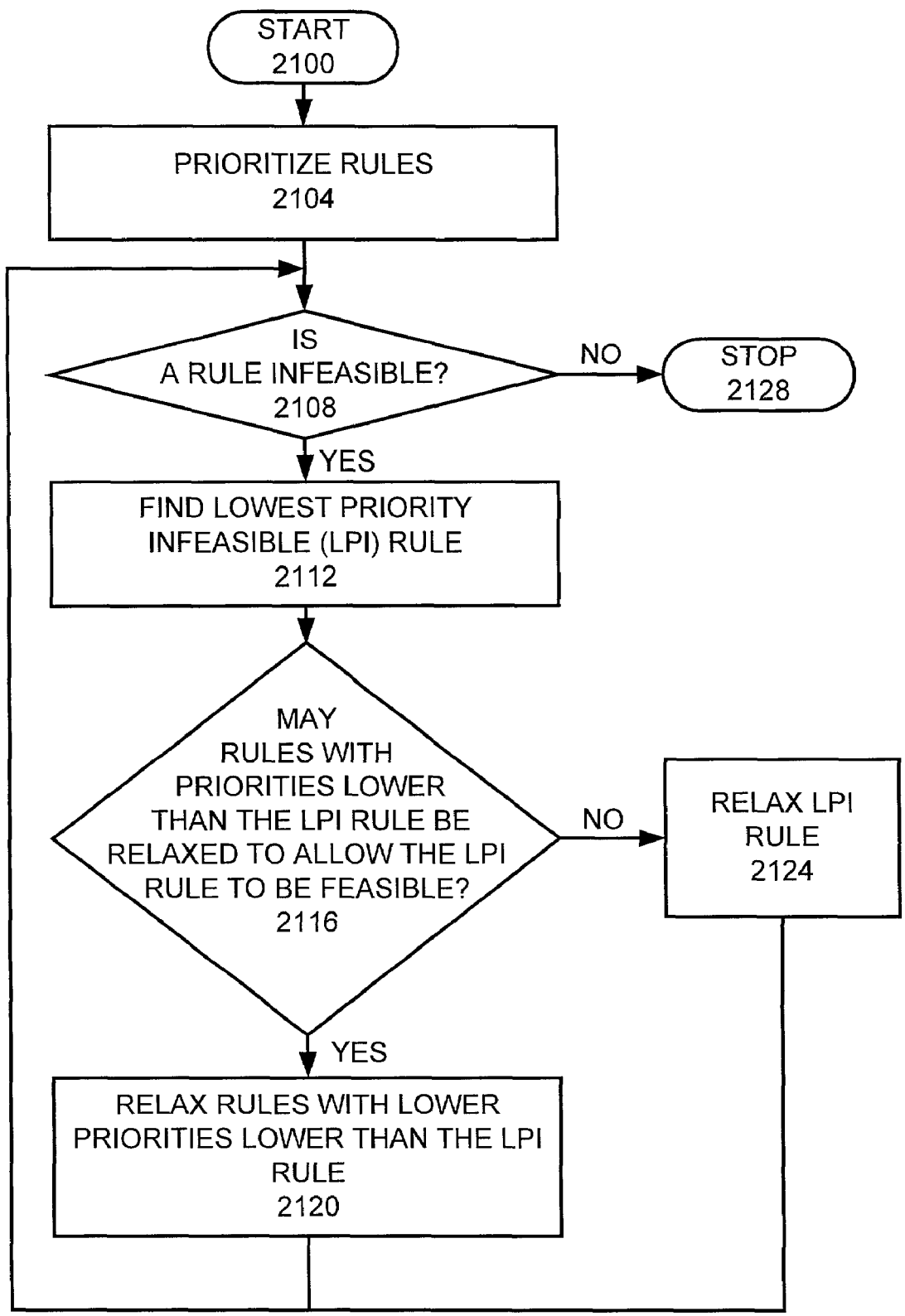
FIG. 21 is a flow chart of a preferred embodiment of a rule relaxation process.

FIG. 21 is a flow chart of a preferred embodiment of the invention. The rules are prioritized (step 2104). A default prioritization may be provided, with an interface which may allow a user to change the prioritization from the default. A check is made to see if a rule is infeasible (step 2108). A rule is deemed to be infeasible if the relationship expressed by the rule is not able to be satisfied. For instance a rule $X+Y \leq 10$, is violated for when X is 7 and Y is 7 since then $X+Y=14$ which is greater then 10. If no rule is found to be infeasible, the rule relaxation process is stopped (step 2128). If at least one rule is found to be infeasible, the lowest priority infeasible (LPI) rule is found (step 2112). A determination is made whether rules with lower priorities than the priority of the LPI rule may be relaxed to allow the LPI rule to become feasible (step 2116). In the preferred embodiment the lower priority rules are checked before higher priority rules. If it is found that rules with lower priorities than that priority of the LPI rule may be relaxed to a point that allows the LPI rule to become feasible, then these rules with lower priorities are relaxed incrementally so that the LPI rule becomes feasible (step 2120). In the preferred embodiment, lower priority rules are relaxed before higher priority rules. If it is found that rules with lower priorities than the priority of the LPI rule cannot be relaxed to allow the LPI rule to become feasible, then the LPI rule is relaxed until it becomes feasible (step 2124). The rules are then rechecked to see if there are any remaining rules that are infeasible (step 2108). This process is continued until all rules are feasible.

Example

To provide an example of rule relaxation, six categories of rules are provided. According to the method illustrated in the flow chart of FIG. 21, the categories of rules are prioritized (step 2104) in the following order, with a ranking of 1 designating the category of rules with the highest priority and 6 designating the category of rules with the lowest priority.

1. Group price advance or decline rules. The user sets a maximum weighted group price advance or decline to 10%.

2. Size pricing rules. The user goes with the default that larger items cost less per equivalent unit than smaller identical items.

3. Brand pricing rules. For soft drinks, the user designates that the price of Brand A is never less than the price of Brand B. For juices the user designates that Brand C is always greater than Brand D.

4. Unit pricing rules. The user goes with the default that the overall price of larger items is greater than the overall price of smaller identical items.

5. Competition rules. The user designates that all prices must be at least 10% less than the prices of the same items sold by competitor X and are within 2% of the prices of the same items sold by competitor Y.

6. Line price rules. The user designates that different flavors of the same item are priced the same.

In this example, Brand A is sold by competitor Y for $8, while Brand B is sold by competitor Y for $10. In addition competitor Y sells one flavor of item C for $9 and another flavor of the same item C for $10.

A determination is made if a rule is infeasible (step 2108). It is found that one of the price branding rules is infeasible, since Brand A is supposed to always have a price greater than the price of Brand B and yet competitor Y sells Brand A for $8 and Brand B for $10, and since the competition rules designate that the same items must be within 2% of the prices of competitor Y. In addition, it is found that one of the line price rules is infeasible. This is because the line price rule constrains different flavors of the same item to be the same, but competitor Y is selling one flavor for $9 and another flavor for $10.

Since the branding rules have a priority of 3 and the line price rules have a priority of 6, it is found the line price rules are the lowest priority infeasible (LPI) rules (step 2112). A check is made to see if rules with a priority lower than 6 may be relaxed so that the line price rules become feasible (step 2116). Since the line price rules are the lowest priority rules, no rule with a lower priority may be relaxed so that the line price rule becomes feasible. As a result, the line price rule is relaxed allowing the different flavors to have different prices by about 10% (step 2124).

The process then returns to step 2108 to see if any rules are still infeasible. It is found that one of the price branding rules is infeasible, since Brand A is supposed to always have a price greater than the price of Brand B and yet competitor Y sells Brand A for $8 and Brand B for $10, and since the competition rules designate that the same items must be within 2% of the prices of competitor Y. Since the price branding rules are the only rules found to be infeasible, they are found to be the lowest priority infeasible (LPI) rules with a priority of 3 (step 2112). A check is made to see if rules with priorities lower than the LPI rules may be relaxed to allow the LPI to be feasible (step 2116). Preferably, the lower priority rules are checked first. So first the line price rules with a priority of 6 are checked to see if they may be relaxed to allow the branding price rules to be feasible. If not, then the next lowest priority rules, the competition rules are checked to see if they may be relaxed to allow the branding rules to be feasible. In this example, it is found by relaxing a competition rule with a priority of 5 the price branding rule becomes feasible. Therefore the competition rule is relaxed so that prices are within about 20% of the prices of competitor Y, which allows Brand A and Brand B to have the same price (step 2120).

The process again returns to step 2108 to see if any rules are still infeasible. It is found that all rules are now feasible, and the rule relaxation process is stopped (step 2128).

In the preferred implementations, the specific infeasible solution at which the optimization process stops will depend on the optimization algorithm and the initial starting point. This means that specific rules that are relaxed in order to get to feasibility depend on both the optimization algorithm and the starting values These examples are merely illustrative and are not meant to limit the scope of the invention. In addition, rule priority was assigned by rule category. In other embodiments the rule priority may be assigned to individual rules instead of to rule categories.

Other specific methods of rule relaxation may be used. In general, rule relaxation methods provide for the prioritization of rules and cause lower priority rules to be relaxed before relaxing higher priority rules in order to make all resulting rules feasible. Another specific embodiment of this general rule relaxation method may allow different combinations of lower priority rules to be relaxed. These lower priority rules may be relaxed at the same rate or at different rates until the higher priority rule becomes feasible. Different combinations of the relaxation of lower priority rules may be specified in different embodiments.

VI. Subset Optimization

When, as discussed above, new information is received about products and competitive environment, but it is desirable not to reoptimize an entire product category, subset optimization allows the reoptimization of only a subset of products. Subset optimization provides optimization by making price changes over a subset of products while holding the prices of the remaining products constant.

Figure 22:
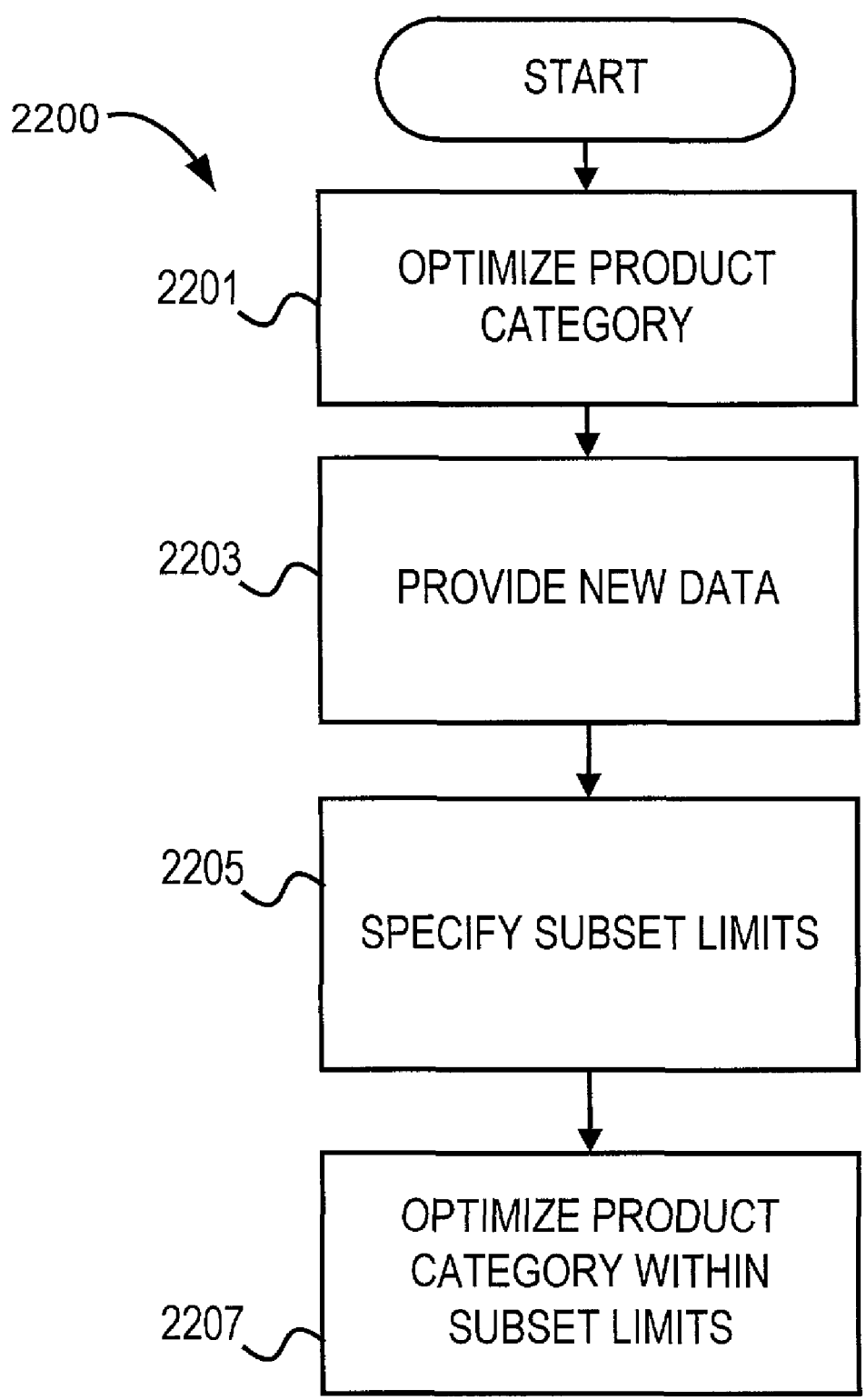
FIG. 22 is an overall flow chart of a process that uses subset optimization.

To facilitate understanding, FIG. 22 is an overall flow chart of a process that uses subset optimization 2200. First, a product category is optimized (step 2201). The above Sections I to V may be used to provide the product category optimization. A whole product category is an entire grouping of products that are optimized together in the processes described in Sections I to V. Once the optimization is completed, the generated optimized prices (optimized price data) are sent to the store computer systems. The prices of the products are then set by the stores to the optimized prices that are provided by optimization. New data may then be provided to the system (step 2203). Such data may be provided through the Econometric Engine 104 (FIG. 1) or the Financial Model Engine 108, or through another source. If the entire product category was optimized using the new data, it is possible that all items in the product category would change because of the new data. To avoid an optimization that may cause a repricing of all products in the product category, the user is allowed to specify subset limits (step 2205). An example of such subset limits would be a maximum number N of products that may be repriced. A new optimization is performed using the new data, where the optimization is constrained to comply with the subset limits (step 2207). For example, if a maximum number N of products may be repriced, the optimization provides an optimization with price changes of no greater than N products. Since the price of no more than N products is changed, instead of possibly the price of all products of the category, only a subset of the product category is optimized. The subset optimization may use the results of the previous optimization as initial values.

The subset optimization may choose the products that comprise this subset in a way that has the largest impact on the client's objective function. If, for example, the client's objective is to maximize profit, it is desirable to populate the subset of products whose prices are allowed to change with those products that are most likely to have the largest impact on profit. In one way of doing this, all of the available products may be ranked by their marginal contribution to the objective and then use a mixed integer program to select the subset of products where prices are allowed to change. The prices of all of the products not in the "optimal" subset and optimized may be frozen to provide a variant of the original scenario to obtain a new set of optimized prices.

In a preferred embodiment of the invention, an optimization of a product category is performed as discussed in the previous sections (step 2201) to provide optimal prices, demand functions and constraints for all of the products considered in the product category. All of the input data used in the initial optimization of the product category and $\bar{p}^*_{Cluster_c}$, the set of optimal prices derived from that data, may be used to provide initial conditions and parameters for the subset optimization.

Changes to the state of information that the user wishes to incorporate into the new optimization are also provided (step 2203). For changes in costs, base price, or competitive prices, the change in the data from the original scenario measured as a percentage of base price is used. For discontinued or new products, the input data required to construct their demand functions and constraints as they would have been defined in the original optimization, as well as an initial starting base price, are used.

The subset limits, such as the maximum number of products that the user wishes to allow in the subset optimization, are specified (step 2205). One possible assumption for an algorithm may be that the maximum number is at least as large as the number of products with information changes.

Figure 23:
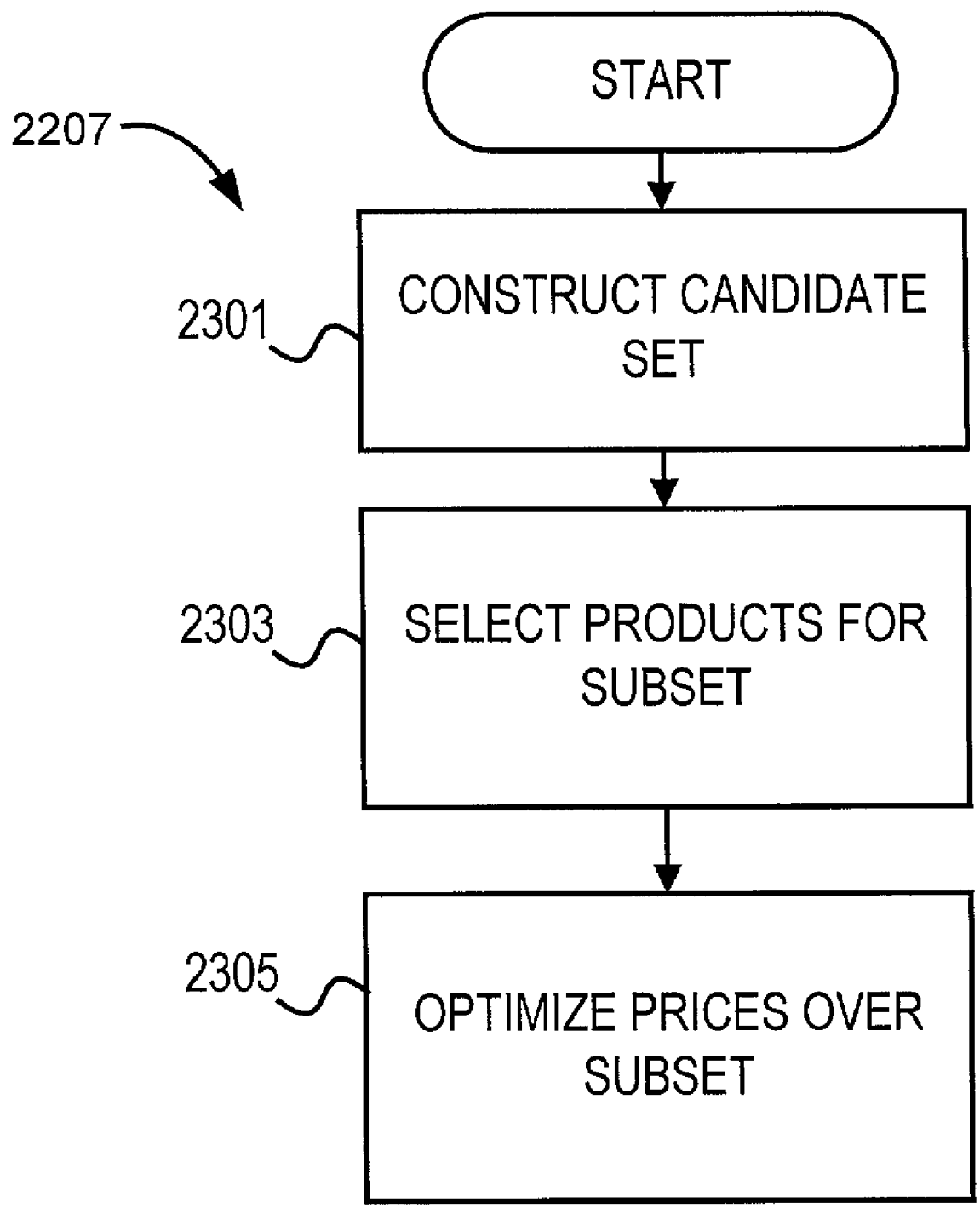
FIG. 23 is a more detailed flow chart of an embodiment of a step of optimizing product category within subset limits.

FIG. 23 is a more detailed flow chart of an embodiment of the step of optimizing product category within subset limits (step 2207). A first step constructs a set of products that will be considered as candidates for the subset to be optimized (step 2301). A second step chooses which of the candidates will be members of the subset (step 2303), for example, by solving a mixed integer problem. A third step finds the new optimal prices for the products in the subset while holding the prices of the other goods at their prior optimal level (step 2305).

Construction of the Set of Candidates for Subset Optimization

The purpose of this step is to define a set of products, C, which will be candidates for subset optimization. In defining this set, priority is given to two distinct types of products: those products that have had changes in their state of information, and those products that have constraints that would allow their price to move if they are selected to be members of C Products with changes in state information are automatically included in C and in the subset of products to be optimized. The second group of products is chosen based on characteristics of their constraints and the direction of the gradient of the price variables with respect to the objective function at the incumbent optimal price. It is desirable to only choose products whose prices will actually be able to move in the subset optimization. If a product's price is at a bound in the original scenario and the gradient of the price variable indicates that the price will continue in the direction of the bound if the bound is relaxed, then the price will not move in the subset optimization since it will still hit that bound. If, however, the product's price was initially not at a bound or if it is at a bound but the gradient indicates that the price would move away from the bound if it were relaxed, then it would be expect that this price would change, if it is included in the subset optimization. In order to discover the direction of the gradient of prices at their previous optimal price, a simple model is formulated that evaluates the original objective function while allowing prices to vary slightly from their previous optimal level, $\bar{p}^*_{Cluster_c}$. This model consists of the fundamental model equations that define demand group sales, market share, the user-defined objective function, and simple bounds holding prices within a small neighborhood of their previous optimal values. For a profit-maximizing problem, the model might be formulated as:

$$\text{Max} \sum_{l \in G} \sum_{k \in Dem_t} \hat{F}_{s,i,k,t} \hat{S}_{s,i,t}(P_{s,i,k,t} - C_{s,i,k,t})$$

Subject to $\ln\left(\frac{\hat{S}_{s,i,t}}{S_{s,Bi,t}}\right) = \hat{K}_{s,i} + \hat{\gamma}_{s,i}\frac{P_{s,i,t}}{\bar{P}_{s,i,t}} + \hat{v}_{s,i}M_{s,i,t} +$ $\hat{\psi}_{s,i}X_{s,i,t} + \hat{\kappa}_{s,i}X_{s,i,t}\frac{P_{s,i,t}}{\bar{P}_{s,i,t}} + \sum_{n=1}^{\tau}\hat{\delta}_{l,n}\frac{\sum_{r=t-mn}^{t-m(n-1)-1}S_{s,i,r}}{\sum_{r=t-mn}^{t-m(n-1)-1}\bar{S}_{s,i,r}} +$ $\sum_{j \neq i}\hat{\phi}_{s,i,j}\frac{\hat{S}_{s,j,t}}{\bar{S}_{s,j,t}} + \hat{\eta}_{s,i,t}\left(\frac{\bar{P}_{s,i,t} - \bar{\bar{P}}_{s,i,t}}{\bar{P}_{s,i,t}}\right) + \hat{\pi}_{s,i}\frac{TS_{s,t}}{T\bar{S}_{s,t}} + \hat{\theta}_{s,i}\frac{S_{s,i,t-\tau}}{\bar{S}_{s,i,t-\tau}}$ $$\hat{F}_{s,i,k,t} = \frac{\exp\left\{\hat{\Lambda}_{s,i,k} + \hat{\rho}_{s,i,k}(P_{s,Ri,k,t}) + \sum_{p=1}^{n_p}\hat{\sigma}_{s,p,i,k}(M_{s,p,i,k,t}) + \sum_{n=1}^{\tau}\hat{x}_{s,i,k,n}\sum_{r=t-mn}^{t-m(n-1)-1}(F_{s,i,k,r})\right\}}{\sum_{l \in Dem_t}\exp\left\{\hat{\Lambda}_{s,i,l} + \hat{\rho}_{s,i,l}(P_{s,Ri,l,t}) + \sum_{p=1}^{n_p}\hat{\sigma}_{s,p,i,l}(M_{s,p,i,l,t}) + \sum_{n=1}^{\tau}\hat{x}_{s,i,k,n}\sum_{r=t-mn}^{t-m(n-1)-1}(F_{s,i,l,r})\right\}}$$

$$\bar{p}^*_{Cluster_c} - \epsilon \leq P_{s,i,k} \leq \bar{p}^*_{Cluster_c} + \delta, \forall s,i,k$$

where δ is a small number.

$\lambda_k^u$ and $\lambda_k^l$ are defined as the marginal values on the upper and lower bounds defined in the final inequality constraints. These marginal values will be used as a measure of the price gradient as the price moves away from the incumbent optimal price. They, in concert with information about which bounds were active in the original problem, will determine which products are allowed to have price changes in the subset optimization.

Products for the second group should have the freedom to change prices during the subset optimization. To this end, all of the constraints in the initial model are evaluated and three operations are performed. First, a check is performed to see if that constraint was tight for the optimal price in the original scenario. Essentially, this just means that those store-product combinations where the right and left-hand sides of the constraint equations are the same are found. For example, suppose that there is an upper bound on optimal price:

$$P_{c,i,k} \leq PMAX_{c,i,k}, \forall i,k$$

where c is the store cluster, i is the demand group, and k is the product. For this rule, all of the store-product combinations where $$P_{c,i,k} = PMAX_{c,i,k}, \forall i,k$$

would be found.

Rule relaxation, discussed in Section V, may have been utilized in the original optimization. This feature allows the optimization to automatically relax constraints subject to a hierarchy defined by the user. Since the subset optimization is based on the original constraints of the initial scenario, it is possible to have optimal prices from the initial scenario that are infeasible with respect to some of the original constraints because those constraints were relaxed in the first scenario optimization. The second operation relaxes the bound on any store-product combinations for which the incoming optimal price is infeasible. Thus, for an upper price bound, we would set $PMAX_{c,i,k}$ equal to $P_{c,i,k}$.

The third procedure changes the initial bounds on those products which have had cost, base price or competitive price changes. If the cost, base price, or competitive price has increased, it is desirable to increase the upper bound constraints so that the optimal price is allowed to move. The upper price bound, for example, would become $$P_{c,i,k} \leq PMAX_{c,i,k}(1+\xi_{c,k}), \forall i,k$$

where $\xi_{c,k}$ is percentage change in cost or price with respect to base price. If the cost has increased, it is also desirable to raise the lower bound to prevent the price from flipping from the upper to the lower bound. The corresponding lower price bound would be $$P_{c,i,k} \geq \text{Max}(PMAX_{c,i,k}(1-\lambda_{c,k})\bar{p}^*_{Cluster_c}) \forall i,k$$

where $\lambda_{c,k}$ is a scaling factor for the allowable price region and $\bar{p}^*_{Cluster_c}$ is the optimal price for that product from the original scenario. If the cost or price has declined, then the lower price bound would become $$P_{c,i,k} \geq PMIN_{c,i,k}(1-\xi_{c,k}), \forall i,k$$

and the upper bound becomes $$P_{c,i,k} \geq \text{Min}(PMIN_{c,i,k}(1+\lambda_{c,k})\bar{p}^*_{Cluster_c}) \forall i,k$$

For constraints on the average price of a demand group, the bound is changed by the market share weighted average change in the cost or price relative to initial base price.

The set of candidates for subset optimization, C, may now be constructed as follows:

For each store, product and constraint:
1. Initialize C to include all available products.
2. If $\lambda_k^l > 0$ or $\lambda_k^u < 0$, then $k \notin C$
3. If constraint is an active upper bound on price and $\lambda_k^u > 0$, then $k \notin C$
4. If constraint is an active lower bound on price and $\lambda_k^l < 0$, then $k \notin C$
5. If product has change in the state of information, then $k \in C$ Selection of the Set of Products for Subset Optimization In selecting the N products that will comprise the set of products, R, which are allowed to have price changes in the subset optimization, a simple mixed integer problem is solved. A binary variable, $r_k$, is created that indicates whether or not a given product is chosen to become a member of R. An objective function is the sum of these binary variables weighted by the maximum marginal value on each product's price obtained in the step of constructing the set of candidates for subset optimization. The only constraint is that the number of products chosen must be less than n, the user-defined maximum number of products allowed in the subset optimization minus the number of products with changes in the state of information. This problem can be written as $$\text{Max}_r \left[ \sum_{k \in C} r_k \cdot \text{Max}(|\lambda_k^l|, |\lambda_k^u|) \right]$$

subject to $$\sum_{k \in C} r_k \leq n.$$

The set of products, R, may be defined to be considered in subset optimization as $k \in R: \{(k \in C | r_k = 1) \cup (k \in C | k \text{ has change in state})\}$.

Optimize Prices Over the Product Subset R

The price variables of products that are not members of R fixed and this new problem are solved with a complete optimization, such as an optimization described in Section IV. Regression models and the predictive equations from the econometrics models are used to construct the optimization model. The objective is to maximize profit:

$$\sum_{r \in G} \sum_{k \in Dem_t} \hat{F}_{s,i,k,t} \hat{S}_{s,i,t} (P_{s,i,k,t} - C_{s,i,k,t})$$

subject to the following general constraints:
1. Obey the regression equations governing $\hat{S}_{i,t} \forall i, k$ $$\ln\left(\frac{\hat{S}_{s,i,t}}{\overline{S}_{s,Bi,t}}\right) = \hat{K}_{s,i} + \hat{\gamma}_{s,i} \frac{P_{s,i,t}}{\overline{P}_{s,i,t}} + \hat{v}_{s,i} M_{s,i,t} +$$

$$\hat{\psi}_{s,i} X_{s,i,t} + \hat{\kappa}_{s,i} X_{s,i,t} \frac{P_{s,i,t}}{\overline{P}_{s,i,t}} + \sum_{n=1}^{\tau} \hat{\delta}_{i,n} \frac{\sum_{r=t-mn}^{t-m(n-1)-1} S_{s,i,r}}{\sum_{r=t-mn}^{t-m(n-1)-1} \overline{S}_{s,i,r}} +$$

$$\sum_{j \neq i} \hat{\phi}_{s,i,j} \frac{\hat{S}_{s,J,t}}{\overline{S}_{s,j,t}} + \hat{\eta}_{s,i,t} \left( \frac{\overline{P}_{s,i,t} - \overline{\overline{P}}_{s,i,t}}{\overline{\overline{P}}_{s,i,t}} \right) + \hat{\pi}_{s,i} \frac{TS_{s,t}}{\overline{TS}_{s,t}} + \hat{\theta}_{s,i} \frac{S_{s,i,t-7}}{\overline{S}_{s,i,t-7}}$$

2. Obey the market share equations $$\hat{F}_{s,i,k,t} = \frac{\exp\left\{\hat{\Lambda}_{s,i,k} + \hat{\rho}_{s,i,k}(P_{s,Ri,k,t}) + \sum_{p=1}^{np} \hat{\sigma}_{s,p,i,k}(M_{s,p,i,k,t}) + \sum_{n=1}^{\tau} \hat{x}_{s,i,k,n} \sum_{r=t-mn}^{t-m(n-1)-1} (F_{s,i,k,r}) \right\}}{\sum_{l \in Dem_t} \exp\left\{\hat{\Lambda}_{s,i,l} + \hat{\rho}_{s,i,l}(P_{s,Ri,l,t}) + \sum_{p=1}^{np} \hat{\sigma}_{s,p,i,l}(M_{s,p,i,l,t}) + \sum_{n=1}^{\tau} \hat{x}_{s,i,k,n} \sum_{r=t-mn}^{t-m(n-1)-1} (F_{s,i,l,r}) \right\}}$$

3. Constrain price changes to be within a given range of current prices. $\text{PMIN}_{s,i,k,t} \leq P_{s,i,k,t} \leq \text{PMAX}_{s,i,k,t}$ To simplify notation, the time index may be removed from the equations. Next, all constant terms in each of the expressions may be grouped together. So the objective becomes:

$$\text{Maximize} \sum_{i=G} \sum_{k \in Dem_t} \hat{F}_{s,i,k} \hat{S}_{s,i} (P_{s,i,k} - C_{s,i,k})$$

The regression equations for $\hat{S}_{i,t} \forall i, k$ become $$\log(\hat{S}_{s,i}) = a_{s,i} + b_{s,i} \sum_{k \in Dem_t} P_{s,i,k} F_{s,i,k} + \sum_{\substack{j \in G \\ j \neq 1}} c_{s,i,j} S_{s,j} + const_{s,i} \text{ where}$$

$$c_{s,i,j} = \frac{\overline{S}_{s,i}}{\overline{S}_{s,j}} \hat{\phi}_{s,i,j},$$

$$b_{s,i} = \frac{\overline{S}_{s,i}}{\overline{P}_{s,i}} (\hat{\gamma}_{s,i} + \hat{\kappa} X_{s,i})$$

$$a_{s,i} = \frac{\overline{S}_{s,i} \pi_{s,i}}{\overline{TS}_s}$$

$$Const_{s,i} = \log(\overline{S}_{s,i}) + \sum_{n=1}^{\tau} \hat{\delta}_{s,i,n} \frac{\sum_{r=t-mn}^{t-m(n-1)-1} S_{s,i,r}}{\sum_{r=t-mn}^{t-m(n-1)-1} \overline{S}_{s,i,r}} + \hat{\psi}_{s,i} X_{s,i} -$$

$$\hat{\gamma}_{s,i} + \hat{\eta}_{s,i} (\overline{P}_{s,i,t} - \overline{\overline{P}}_{s,i,t}) - \hat{\kappa}_{s,i} X_{s,i} + \hat{v}_{s,i} R_{s,i} + \hat{\theta}_{s,i} \frac{S_{s,i,t-7}}{\overline{S}_{s,i,t-7}} + K_{s,i}$$

Similarly, the regression equations for the market share fractions become:

$$\hat{F}_{s,i,k} = \frac{\exp\left\{\frac{\hat{\rho}_{s,i,k}}{\overline{P}_{s,i,k}} P_{s,i,k} + Const_{s,i,k}\right\}}{\sum_{l=Dem_t} \exp\left\{\frac{\hat{\rho}_{s,i,l}}{\overline{P}_{s,i,l}} P_{s,i,l} + Const_{s,i,l}\right\}} \text{ where}$$

-continued $$Const_{s,i,k} = -\rho_{s,i,k} + \hat{\sigma}_{s,i,l} R_{s,i,k} + \sum_{n=1}^{\tau} \hat{x}_{s,i,k,n} \frac{\sum_{r=t-mn}^{t-m(n-1)-1} F_{s,i,k,r}}{\sum_{r=t-mn}^{t-m(n-1)-1} \overline{F}_{s,i,k,r}} + \hat{\Lambda}_{s,i,k}$$

With this, the optimization problem may be written as:
Problem P1

Maximize:

$$\sum_{s \in Stores} \sum_{i \in G} \sum_{k \in Dem_t} \frac{\exp\left\{\frac{\hat{\rho}_{s,i,k}}{\overline{P}_{s,i,k}} P_{s,i,k} + Const_{s,i,k}\right\}}{\sum_{l \in Dem_t} \exp\left\{\frac{\hat{\rho}_{s,i,l}}{\overline{P}_{s,i,l}} P_{s,i,l} + Const_{s,i,l}\right\}} \hat{S}_{s,i}(P_{s,i,k} - C_{s,i,k})$$

Subject to $\log(\hat{S}_{s,i}) = a_{s,i} + b_{s,i} \sum_{k \in Dem_t} P_{s,i,k} F_{s,i,k} + \sum_{\substack{j \in G \\ j \neq i}} c_{s,i,l} S_{s,j} + const_{s,i}$, $$\hat{F}_{s,i,k} = \frac{\exp\left\{\frac{\hat{\rho}_{s,i,k}}{\overline{P}_{s,i,k}} P_{s,i,k} + Const_{s,i,k}\right\}}{\sum_{l \in Dem_t} \exp\left\{\frac{\hat{\rho}_{s,i,l}}{\overline{P}_{s,i,l}} P_{s,i,l} + Const_{s,i,l}\right\}} \text{ and } PMIN_{s,i,k} \leq P_{s,i,k} \leq PMAX_{s,i,k}$$

In addition to the constraints listed above, the preferred embodiment may model several other business rules via constraints. These include limits on group price advance or decline, brand pricing rules, size pricing rules, and line pricing rules, as discussed in Sections IV and V above.

Cluster Pricing:

Retailers define geographic regions within which they maintain the same price for a given product. This may be translated to the notion of store clusters. A store cluster, $Cluster_c$, is a set of stores such that the price of every product is invariant within the cluster. In other words, every product has the same price in every store within the cluster although each product may have a different price. Other types of groupings, instead of geographic groupings, may be used to determine clusters. In order to implement these constraints, the set of stores may be partitioned into store clusters $Cluster_1, \ldots, Cluster_{|C|}$ where $C \equiv \{Cluster_1, \ldots, Cluster_{|C|}\}$, and define a new price variable $P_{c,i,k}$ which represents the common price for product k in cluster $Cluster_c$. This variable may be used in place of the original price variable $P_{s,i,k}$ whenever $s \in Cluster_c$. Again, for products not in the subset of products defined for optimization, $P_{c,i,k}$ is fixed at the optimal price from the previous scenario. The entire problem P1 can be rewritten as P2:

Problem P2:

Maximize:

$$\sum_{c=1}^{\|C\|} \sum_{s \in Cluster_c} \sum_{l=G} \sum_{k \in Dem_t} \frac{\exp\left\{\frac{\hat{\rho}_{s,i,k}}{\overline{P}_{s,i,k}} P_{c,i,k} + Const_{s,i,k}\right\}}{\sum_{l \in Dem_t} \exp\left\{\frac{\hat{\rho}_{s,i,l}}{\overline{P}_{s,i,l}} P_{c,i,l} + Const_{s,i,l}\right\}}$$

$$\hat{S}_{s,i}(P_{c,i,k} - C_{s,i,k})$$

Subject to: $\log(\hat{S}_{s,i}) = a_{s,i} + b_{s,i} \sum_{k \in Dem_t} P_{s,i,k} F_{s,i,k} +$ $$\sum_{\substack{j \in G \\ j \neq i}} c_{s,i,j} S_{s,i} + const_{s,i} \text{(Group Sales equation)}$$

$$\hat{F}_{s,i,k} = \frac{\exp\left\{\frac{\hat{\rho}_{s,i,k}}{\overline{P}_{s,i,k}} P_{s,i,k} + Const_{s,i,k}\right\}}{\sum_{l \in Dem_t} \exp\left\{\frac{\hat{\rho}_{s,i,l}}{\overline{P}_{s,i,l}} P_{s,i,l} + Const_{s,i,l}\right\}} \text{(Market Share equation)}$$

$\forall c, s \in Cluster_c, i,$ $$PMIN_{s,i} \leq \sum_k F_{s,i,k} P_{s,i,k} \leq PMAX_{s,i} \text{(Group price advance/decline)}$$

$PMIN_{c,i,k} \leq P_{c,i,k} \leq PMAX_{c,i,k}, \forall i,k$ (Product price advance/decline)$_k$ The optimization problem P2 has the following features: the objective and the group sales equations are nonlinear, while the rest of the constraints are linear. In the preferred embodiment, an heuristic approach is used to generate a good feasible starting point for the problem, if one exists. The heuristic works by repeatedly solving a related problem involving all the linear constraints, a set of linear constraints that approximate the group price advance and decline constraints, and an objective that involves the marginal contribution to profit of each product.

Heuristic to Generate the Feasible Solution:

The problem may be decomposed by store cluster and, hence, each cluster can be solved in isolation. In the preferred embodiment, the heuristic focuses on finding good initial feasible solutions to the problem. First, a related problem is defined. The market shares of all products are calculated based on a set of initial prices. Then, these initial market shares are used as fixed weights to develop linear constraints that limit the advance and decline of demand group prices at each store. Specifically, let $$\overline{P}_{Cluster_c,i} = \begin{pmatrix} P_{c,i,k} \\ \vdots \\ P_{c,i,|Dem_t|} \end{pmatrix}, \overline{P}_{Cluster_c} = \begin{pmatrix} \overline{P}_{Cluster_c,1} \\ \vdots \\ \overline{P}_{Cluster_c,|G|} \end{pmatrix},$$

and $$G_{s,i,k}(\overline{P}_{Cluster_c,i}) \equiv \frac{\exp\left\{\frac{\hat{\rho}_{s,i,k}}{\overline{P}_{s,i,k}} P_{c,i,k} + Const_{s,i,k}\right\}}{\sum_{l \in Dem_t} \exp\left\{\frac{\hat{\rho}_{s,i,l}}{\overline{P}_{s,i,l}} P_{c,i,l} + Const_{s,i,l}\right\}} \forall s \in Cluster_c,$$

the market share of product k at store s given price vector $\overline{p}_{Cluster_c,i}$ at the store for demand group i. Then, if the initial price vectors are $\overline{q}_{Cluster_c,i} \forall s \in Cluster_c, i$, the approximate group price constraints are defined to be:

$$\forall\, s \in Cluster_c,\ \forall_i,\ PMIN_{s,i} \leq \sum_k G_{s,i,k}(\overline{q}_{Cluster_c,i})P_{c,i,k} \leq PMAX_{s,i}.$$

Note that the weights $G_{s,i,k}(\overline{q}_{Cluster_c,i})$ are constants and so the constraints are linear in $P_{c,i,k}$. Now, Problem P3 is defined as follows:

Problem P3($\overline{q}_{Cluster_c}$)

Maximize:

$$\sum_{s \in Cluster_c} \sum_{i \in G} \sum_{k \in Dem_i} \frac{\exp\left\{\frac{\hat{P}_{s,i,k}}{\overline{P}_{s,i,k}}P_{c,i,k} + Const_{s,i,k}\right\}}{\sum_{l \in Dem_i} \exp\left\{\frac{\hat{P}_{s,i,l}}{\overline{P}_{s,i,l}}P_{c,i,l} + Const_{s,i,l}\right\}} (P_{c,i,k} - C_{s,i,k})$$

Subject to: $\forall\, s \in Cluster_c,\ \forall\, i$, $$PMIN_{s,i} \leq \sum_k G_{s,i,k}(\overline{q}_{Cluster_c,i})P_{c,i,k} \leq PMAX_{s,i}\text{(Group pricing-approximate)}$$

$PMIN_{c,i,k} \leq P_{c,i,k} \leq PMAX_{c,i,k}, \forall i,k$ (Product price advance/decline)

Problem P3 has a nonlinear objective but only linear constraints. Note that the P3 does not include group sales. The objective maximizes the sum of marginal profit for all products over all the stores in the cluster. This approach may be easily extended to include a multiplier that approximates the group sales of all groups over all stores.

To provide good initial feasible solution for the full nonlinear model, we solve problem P3 iteratively as follows: First, set current incumbent prices to equal initial baseline prices. Next, Set $q_{Cluster_c}$ to be the set current incumbent prices for products at the stores in the cluster. The product market shares are then calculated for each product at each store and generate the approximate group price constraints as a function of $q_{Cluster_c}$. Next, problem P3($\overline{q}_{Cluster_c}$) is solved for the optimal solution $\overline{p}^*_{Cluster_c}$ and checked to see if the problem is feasible. If the problem is infeasible, no feasible solution exists, and the optimization is terminated.

Next, the optimal solution $\overline{p}^*_{Cluster_c}$ are compared to the problem P3($\overline{q}_{Cluster_c}$) to $\overline{p}_{Cluster_c}$. If the they are the different, then let $\overline{q}_{Cluster_c} = \overline{p}^*_{Cluster_c}$ and go back to the second step. If they are the same, redefine the bounds $PMIN_{c,I}$ and $PMAX_{c,I}$ as follows:

$$PMIN_{s,i} \equiv MIN\left(PMIN_{s,i}, \sum_k G_{s,i,k}(\overline{p}_{Cluster_c,i})P_{c,i,k}\right)\text{ and}$$

$$PMAX_{s,i} \equiv MAX\left(PMAX_{s,i}, \sum_k G_{s,i,k}(\overline{p}_{Cluster_c,i})P_{c,i,k}\right).$$

This ensures that $\overline{p}_{Cluster_c}$ is feasible for P2. Next, the group sales are computed corresponding to $\overline{p}^*_{Cluster_c}$. This is done by solving P2 with $\overline{p}_{Cluster_c}$ fixed. The resulting optimal price vector $\overline{p}^*_{Cluster_c}$ and group sales are then used as a feasible starting solution to P3.

This method turns out to have several advantages. First, it finds an initial feasible solution by solving iteratively a non-linear problem with linear constraints. This problem (P3) is considerably easier to solve than P1. Second, the initial feasible solution turns out to be a good starting solution to P2. It converges quite quickly from this starting point.

At the end of this process, an optimal price vector, $\overline{p}_{Cluster_c}$ is provided, which incorporates the new state of information and has at the most N price changes.

When the subset optimization is completed and prices are optimized over the subset a unique subset optimized data package is provided. The subset optimized data package of the new prices for the subset of products is provided to the stores. The prices for the products in the subset, which is a smaller set than all of the products, are changed (set) according to the optimized subset prices.

The subset optimization may be repeated several times between a complete optimization allowing all prices to change. For example, after subset optimization, new data may be provided. A user may specify new subset limits or use the previous subset limits. A new subset optimization may then be performed, using the specified subset limits and holding any frozen prices to the prices provided by the previous subset optimization.

While this invention has been described in terms of several preferred embodiments, there are alterations, modifications, permutations, and substitute equivalents, which fall within the scope of this invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A system for implementing a preferred set of prices for a subset of a plurality of products, comprising computer readable media, the system comprising:

a database storing initial prices for a plurality of products;

a modeling engine creating, using a processor, a demand model for the plurality of products based on Bayesian modeling;

a subset generator configured to perform the steps of:

designating, using the processor, a subset of products of the plurality of products, wherein the number of products in the subset of products is less than the number of products in the plurality of products, the designating a subset of products comprising:

generating a set of candidate products of the plurality of products;

designating a number N;

determining which N products of the candidate products have the largest impact on a business objective by solving an integer problem, wherein the business objective is at least one of profit maximization, and sales volume goal; and selecting no more than N products of the plurality of products to form the subset of products using the determination of which N products have the largest impact on the business objective;

an optimizer optimizing prices for products in the subset of products, using the created demand model, while maintaining the initial prices of products of the plurality of products that are not in the subset of products, wherein the optimization includes relaxation of constraints; and an interface reporting the optimized prices of the subset of products for price setting, wherein the price setting establishes the amount of money consumers pay for each product of the subset of product.

2. The apparatus, as recited in claim 1, wherein the subset generator configured to select no more than N products selects products that have had a change in information state, and products of the plurality of products that have constraints enabling price movement.

3. The apparatus, as recited in claim 2, further comprising computer readable code for providing initial prices by optimizing prices for all of the plurality of products.

4. The apparatus, as recited in claim 3, further comprising computer readable code for providing new data subsequent to providing initial prices by optimizing prices.

5. The apparatus, as recited in claim 4, wherein the computer readable code for providing new data comprises computer readable code for providing new price data and computer readable code for providing new bound data.

6. The apparatus, as recited in claim 5, further comprising computer readable code for providing rule relaxation, wherein the computer readable code for providing rule relaxation comprises:
   computer readable code for allowing the prioritization of a plurality of rules; and
   computer readable code for relaxing at least one lower priority rule to allow a higher priority rule to become feasible.

7. The apparatus, as recited in claim 1, further comprising computer readable code for providing initial prices by optimizing prices for all of the plurality of products.

8. The apparatus, as recited in claim 1, further comprising computer readable code for providing new data subsequent to providing initial prices by optimizing prices.

9. The apparatus, as recited in claim 8, wherein the computer readable code for providing new data comprises computer readable code for providing new price data and computer readable code for providing new bound data.

10. The apparatus, as recited in claim 1, further comprising computer readable code for providing rule relaxation.

11. The apparatus, as recited in claim 10, wherein the computer readable code for providing rule relaxation, comprises:
   computer readable code for allowing the prioritization of a plurality of rules; and
   computer readable code for relaxing at least one lower priority rule to allow a higher priority rule to become feasible.

12. A computer-implemented method for computing a preferred set of prices for a subset of products of a plurality of products, comprising:
   storing, in a database, initial prices for a plurality of products;
   creating, using a processor, a demand model based on Bayesian modeling;
   designating, using the processor, a subset of products of the plurality of products, wherein the number of products in the subset of products is less than the number of products in the plurality of products, the designating a subset of products comprising:
      generating a set of candidate products of the plurality of products;
      designating a number N;
      determining which N products of the candidate products have the largest impact on a business objective by solving an integer problem, wherein the business objective is at least one of profit maximization, and sales volume goal; and
      selecting no more than N products of the plurality of products to form the subset of products using the determination of which N products have the largest impact on the business objective;
   optimizing prices for products, using the processor, in the subset of products using the demand model, while maintaining the initial prices of products of the plurality of products that are not in the subset of products using the demand model, wherein the optimization includes a relaxation of constraints; and
   setting the price for the subset of products by replacing current prices for the subset of products with the optimized prices of the subset of products, wherein the price setting establishes the amount of money consumers pay for each product of the subset of product, and wherein the price setting includes transforming a pricing display.

13. The method, as recited in claim 12, wherein the selecting no more than N products selects products that have had a change in information state, and products of the plurality of products that have constraints enabling price movement.

14. The method, as recited in claim 12, further comprising providing initial prices by optimizing prices for all of the plurality of products.

15. The method, as recited in claim 14, further comprising providing new data subsequent to providing initial prices by optimizing prices.

16. The method, as recited in claim 15, wherein the new data comprises new price data and bound data.

17. The method, as recited in claim 12, further comprising providing rule relaxation, wherein the rule relaxation comprises:
   prioritizing a plurality of rules; and
   relaxing at least one lower priority rule to allow a higher priority rule to become feasible.

18. A computer-implemented method for setting prices for a subset of products of a plurality of products, comprising:
   receiving, using a computer, optimized prices for a product category;
   pricing every item in the product category according to the received optimized prices;
   providing, using the computer, new data;
   receiving, using the computer, a subset of products of the product category, wherein the subset of products is smaller than the product category, wherein the received subset of products is generated by performing the steps of:
      generating a set of candidate products of the plurality of products;
      designating a number N;
      determining which N products of the candidate products have the largest impact on a business objective by solving an integer problem, wherein the business objective is at least one of profit maximization, and sales volume goal; and
      selecting no more than N products of the plurality of products to form the subset of products using the determination of which N products have the largest impact on the business objective;
   optimizing prices for products, using a processor, in the subset of products, while freezing the initial prices of products of the plurality of products in the product category that are not in the subset of products, wherein the optimization includes relaxation of constraints; and
   setting prices for the subset of products according to the received new prices, wherein the price setting establishes the amount of money consumers pay for each product of the subset of product, and wherein the price setting includes transforming a pricing display.

19. The method, as recited in claim 12, wherein the integer problem is based on an objective function which includes a sum of a plurality of marginal product price values.

20. The apparatus, as recited in claim 1, further comprising an imputed variable generator resolving errors of new data provided, utilizing a grid of time periods including records, said resolving of errors comprising:
- removing duplicate records of the new data;
- removing the records for discontinued products, wherein the plurality of products includes discontinued products;
- removing the records that include at least one of negative prices, negative sale volume, negative costs, and erroneous prices, wherein the erroneous prices includes a product price that is a specified configurable standard deviations from mean price of the product of the plurality of products;
- removing the new data from closed stores, wherein the closed stores are determined by a lack of product movement at the closed store for a set time period;
- removing missing records, of the records, in the grid of time periods' first and last row; and
- generating replacement records for missing records, of the records, in the grid of time periods.

21. The method, as recited in claim 12, further comprising resolving errors of new data provided, utilizing a grid of time periods including records, comprising:
- removing, using the processor, duplicate records of the new data;
- removing, using the processor, the records for discontinued products, wherein the plurality of products includes discontinued products;
- removing, using the processor, the records that include at least one of negative prices, negative sale volume, negative costs, and erroneous prices, wherein the erroneous prices includes a product price that is a specified configurable standard deviations from mean price of the product of the plurality of products;
- removing, using the processor, the new data from closed stores, wherein the closed stores are determined by a lack of product movement at the closed store for a set time period;
- removing, using the processor, missing records, of the records, in the grid of time periods' first and last row; and
- generating, using the processor, replacement records for missing records, of the records, in the grid of time periods.

22. The method, as recited in claim 12, further comprising generating a database populated with the optimized prices of the subset of products.

* * * * *